(12) United States Patent
Hokai et al.

(10) Patent No.: US 12,449,274 B2
(45) Date of Patent: Oct. 21, 2025

(54) METHOD AND APPARATUS FOR GENERATING MAP DATA, AND NON-TRANSITORY COMPUTER-READABLE STORAGE MEDIUM

(71) Applicant: TOYOTA JIDOSHA KABUSHIKI KAISHA, Toyota (JP)

(72) Inventors: Keisuke Hokai, Gotemba (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 18/165,024

(22) Filed: Feb. 6, 2023

(65) Prior Publication Data

US 2023/0314169 A1   Oct. 5, 2023

(30) Foreign Application Priority Data

Apr. 4, 2022   (JP) ................................ 2022-062517

(51) Int. Cl.
  *G01C 21/00*   (2006.01)
(52) U.S. Cl.
  CPC ................ *G01C 21/3859* (2020.08)
(58) Field of Classification Search
  CPC .... G01C 21/3841; G01C 21/30; G01C 21/32; G01C 21/3859
  See application file for complete search history.

(56) References Cited

U.S. PATENT DOCUMENTS

| | | | | |
|---|---|---|---|---|
| 11,192,558 | B2* | 12/2021 | Thompson | G06V 20/56 |
| 2018/0188045 | A1* | 7/2018 | Wheeler | G06V 10/98 |
| 2018/0252536 | A1* | 9/2018 | Dorum | G01C 21/3673 |
| 2020/0286372 | A1* | 9/2020 | Fowe | G01C 21/3841 |
| 2021/0004017 | A1* | 1/2021 | Colgate | G01C 21/30 |

FOREIGN PATENT DOCUMENTS

| | | |
|---|---|---|
| JP | 2012-520491 A | 9/2012 |
| JP | 2014-160064 A | 9/2014 |
| JP | 2016-180797 A | 10/2016 |
| WO | 2010/105714 A1 | 9/2010 |

\* cited by examiner

*Primary Examiner* — Kenneth J Malkowski
(74) *Attorney, Agent, or Firm* — Oliff PLC

(57) ABSTRACT

According to the method of the present disclosure, first, a plurality of data sets is generated from a travel log data group. Each of the plurality of data sets includes one or a plurality of travel log data. Next, map data for evaluation is generated from each of the plurality of data sets. Then, abnormal map data included in a plurality of map data for evaluation generated from the plurality of data sets is specified by comparing the plurality of map data for evaluation with each other. Then, abnormal travel log data is specified by comparing a data set used to generate the abnormal map data with a data set used to generate map data for evaluation other than the abnormal map data. And finally, final map data is generated using a data set that does not include the abnormal travel log data.

8 Claims, 50 Drawing Sheets

|  | Vehicle name | Date | Time | Sensor A | Sensor B | Sensor C | Sensor D |
|---|---|---|---|---|---|---|---|
| Log data 1 | A | 04/07 | 09:00 | ✓ | ✓ | ✓ | - |
| Log data 1a | A | 04/07 | 09:00 | ✓ | - | ✓ | - |
| Log data 1b | A | 04/07 | 09:00 | - | ✓ | - | - |
| Log data 2 | A | 04/08 | 07:00 | ✓ | ✓ | ✓ | - |
| Log data 2a | A | 04/08 | 07:00 | ✓ | - | - | - |
| Log data 2b | A | 04/08 | 07:00 | - | ✓ | ✓ | - |
| Log data 3 | B | 04/12 | 14:00 | ✓ | ✓ | ✓ | - |
| Log data 3a | B | 04/12 | 14:00 | - | - | ✓ | - |
| Log data 3b | B | 04/12 | 14:00 | ✓ | ✓ | - | - |
| Log data 4 | B | 04/15 | 19:00 | ✓ | ✓ | ✓ | - |
| Log data 4a | B | 04/15 | 19:00 | - | - | ✓ | - |
| Log data 4b | B | 04/15 | 19:00 | - | ✓ | - | - |
| Log data 5 | C | 04/21 | 14:00 | - | - | - | ✓ |
| Log data 6 | C | 04/22 | 19:00 | - | - | - | ✓ |

| | Vehicle name | Date | Time | Sensor A | Sensor B |
|---|---|---|---|---|---|
| Log data 1 | A | 04/07 | 09:00 | ✓ | ✓ |
| Log data 1a | A | 04/07 | 09:00 | ✓ | - |
| Log data 1b | A | 04/07 | 09:00 | - | ✓ |
| Log data 2 | A | 04/08 | 07:00 | ✓ | ✓ |
| Log data 2a | A | 04/08 | 07:00 | ✓ | - |
| Log data 2b | A | 04/08 | 07:00 | - | ✓ |
| Log data 3 | B | 04/12 | 14:00 | ✓ | ✓ |
| Log data 3a | B | 04/12 | 14:00 | ✓ | - |
| Log data 3b | B | 04/12 | 14:00 | - | ✓ |
| Log data 4 | B | 04/15 | 19:00 | ✓ | ✓ |
| Log data 4a | B | 04/15 | 19:00 | ✓ | - |
| Log data 4b | B | 04/15 | 19:00 | - | ✓ |

◯ : Abnormal parameter condition

Log data 1, 1a, 2, 2a: Abnormal
Log data 3, 3a, 4, 4a: High probability of abnormality 150 — Abnormal log data determination unit

Fig. 21

| Example of variation for each feature amount | |
|---|---|
| Feature amount | Standard deviation 1σ [m] |
| White line | 0.040 |
| Curb | 0.055 |
| Road sign | 0.046 |
| Pole | 0.055 |
| Building corner (Vertical) | 0.038 |
| Building corner (Horizontal) | 0.059 |

| | Feature amount | Standard deviation 1σ [m] |
|---|---|---|
| Map data 1 | White line | 0.040 |
| Map data 2 | White line | 0.042 |
| Map data 3 | White line | 0.10 |

Fig. 34

|  | Map data 1 | Map data 2 | Map data 3 |
|---|---|---|---|
| Map data 1 | - | Equal variance | Not equal variance |
| Map data 2 | Equal variance | - | Not equal variance |
| Map data 3 | Not equal variance | Not equal variance | - |

Fig. 35

| | Average value of p-values ($\bar{p}_i$) |
|---|---|
| Map data 1 | 0.5 |
| Map data 2 | 0.45 |
| Map data 3 | 0.2 |

Fig. 42

|            | Map data 1 | Map data 2 | Map data 3 |
|------------|------------|------------|------------|
| Map data 1 | 1.0        | 0.9        | 0.3        |
| Map data 2 | 0.9        | 1.0        | 0.2        |
| Map data 3 | 0.3        | 0.2        | 1.0        |

Fig. 43

METHOD AND APPARATUS FOR GENERATING MAP DATA, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-062517, filed Apr. 4, 2022, the disclosure of which is incorporated herein by reference in the entirety.

BACKGROUND

Field

The present disclosure relates to a method, a device, and a program for generating map data from travel log data.

Background Art

JP2016-180797A discloses a road information generation apparatus. The road information generation apparatus sets a plurality of combinations of travel data having the same road ID with respect to a plurality of travel data (travel log data) stored in a travel data storage unit. Next, the road information generation apparatus generates a road map for the road ID based on the combined travel data for each combination of the travel data. Then, the road information generation apparatus calculates the reliability of each road map generated for each road ID.

However, the acquired travel data may include abnormal travel data. In the road information generation apparatus disclosed in JP2016-180797A, a combination of travel data having the same road ID is set without determining whether the travel data is abnormal. Therefore, when abnormal travel data is included in the combination of travel data having the same road ID, the accuracy of the map generated for the road ID is affected by the abnormal travel data.

In addition to JP2016-180797A, JP2012-520491A and JP2014-160064A can be exemplified as documents showing the technical level of the technical field related to the present disclosure.

SUMMARY

The present disclosure has been made in view of the above-described problem, and an object thereof is to provide a technique capable of generating map data with high accuracy in a case where the map data is generated from travel log data.

The present disclosure provides, as a map data generation technique, a map data generation method, a map data generation apparatus, and a map data generation program.

The map data generation method of the present disclosure comprises the following steps. The first step is to generate a plurality of data sets from a driving log data group. Each of the plurality of data sets includes one or a plurality of travel log data. The second step is to generate map data for evaluation from each of the plurality of data sets. The third step is to specify abnormal map data included in a plurality of map data for evaluation generated from the plurality of data sets by comparing the plurality of map data for evaluation with each other. The fourth step is to specify abnormal travel log data by comparing a data set used to generate the abnormal map data with a data set used to generate map data for evaluation other than the abnormal map data. The fifth step is to generate final map data using a data set that does not include the abnormal travel log data.

A map data generation apparatus of the present disclosure comprises at least one processor and at least one program memory coupled to the at least one processor. The at least one program memory stores a plurality of executable instructions. The plurality of executable instructions is configured to cause the at least one processor to execute the following processes. The first process is to generate a plurality of data sets from a travel log data group. Each of the plurality of data sets includes one or a plurality of travel log data. The second process is to generate map data for evaluation from each of the plurality of data sets. The third process is to specify abnormal map data included in a plurality of map data for evaluation generated from the plurality of data sets by comparing the plurality of map data for evaluation with each other. The fourth process is to specify abnormal travel log data by comparing a data set used to generate the abnormal map data with a data set used to generate map data for evaluation other than the abnormal map data. The fifth process is to generate final map data using a data set that does not include the abnormal travel log data.

A map data generation program according to the present disclosure is configured to cause a computer to execute the following processes. The first process is to generate a plurality of data sets from a travel log data group. Each of the plurality of data sets includes one or a plurality of travel log data. The second process is to generate map data for evaluation from each of the plurality of data sets. The third process is to specify abnormal map data included in a plurality of map data for evaluation generated from the plurality of data sets by comparing the plurality of map data for evaluation with each other. The fourth process is to specify abnormal travel log data by comparing a data set used to generate the abnormal map data with a data set used to generate map data for evaluation other than the abnormal map data. The fifth process is to generate final map data using a data set that does not include the abnormal travel log data. The map data generation program of the present disclosure may be recorded in a non-transitory computer-readable storage medium or may be provided via a network.

According to the map data generation technique of the present disclosure, that is, the map data generation method, the map data generation apparatus, and the map data generation program, since a data set that does not include abnormal travel log data is used for generation of map data, it is possible to generate map data with high accuracy.

In the map data generation technique of the present disclosure, each of the plurality of travel log data included in the travel log data group may be defined by a plurality of parameters. A condition of at least one of the plurality of parameters defining the travel log data may be made non-uniform among the plurality of travel log data included in the plurality of data sets. According to this, in a case where the abnormality of the travel log data depends on the condition of the parameter, it is possible to search for the abnormal travel log data from the travel log data group.

In the map data generation technique of the present disclosure, a condition causing an abnormality in map data among conditions of the plurality of parameters defining the travel log data may be specified based on the abnormal travel log data. Then, the final map data may be generated using a data set in which the conditions of the plurality of parameters defining the travel log data do not include the condition causing an abnormality in the map data. According to this, in the case where the abnormality of the travel log data depends on the condition of the parameter, it is possible to exclude the abnormal travel log data from the data set used for generating the map data.

In the map data generation technique of the present disclosure, a combination of conditions that causes an abnormality in the map data may be specified from among combinations of conditions of the plurality of parameters defining the travel log data. For this purpose, the data set used to generate the abnormal map data may be compared with the data set used to generate the map data for evaluation other than the abnormal map data. Then, the final map data may be generated using a data set in which the combinations of conditions of the plurality of parameters defining the travel log data do not include the combination of conditions that causes an abnormality in the map data. According to this, in the case where the abnormality of the travel log data depends on the combination of parameter conditions, it is possible to exclude the combination of the travel log data causing the abnormality in the map data from the data set used for generating the map data.

In the map data generation technique of the present disclosure, the map data may be map data of a feature map. In this case, the comparing the plurality of map data for evaluation with each other may include comparing variation of features between the plurality of map data for evaluation. Alternatively, the comparing the plurality of map data for evaluation with each other may include comparing degree of success of self-location estimation using features between the plurality of map data for evaluation.

In the map data generation technique of the present disclosure, the map data may be map data of a road surface shape map. In this case, the comparing the plurality of map data for evaluation with each other may include comparing height or road surface gradient between the plurality of map data for evaluation.

In the map data generation technique of the present disclosure, the map data may be map data of a road surface luminance map. In this case, the comparing the plurality of map data for evaluation with each other may include comparing luminance or luminance gradient between the plurality of map data for evaluation.

In the map data generation technique of the present disclosure, the map data may be map data of a stationary obstacle map. In this case, the comparing the plurality of map data for evaluation with each other may include comparing positions of voxels between the plurality of map data for evaluation.

As described above, according to the map data generation technique of the present disclosure, it is possible to generate map data with high accuracy by generating map data using a data set that does not include abnormal travel log data.

BRIEF DESCRIPTION OF THE DRAWINGS

FIG. 21 is a conceptual diagram for explaining the second example of the map data generation method performed by the map data generation apparatus according to the embodiment of the present disclosure, and is a conceptual diagram for explaining abnormal parameter condition determination processing in the second example.

FIG. 34 is a diagram illustrating a specific example of the map data evaluation processing performed by the map data generation apparatus according to the embodiment of the present disclosure, and is a diagram illustrating example of statistics for each map data.

FIG. 35 is a diagram illustrating a specific example of the map data evaluation processing performed by the map data generation apparatus according to the embodiment of the present disclosure, and is a diagram illustrating examples of evaluation using F-test.

FIG. 40B is a diagram illustrating an example of correlation of p-value variations among map data.

FIG. 42 is a diagram for explaining a specific example of the map data evaluation processing performed by the map data generation apparatus according to the embodiment of the present disclosure, and is a diagram illustrating examples of an average values of p-values for each map data in a predetermined section shown in FIG. 41.

FIG. 43 is a diagram for explaining a specific example of the map data evaluation processing performed by the map data generation apparatus according to the embodiment of the present disclosure, and is a diagram illustrating examples of correlation coefficients of p-values between map data.

FIG. 46A is a diagram illustrating an example of success of SLAM in the road surface shape map. FIG. 46B is a diagram illustrating an example of failure of SLAM in the road surface shape map.

DETAILED DESCRIPTION

Hereinafter, an embodiment of the present disclosure will be described with reference to the drawings. However, in the embodiment described below, when a numerical value such as the number, quantity, amount, range, or the like of each element is mentioned, the idea according to the present disclosure is not limited to the mentioned numerical value except for a case where the numerical value is clearly specified in particular or a case where the numerical value is obviously specified to the numerical value in principle. In addition, a structure or the like described in the following embodiment is not always necessary to the idea according to the present disclosure except for a case where the structure or the like is clearly specified in particular or a case where the structure or the like is obviously specified in principle.

1. Outline of Map Data Generation Method

The map data in the present embodiment means data constituting a map for autonomous driving by an autonomous driving vehicle, such as a feature map, a road surface shape map (terrain map), a road surface luminance map (intensity map), and a stationary obstacle map (background knowledge). The feature map is typically used for self-location estimation of the autonomous driving vehicle. The road surface shape map is a map in which the shape (height) of the road surface in an area where the autonomous driving vehicle travels is recorded in cells. The road surface luminance map is a map in which the luminance of the road surface in the area where the autonomous driving vehicle travels is recorded in cells. The stationary obstacle map is a map in which stationary obstacles such as road structures are recorded in voxels.

Figure 1:
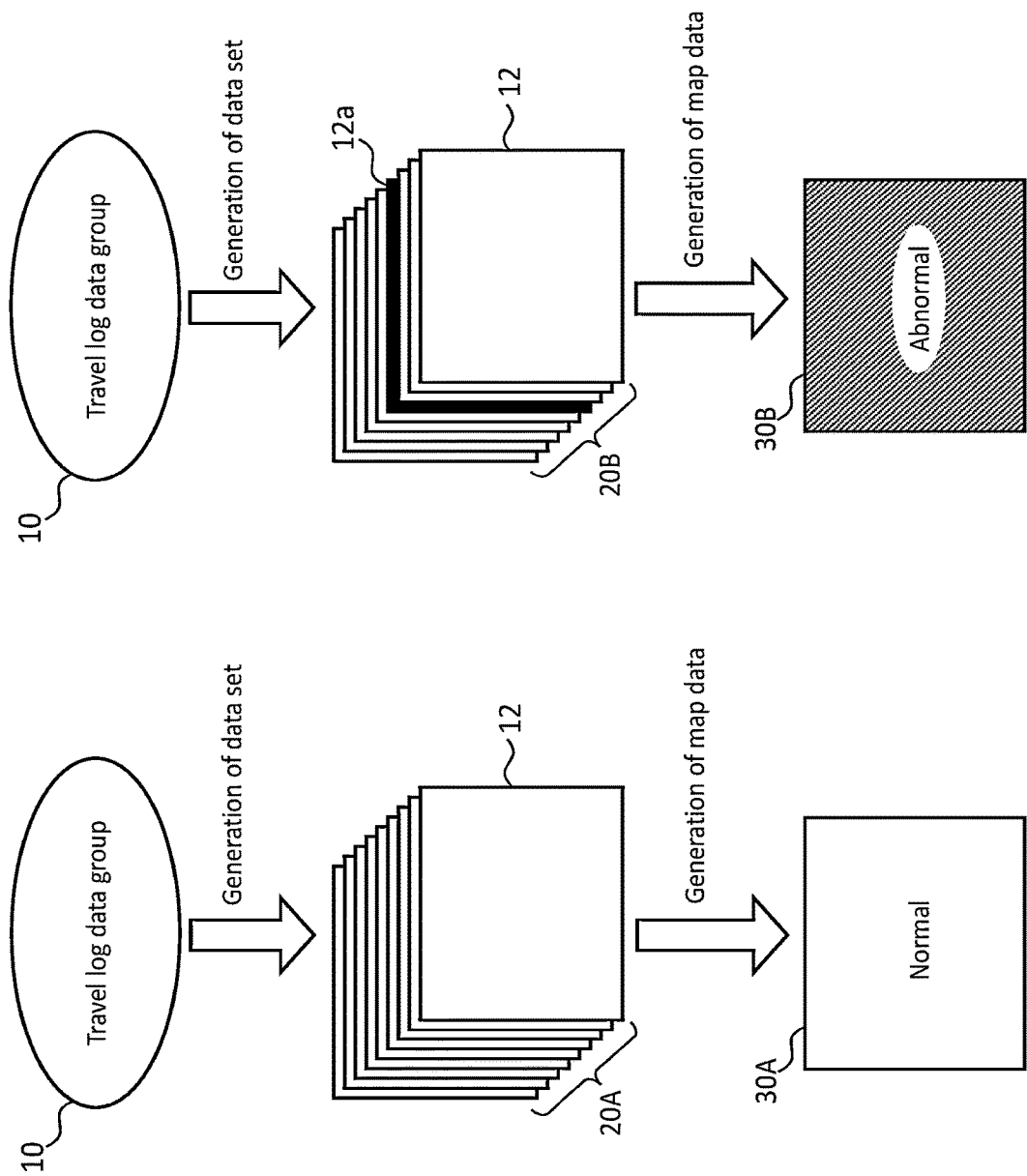
FIG. 1 is a conceptual diagram for explaining a first problem related to generation of map data using travel log data.

To generate map data, a large number of travel log data acquired by actually driving a vehicle with a sensor are used. The entire set of travel log data used to generate map data is referred to as a travel log data group. Further, the travel log data may be abbreviated as log data. There are several problems in generating map data using travel log data. FIG. 1 is a conceptual diagram for explaining a first problem related to map data generation using log data.

FIG. 1 shows two examples in which the map data is generated using the travel log data group 10. In the example on the left side, a data set 20A, which is a set of a plurality of log data 12, is generated from the travel log data group 10. The data set 20A is used to generate a map data set 30A. In the example on the right side, a data set 20B, which is a set of a plurality of log data 12, is generated from the travel log data group 10. The data set 20B is used to generate a map data 30B. The log data 12 constituting each data set 20A and 20B may be arbitrarily extracted from the travel log data group 10 or may be extracted in accordance with a predetermined selection condition.

Here, it is assumed that all the log data 12 included in the data set 20A are normal, whereas the log data 12 included in the data set 20B include abnormal log data 12a. In this case, the map data 30A generated from the data set 20A is normal, whereas the map data 30B generated from the data set 20B is abnormal.

One method for determining whether the map data is normal or abnormal is statistical determination. Although only two map data 30A and 30B are generated in FIG. 1, a large number of map data can actually be generated from the travel log data group 10. Then, when there is a group of map data in which the degree of variation of element data constituting the map data is substantially the same (which can also be referred to as a group of map data in which the variation of element data falls within a certain range), the map data belonging to the group is regarded as statistically normal, and the map data out of the group is regarded as abnormal. In the example shown in FIG. 1, the map data 30A is map data belonging to a group of normal map data, and the map data 30B is a map data outside the group of normal map data.

The abnormal log data 12a is a log data that has a large variation with respect to the other log data 12 and causes the map data 30B to deviate from the group of normal map data. Therefore, in order to generate the map data with high accuracy, it is desirable to exclude the abnormal log data 12a in advance. However, since the number of log data included in the travel log data group 10 is enormous, it is not easy to extract the abnormal log data 12a from the enormous number of log data. Whether or not certain log data is abnormal is determined by whether or not the map data becomes abnormal when the map data is generated using the certain log data. Therefore, it is not easy to set a determination criterion for determining in advance whether log data is abnormal.

Figure 2:
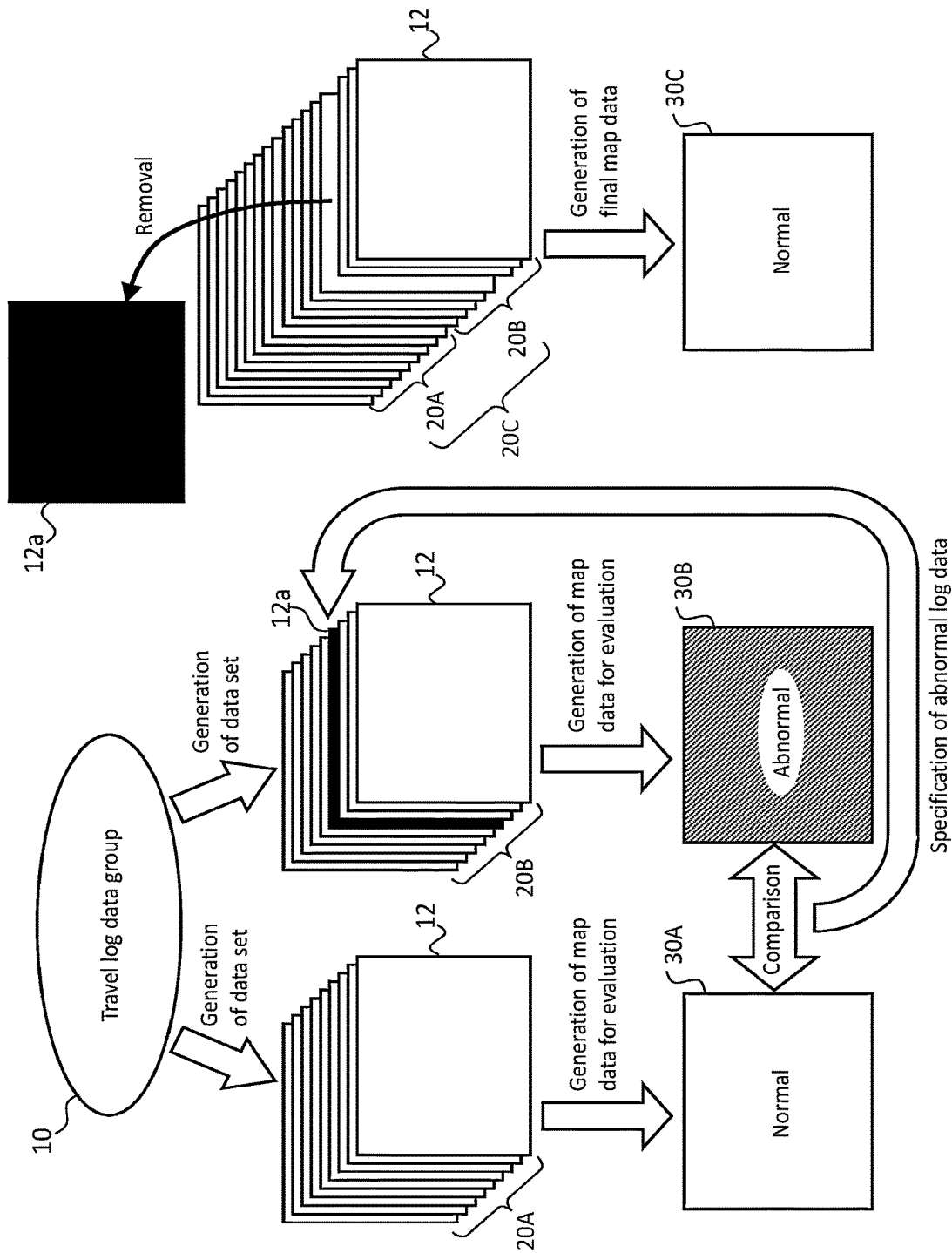
FIG. 2 is a conceptual diagram for explaining means for solving the first problem, and is a conceptual diagram for explaining an outline of a map data generation method according to an embodiment of the present disclosure.

The map data generation method according to the present embodiment provides a solution to the above-described first problem related to map data generation. FIG. 2 is a conceptual diagram for explaining an outline of the map data generation method according to the present embodiment.

According to the map data generation method of the present embodiment, a plurality of data sets 20A and 20B are generated from the travel log data group 10. The log data constituting each data set 20A and 20B may be arbitrarily extracted from the travel log data group 10 or may be extracted in accordance with a predetermined selection condition. Although only two data sets 20A and 20B are generated in FIG. 2, a larger number of data sets are actually generated. The number of pieces of log data constituting each data set is preferably plural, but may be one. The number of pieces of log data may be the same or different between data sets.

Next, map data 30A and 30B for evaluation are generated from the generated data sets 20A and 20B, respectively. By comparing the map data 30A and 30B for evaluation with each other, the abnormal map data 30A included in the map data 30A and 30B for evaluation is specified. Although two map data 30A and 30B for evaluation are generated in FIG. 2, a large number of map data for evaluation are actually generated. As described above, the abnormal map data is map data that deviates from a group of map data in which the degree of variation of element data constituting the map data is substantially the same. As a result of the comparison, it is determined that all of the map data for evaluation is normal or a part thereof is abnormal.

When the abnormal map data 30B is specified, the data set 20B used to generate the abnormal map data 30B is compared with the data set 20A used to generate the map data 30A for evaluation determined to be normal. When a large number of map data for evaluation are generated, the data set used to generate the abnormal map data is compared with the data set used to generate the map data for evaluation other than the abnormal map data.

By comparing the data set 20A with the data set 20B, the abnormal log data 12a included in the data set 20B is specified. That is, by using the log data 12 included in the data set 20A as a reference, the log data 12a different from the log data 12 included in the data set 20A is specified as the abnormal log data, that is, the log data causing an abnormality in the map data 30B. It is not easy to extract the abnormal log data in advance from a large amount of log data included in the travel log data group 10. However, the abnormal log data can be easily specified by the method of comparing the data set used for generating the abnormal map data with the data set used for generating the map data for evaluation other than the abnormal map data.

When the abnormal log data 12a is specified, the abnormal log data 12a is removed from the data set 20B. Then, a new data set 20C is generated by combining the data set 20A and the data set 20B from which the abnormal log data 12a has been removed, and the final map data 30C is generated from the data set 20C. When a large number of map data for evaluation are generated, abnormal log data is removed from each of data sets used to generate abnormal map data. Then, a final data set not including the abnormal log data is generated, and final map data is generated from the final data set. By generating the map data using the data set not including the abnormal log data, the map data can be generated with high accuracy.

Figure 3:
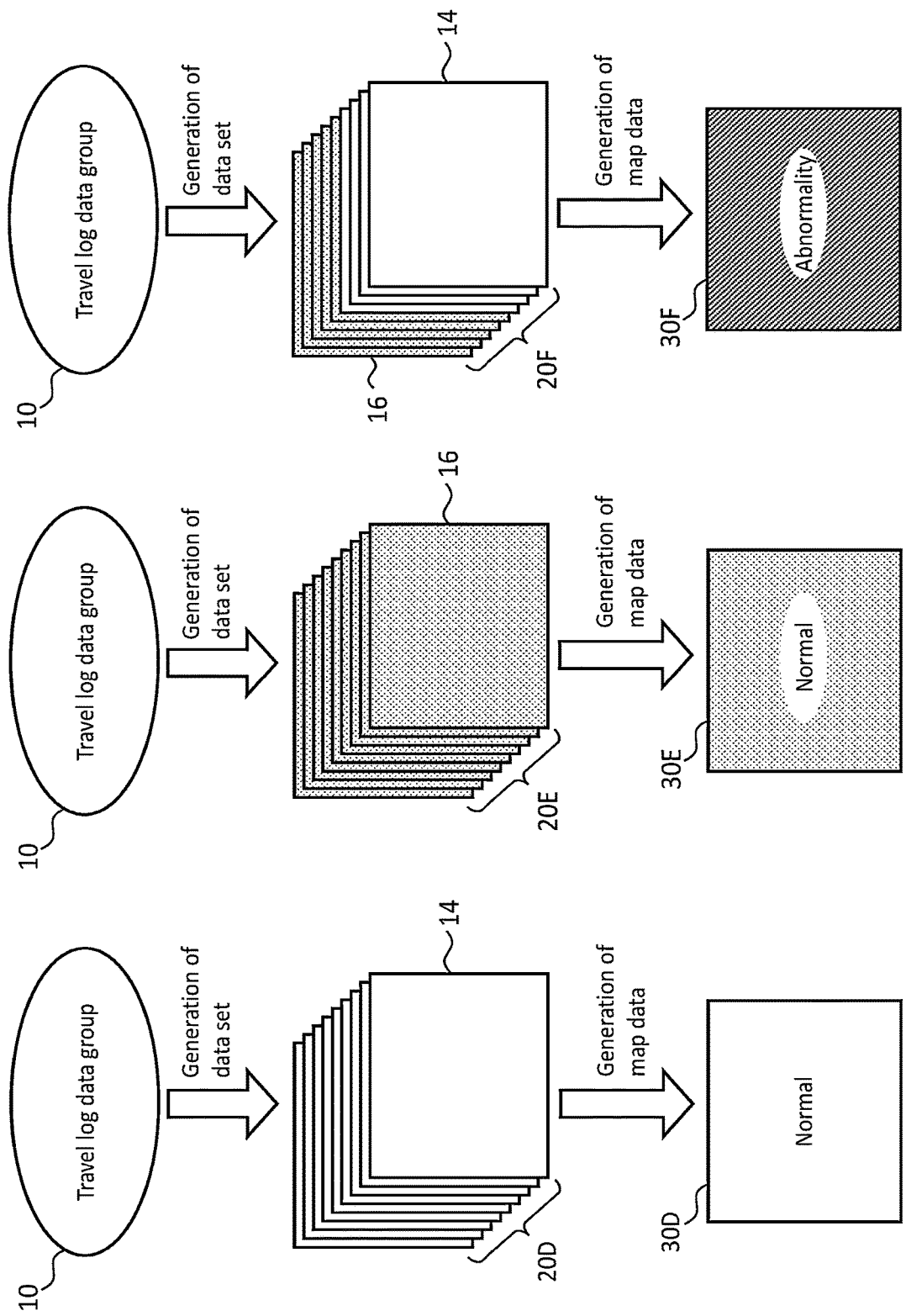
FIG. 3 is a conceptual diagram for explaining a second problem related to generation of map data using travel log data.

As described above, according to the map data generation method of the present embodiment, it is possible to remove abnormal log data that causes a decrease in the accuracy of map data from a data set used for generation of the map data. However, the cause of the decrease in the accuracy of the map data is not only the abnormal log data. This is the second problem related to the map data generation using log data. FIG. 3 is a conceptual diagram for explaining a second problem related to generation of map data using log data.

FIG. 3 shows three examples in which the map data is generated using the travel log data group 10. In the example on the left side, a data set 20D, which is a set of a plurality of log data 14, is generated from the travel log data group 10. The data set 20D is used to generate a map data 30D. In the center example, a data set 20E, which is a set of a plurality of log data 16, is generated from the travel log data group 10. The data set 20E is used to generate the map data 30E. In the example on the right side, a data set 20F, which is a set of a plurality of log data 14 and 16, is generated from the travel log data group 10. The data set 20F is used to generate the map data 30F. The log data is defined by a plurality of parameters. The log data 14 and the log data 16 differ from each other in at least one parameter condition.

A difference in the condition of the parameter may cause a large difference in the characteristics or tendency of the log data. For example, when the parameter is weather, time of day, presence or absence of a specific external sensor, or the like, the difference in the condition of the parameter greatly affects the characteristic and the tendency of the log data. When there is a large difference in the characteristic or tendency between the log data 14 and the log data 16, the map data 30D generated from the log data 14 and the map data 30E generated from the log data 16 belong to different groups of map data. Here, it is assumed that all the log data 14 and 16 included in the data sets 20D and 20E are normal. The map data 30D generated from the normal log data 14 is normal, and the map data 30E generated from the normal log data 16 is also normal.

However, even if both the log data 14 and the log data 16 included in the data set 20F are normal, the map data 30F generated from the log data 14 and the log data 16 may be abnormal. When there is a large difference in the characteristic or tendency between the log data 14 and the log data 16, it can be considered that the log data 16 is abnormal log data when viewed from the log data 14, and the log data 14 is abnormal log data when viewed from the log data 16. Therefore, the map data 30F generated from the log data 14 and the log data 16 having different parameter conditions may be abnormal map data that does not belong to any groups of map data.

In order to generate the map data with high accuracy, it is desirable to exclude a combination of parameter conditions that causes an abnormality in the map data in advance. However, since the number of combinations of parameter conditions that define the log data is enormous, it is not easy to determine in advance which combination of parameter conditions causes an abnormality in the map data.

Figure 4:
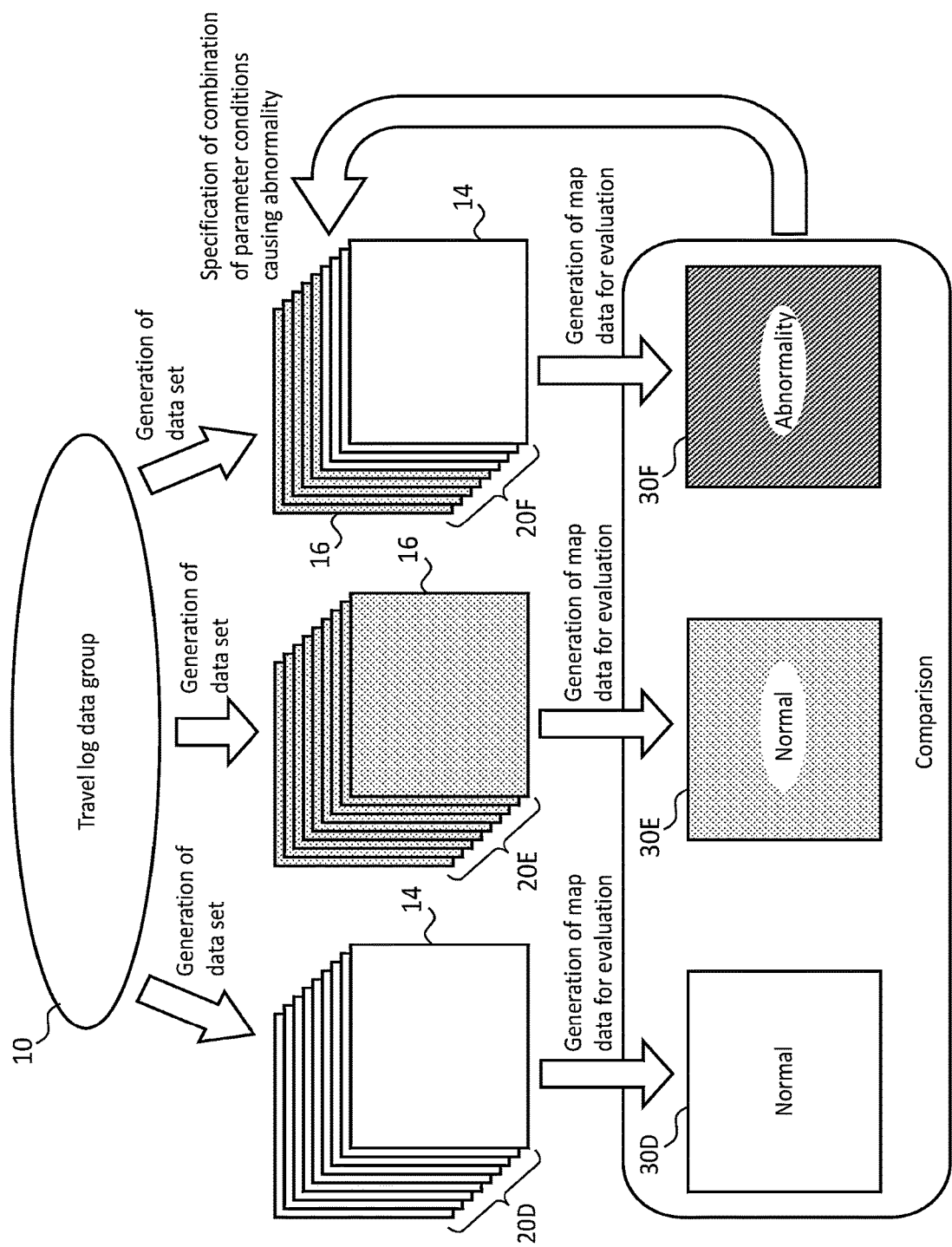
FIG. 4 is a conceptual diagram for explaining means for solving the second problem, and is a conceptual diagram for explaining an outline of a map data generation method according to the embodiment of the present disclosure.

The map data generation method according to the present embodiment provides a solution to the above-described second problem related to map data generation. FIG. 4 is a conceptual diagram for explaining an outline of the map data generation method according to the present embodiment.

According to the map data generation method according to the present embodiment, a plurality of data sets 20D, 20E, and 20F are generated from the travel log data group. The log data 14 constituting the data set 20D and the log data 16 constituting the data set 20E are different from each other in at least one parameter condition. The data set 20F is composed of the log data 14 and the log data 16 having different parameter conditions. Although only three data sets 20D, 20E, and 20F are generated in FIG. 4, a larger number of data sets are actually generated. The number of log data constituting each data set is preferably plural, but may be one. The number of log data may be the same or different between data sets.

Next, map data 30D, 30E and 30F for evaluation are generated from the generated data sets 20D, 20E and 20F, respectively. By comparing the map data 30D, 30E and 30F for evaluation with each other, the abnormal map data 30F included in the map data 30D, 30E and 30F for evaluation is specified. Although two map data 30D, 30E and 30F for evaluation are generated in FIG. 4, a large number of map data for evaluation are actually generated. The map data 30F determined to be abnormal is map data that deviates from both the group of map data to which the map data 30D belongs and the group of map data to which the map data 30E belongs.

When the abnormal map data 30F is specified, the data set 20F used to generate the abnormal map data 30F is compared with the data set 20D and 20E used to generate the map data 30D and 30E for evaluation determined to be normal. When a large number of map data for evaluation are generated, the data set used to generate the abnormal map data is compared with the data set used to create the map data for evaluation other than the abnormal map data.

By comparing the data sets 20D and 20E with the data set 20F, the log data having different parameter conditions included in the data set 20F, that is, the log data 14 and 16 are specified. By comparing the log data 14 with the log data 16, a combination of conditions that causes an abnormality in the map data 30E is specified from among combinations of conditions of the plurality of parameters defining the log data. It is not easy to determine in advance which combination of parameter conditions causes an abnormality in the map data. However, the combination of parameter conditions that causes the abnormality in the map data can be easily specified by the method of comparing the data set used for generating the abnormal map data with the data set used for generating the map data for evaluation other than the abnormal map data.

When the combination of parameter conditions that causes an abnormality in the map data is specified, the final map data is generated using the data set not including such a combination. In the example shown in FIG. 4, the map data 30D generated using the data set 20D composed of the log data 14 and the map data 30E generated using the data set 20E composed of the log data 16 are generated as the final map data. The map data 30D and the map data 30E are selectively used in accordance with a difference in parameter conditions. According to this, it is possible to generate the map data with high accuracy by eliminating the influence of the combination of parameter conditions defining the log data.

2. Map Data Generation Apparatus

Figure 5:
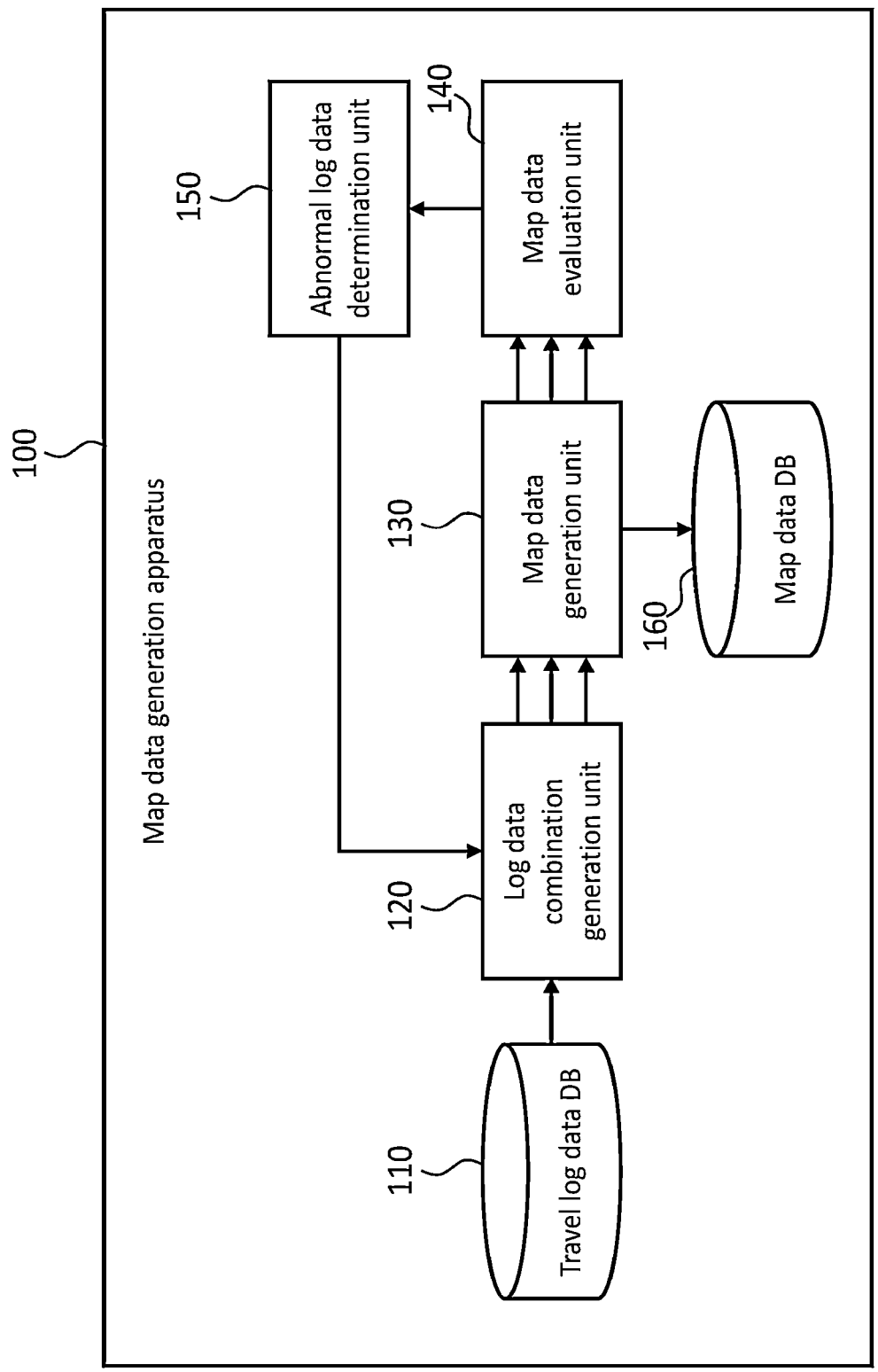
FIG. 5 is a block diagram illustrating functions of a map data generation apparatus according to the embodiment of the present disclosure.

Next, a map data generation apparatus for implementing the map data generation method according to the present embodiment will be described. FIG. 5 is a block diagram illustrating functions of the map data generation apparatus 100 according to the present embodiment.

The map data generation apparatus 100 includes a database and a processing unit. The database constituting the map data generation apparatus 100 includes a travel log data database (hereinafter referred to as a travel log data DB) 110 and a map data database (hereinafter referred to as a map data DB) 160. The processing units included in the map data generation apparatus 100 are a log data combination generation unit 120, a map data generation unit 130, a map data evaluation unit 140, and an abnormal log data determination unit 150.

The travel log data DB 110 is a database in which a large number of log data are stored. The log data acquired by actually driving a vehicle is accumulated in the travel log data DB 110 to form a travel log data group. The vehicle used to acquire the log data may be an autonomous driving vehicle or a vehicle driven by a driver. However, it is preferable that the type, the model, the number, and the installation location of the external sensor (the LiDAR, the camera, the depth sensor, or the like) used to acquire the log data are common to those of the autonomous driving vehicle in which the map data is used in the actual autonomous driving.

The log data includes data of various sensors and output data of each process of automatic driving. The various sensors include, for example, a GPS and an inertial measurement unit (IMU) in addition to the external sensor. The autonomous driving process includes, for example, a self-location estimation result, an object detection result, and a path plan result.

The log data is defined by a plurality of parameters. Examples of parameters and conditions thereof for defining the log data are as follows. One or more of these parameters are used to define the log data. The parameters related to sensors are set for each sensor. Sensors of the same type but different model numbers or different installation locations are handled as different sensors.

Vehicle type name: "Prius, e-Palette, Aqua, etc." "8A2B, 300C, 405D, etc."
Vehicle name: "vehicle 1, vehicle 2, vehicle 3, etc." "Alice, Belle, Cindy, Cindy"
Date and time: "12:00, Aug. 12, 2021, 14:00, Aug. 12, 2021, etc."
Total travel distance: "10 km, 5 km, etc."
Time: "1 hour 21 minutes 14 seconds, 2 hours 3 minutes 43 seconds, etc."
Weather: "sunny, rainy, cloudy, snowy, foggy, etc."
Temperature: "30° C., 20° C., etc." "86° F., 68° F., etc."
Insolation: "0 MJ/m2, 1.0 MJ/m2, etc."
Amount of rainfall: "0 mm/h, 1 mm/h, etc." "0 mm, 2 mm, etc."
Snowfall amount: "0 mm/h, 1 mm/h, etc." "0 mm, 2 mm, etc."
Operator name: "Taro Tanaka, Hanako Yamada, etc." "No. 101, No. 203, etc."
Number of passengers: "0, 1, 5, etc." "vacant, present"
Vehicle speed: "maximum vehicle speed 20 km/h, 40 km/h, etc." "average vehicle speed 10 km/h, 20 km/h, etc."
Presence or absence of sensor: "presence, absence, failure"

Version of sensor: "Ver. 1, Ver. 2, etc." "prototype, confirmed product, mass-produced product"

Version of autonomous driving software: "Ver. 1, Ver. 2, etc." "master, perception_test, planner_test, etc."

Operation method: "manual, automatic, partially automatic"

The log data combination generation unit 120 generates a combination of a plurality of log data, that is, a data set from the log data stored in the travel log data DB 110. The combination of log data constituting a data set is different for each data set. However, the same log data may be included in a plurality of data sets. The data range of the log data read from the travel log data DB 110 can be limited by the above parameters. Examples of data ranges that limit the log data include space, section, time, weather, temperature, vehicle, and sensor type. For example, a data range may be limited to "data taken by the sensor D of the vehicle A during the daytime on a sunny day", and log data in such a data range may be combined to generate a data set.

The map data generation unit 130 generates map data for evaluation using the data set generated by the log data combination generation unit 120. The map data generation unit 130 generates one map data for evaluation for one data set. Thus, the map data generation unit 130 generates a plurality of map data for evaluation, the number of which is the same as the number of data sets generated by the log data combination generation unit 120.

The map data evaluation unit 140 compares the map data generated by the map data generation unit 130 with each other and relatively evaluates them. Since a map is basically in a one to-one relationship with a real environment, the map data should converge uniquely regardless of the combination of log data. However, if a data set includes abnormal log data, the map data generated from the data set also includes an abnormal value. Therefore, the map data evaluation unit 140 detects abnormal map data different from other map data by comparing a plurality of map data generated from different data sets.

The abnormal log data determination unit 150 determines abnormal log data based on the evaluation result of the map data evaluation unit 140. Specifically, the data set used to generate the abnormal map data is compared with the data set used to generate the map data for evaluation other than the abnormal map data. By this comparison, the abnormal travel log data is specified from among the data sets used to generate the abnormal map data. In addition to specifying the abnormal log data, the abnormal log data determination unit 150 can also specify a condition (for example, weather, time of day, sensor failure, and the like) that causes an abnormality in the map data among the conditions of the plurality of parameters that define the log data.

The determination result of the abnormal log data determination unit 150 is transmitted to the log data combination generation unit 120. The log data combination generation unit 120 removes the abnormal log data specified by the abnormal log data determination unit 150 from the plurality of initially generated data sets, and generates a final data set by combining the data sets from which the abnormal log data is removed.

The map data generation unit 130 generates final map data by using the final data set generated by the log data combination generation unit 120, that is, a data set not including abnormal log data. The map data generation unit 130 stores the generated final map data in the map data DB 160.

Figure 6:
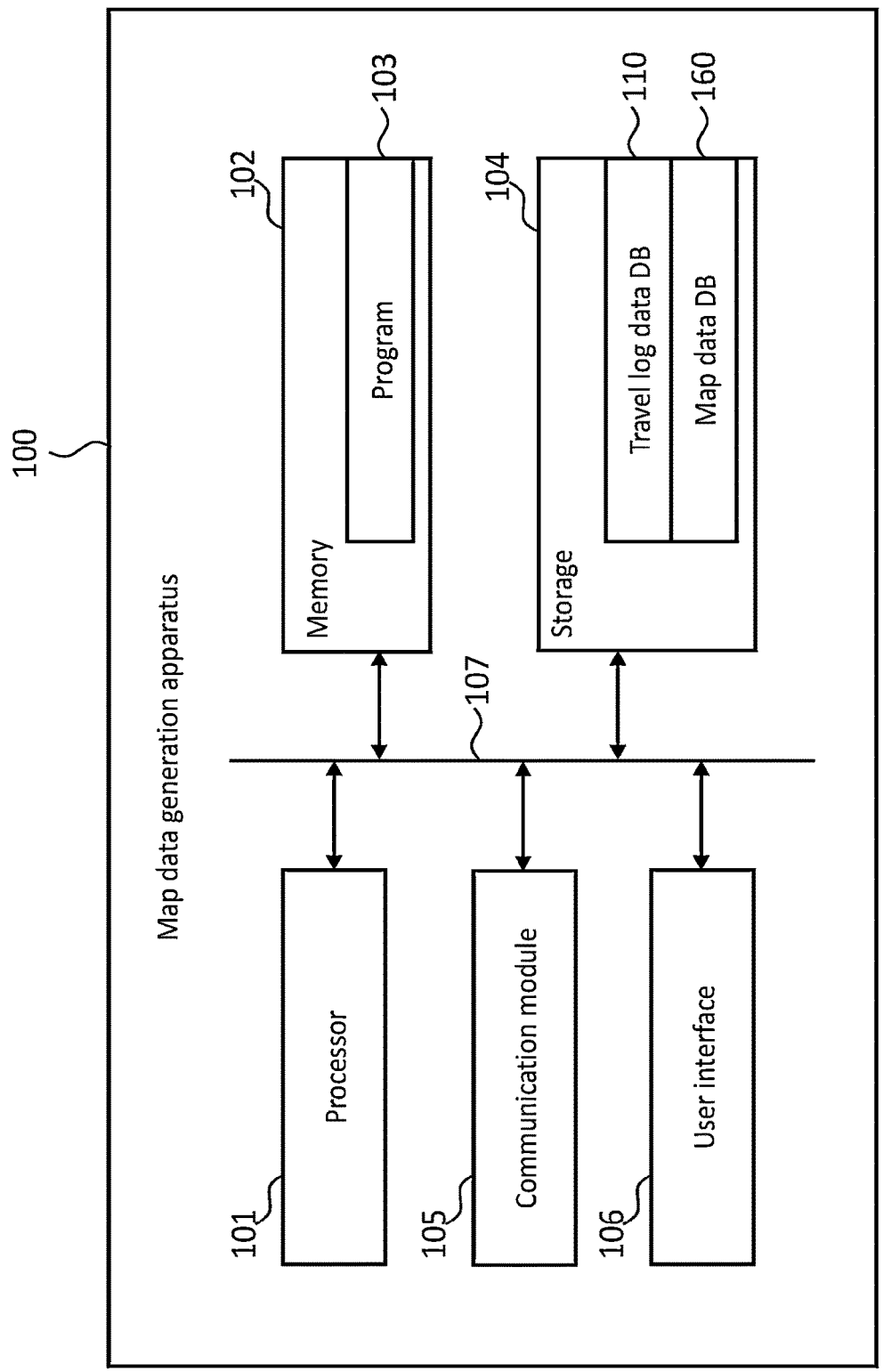
FIG. 6 is a block diagram illustrating an example of a hardware configuration of the map data generation apparatus according to the embodiment of the present disclosure.

Next, an example of a hardware configuration of the map data generation apparatus 100 for realizing the above-described functions will be described with reference to FIG. 6. FIG. 6 is a block diagram illustrating an example of a hardware configuration of the map data generation apparatus 100 according to the present embodiment.

In the example illustrated in FIG. 6, the map data generation apparatus 100 includes a processor 101, a memory 102, a storage 104, a communication module 105, and a user interface 106. These elements constituting the map data generation apparatus 100 are connected to each other by a bus 107.

The processor 101 performs calculation for generating map data. The number of the processors 101 provided in the map data generation apparatus 100 may be one or more (here, it is assumed that one processor is provided).

The memory 102 is a non-transitory program memory that stores a program 103. The program 103 is a computer-executable program (map data generation program) for implementing the map data generation method according to the present embodiment. The program 103 includes a plurality of instructions for causing the processor 101 to perform processing. The program 103 is executed by the processor 101 to cause the processor 101 to function as the log data combination generation unit 120, the map data generation unit 130, the map data evaluation unit 140, and the abnormal log data determination unit 150.

The storage 104 is, for example, an SSD or an HDD. A travel log data DB110 and a map DB160 are stored in the storage 104. The storage in which the travel log data DB110 is provided and the storage in which the map DB160 is provided may be the same or different. The travel log data DB110 may be provided outside the map data generation apparatus 100. The map data DB160 may also be provided outside the map data generation apparatus 100.

The communication module 105 is provided for communication with external devices. A communication method by the communication module 105 may be wireless communication or wired communication. The storing of the log data to the travel log data DB110 and the reading of the map data from the map data DB160 are performed using the communication module 105. The user interface 106 is provided for inputting an operation by an operator of the map data generation apparatus 100 and outputting information to the operator.

3. Specific Example of Map Data Generation Method 3-1. First Example

Next, a specific example of a map data generation method performed by the map data generation apparatus 100 according to the present embodiment will be described. FIGS. 7 to 12 are conceptual diagrams for explaining the first example of the map data generating method. The first example described below corresponds to the above-described first problem and solution therefor.

Figure 7:
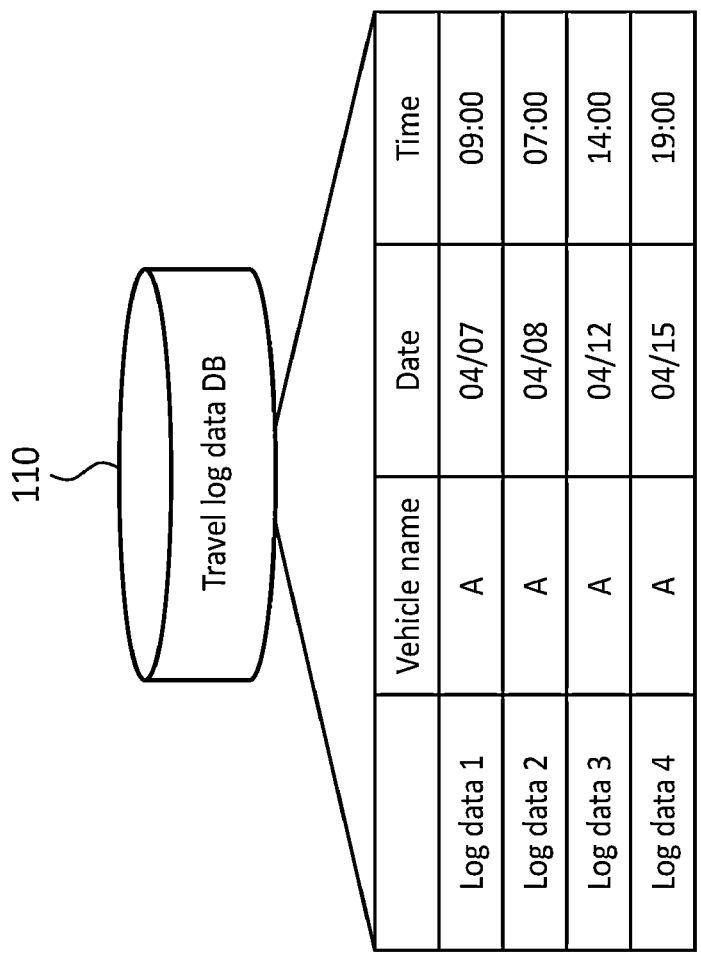
FIG. 7 is a conceptual diagram for explaining a first example of a map data generation method performed by the map data generation apparatus according to the embodiment of the present disclosure, and is a conceptual diagram illustrating an example of a configuration of a travel log data database in the first example.

FIG. 7 is a conceptual diagram illustrating an example of the configuration of the travel log data DB110 in the first example. In the first example, the parameters defining the log data are vehicle name, date and time, and four log data from log data 1 to log data 4 are stored in the travel log data DB110. The content of the log data varies depending on the type of map data to be finally generated. Since the map data generation method according to the present embodiment can be widely applied as long as the map data is generated from the log data, the content of the log data is not limited here.

Figure 8:
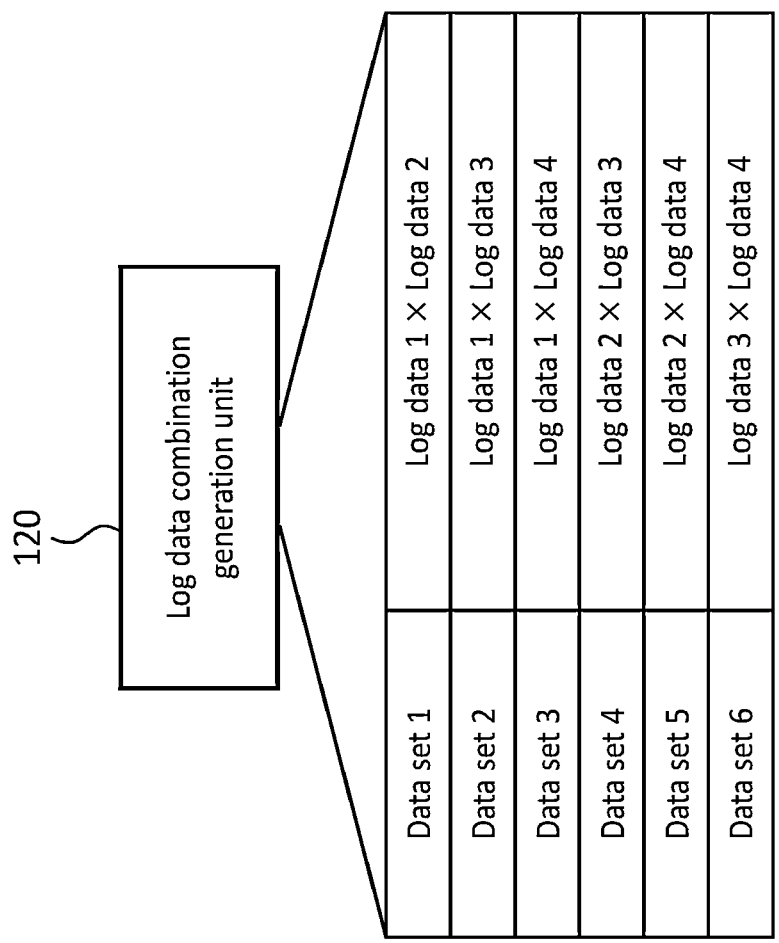
FIG. 8 is a conceptual diagram for explaining the first example of the map data generation method performed by the map data generation apparatus according to the embodiment of the present disclosure, and is a conceptual diagram for explaining log data combination generation processing in the first example.

FIG. 8 is a conceptual diagram for explaining log data combination generation processing performed by the log data combination generation unit 120 in the first example. The log data combination generation unit 120 generates data sets by combining the four log data stored in the travel log data DB 110. If two different log data are combined, six data sets from data set 1 to data set 6 are generated.

Figure 9:
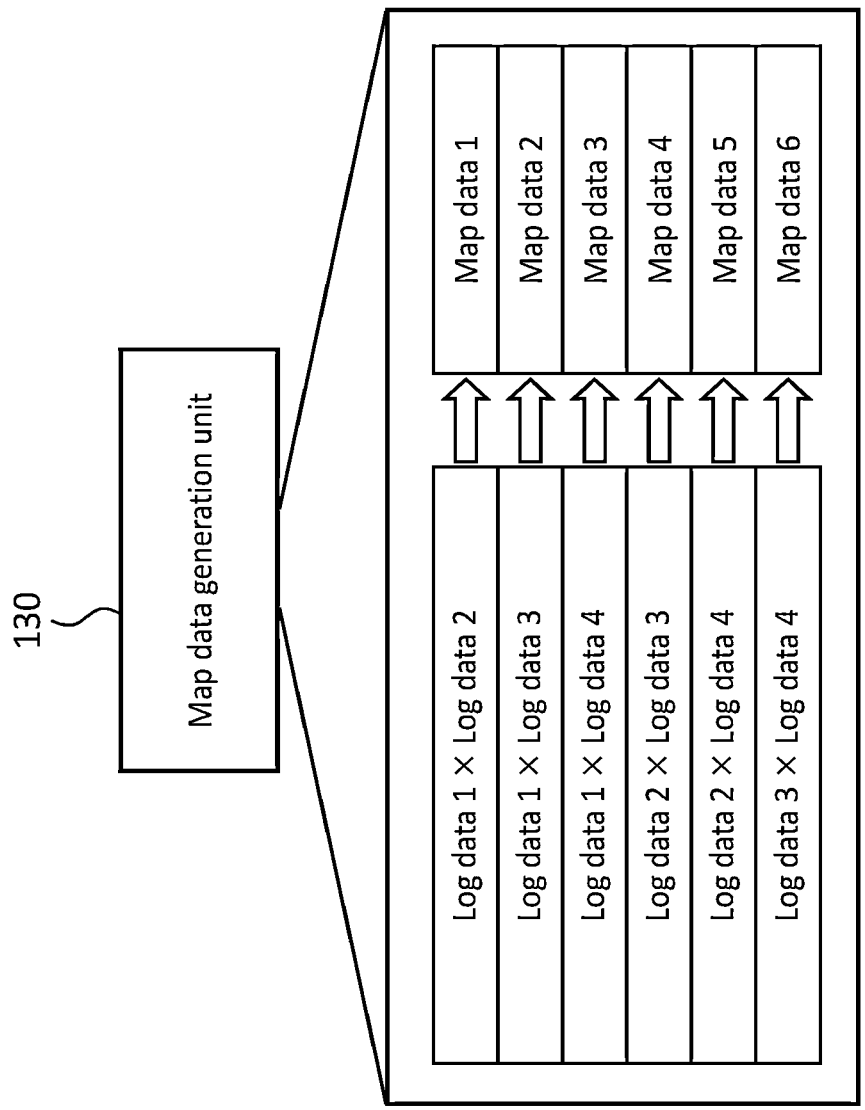
FIG. 9 is a conceptual diagram for explaining the first example of the map data generation method performed by the map data generation apparatus according to the embodiment of the present disclosure, and is a conceptual diagram for explaining map data generation processing in the first example.

FIG. 9 is a conceptual diagram for explaining map data generation processing performed by the map data generation unit 130 in the first example. The map data generation unit 130 generates map data from each of the six data sets generated by the log data combination generation unit 120. Map data 1 is generated from log data 1 and log data 2. Map data 2 is generated from log data 1 and log data 3. Map data 3 is generated from log data 1 and log data 4. Map data 4 is generated from log data 2 and log data 3. Map data 5 is generated from log data 2 and log data 4. Then, map data 6 is generated from log data 3 and log data 4. These six map data are map data for evaluation.

Figure 10:
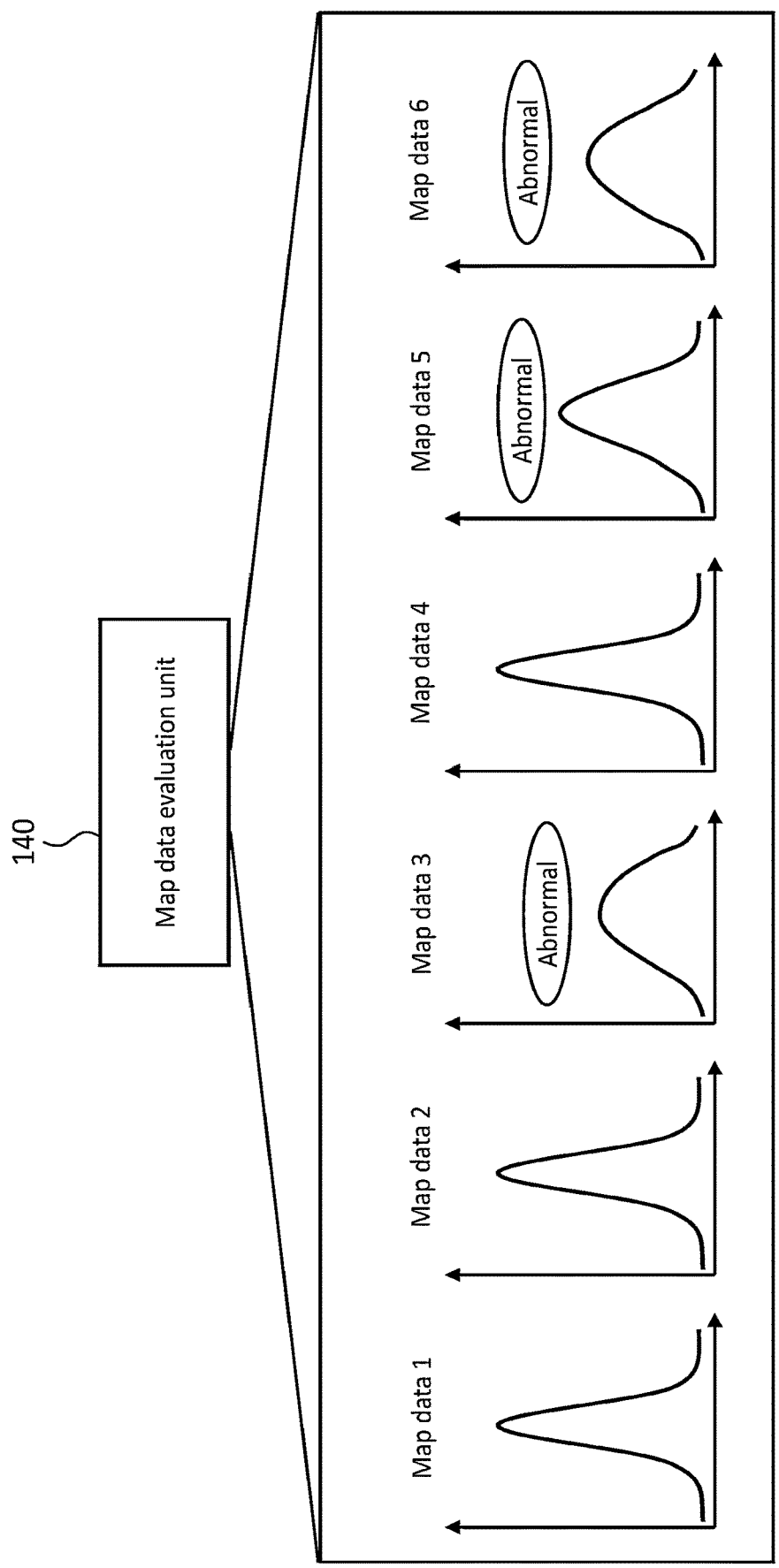
FIG. 10 is a conceptual diagram for explaining the first example of the map data generation method performed by the map data generation apparatus according to the embodiment of the present disclosure, and is a conceptual diagram for explaining map data evaluation processing in the first example.

FIG. 10 is a conceptual diagram for explaining map data evaluation processing performed by the map data evaluation unit 140 in the first example. The map data evaluation unit 140 calculates the degree of variation of element data constituting the map data for each map data. For example, in a case where the map data is data of a feature map, a variation in features of the entire map is calculated. The degree of variation is represented by, for example, a standard deviation or a probability distribution.

In the example shown in FIG. 10, the degree of variation of element data in each map data from map data 1 to map data 6 is represented by a probability distribution. Among them, the probability distributions of map data 1, map data 2, and map data 4 indicate normal distributions, and the degrees of convergence to the average values are substantially the same. On the other hand, the degrees of convergence of map data 3, map data 5, and map data 6 are different from the degrees of convergence of map data 1 and the like, and are different from each other. The map data evaluation unit 140 evaluates map data 1, map data 2, and map data 4 forming a major group as normal map data, and evaluates map data 3, map data 5, and map data 6 out of the group as abnormal map data.

Figure 11:
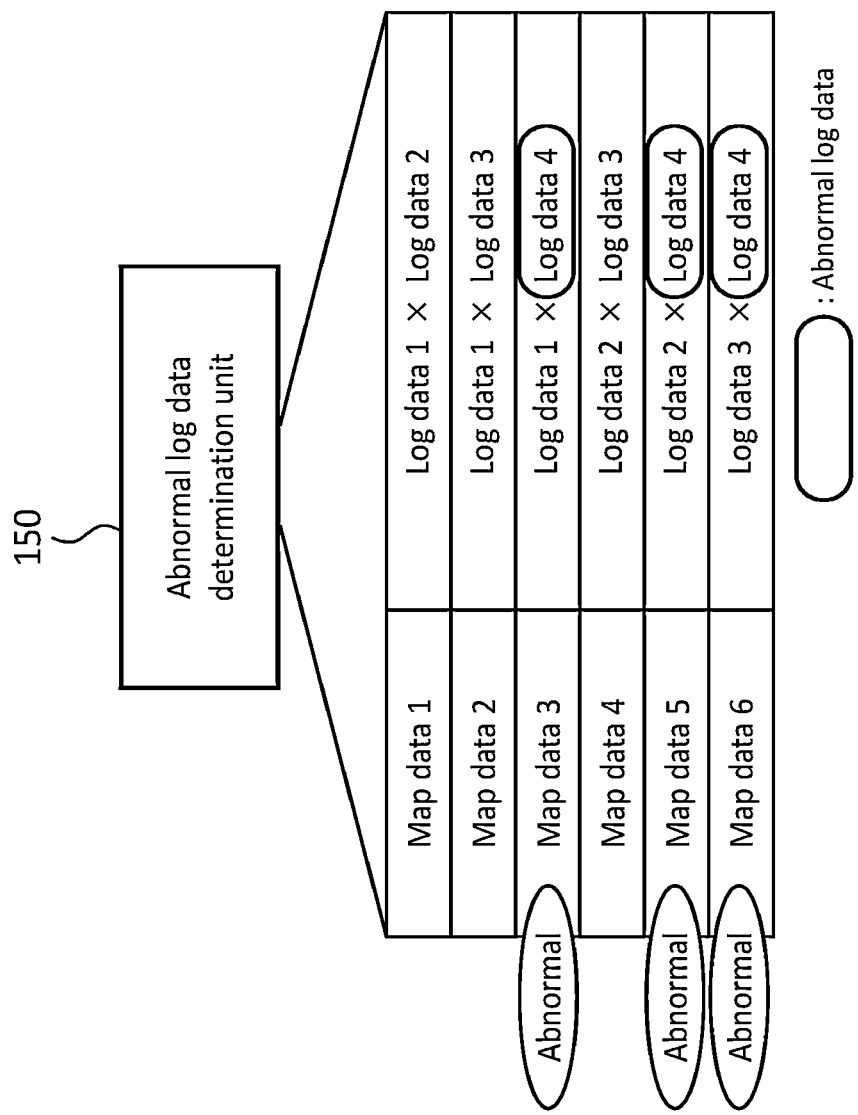
FIG. 11 is a conceptual diagram for explaining the first example of the map data generation method performed by the map data generation apparatus according to the embodiment of the present disclosure, and is a conceptual diagram for explaining abnormal log data determination processing in the first example.

FIG. 11 is a conceptual diagram for explaining abnormal log data determination processing performed by the abnormal log data determination unit 150 in the first example. The abnormal log data determination unit 150 acquires an evaluation result of each map data by the map data evaluation unit 140 and information on the log data used to generate each map data. The map data evaluated as abnormal by the map data evaluation unit 140 are map data 3, map data 5, and map data 6. The log data common to these map data is log data 4. Log data 4 is not used to generate map data 1, map data 2, and map data 4 that are evaluated as normal. Based on such an analysis, the abnormal log data determination unit 150 determines that log data 4 is log data that causes an abnormality in the map data, that is, abnormal log data.

The abnormal log data determination unit 150 transfers a determination result to the log data combination generation unit 120. The log data combination generation unit 120 removes log data 4, which is abnormal log data, from the previously generated data set, and generates a final data set by combining log data 1, log data 2, and log data 3.

Figure 12:
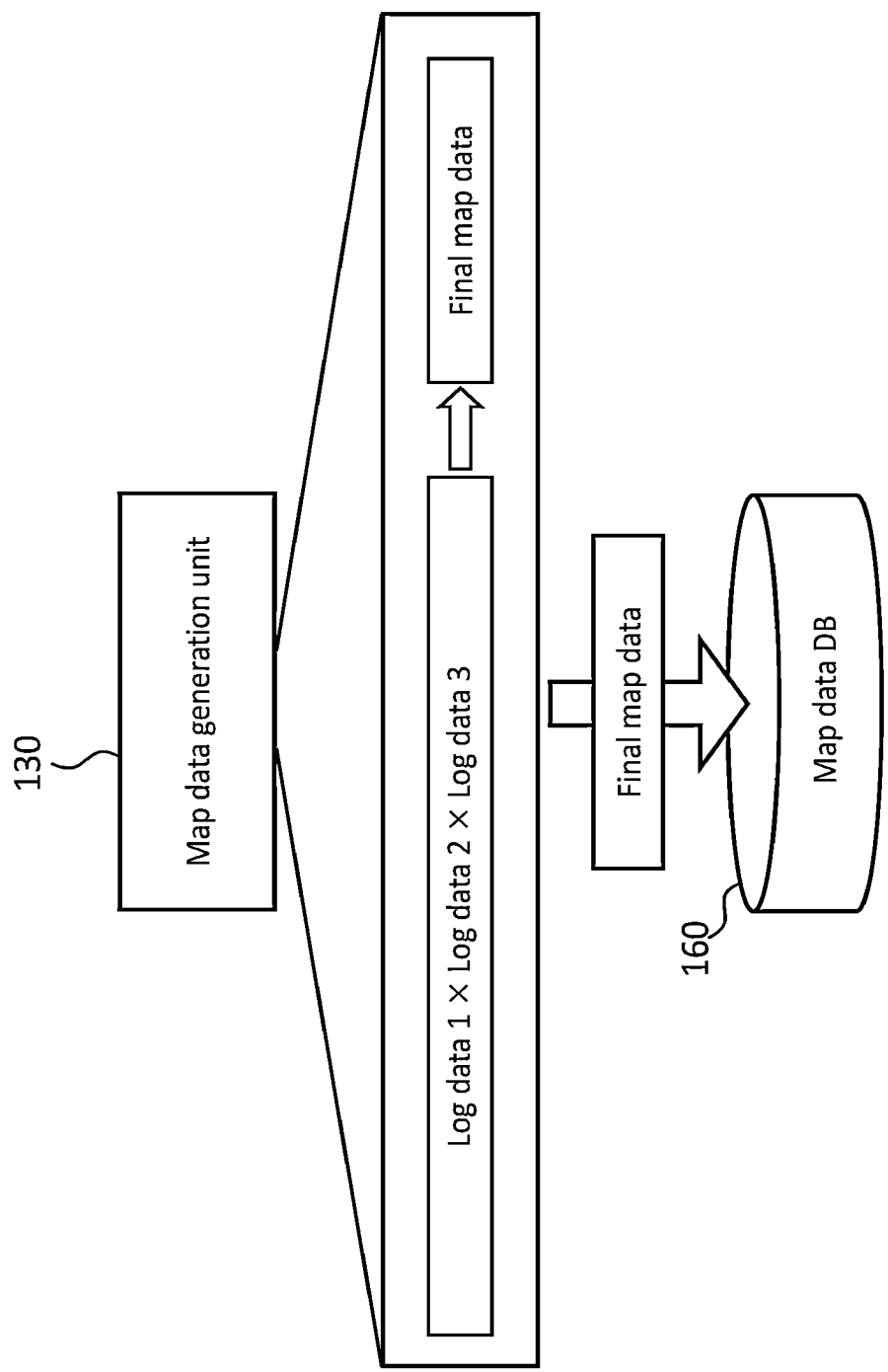
FIG. 12 is a diagram for explaining the first example of the map data generation method performed by the map data generation apparatus according to the embodiment of the present disclosure, and is a conceptual diagram for explaining final map data generation processing in the first example.

FIG. 12 is a conceptual diagram for explaining final map data generation processing performed by the map data generation unit 130 in the first example. The map data generation unit 130 generates final map data using the final data set generated by the log data combination generation unit 120. The final map data is highly accurate map data in which log data 4, which is abnormal data, is not used. The map data generation unit 130 stores the final map-data in the map-data DB160.

Figure 13:
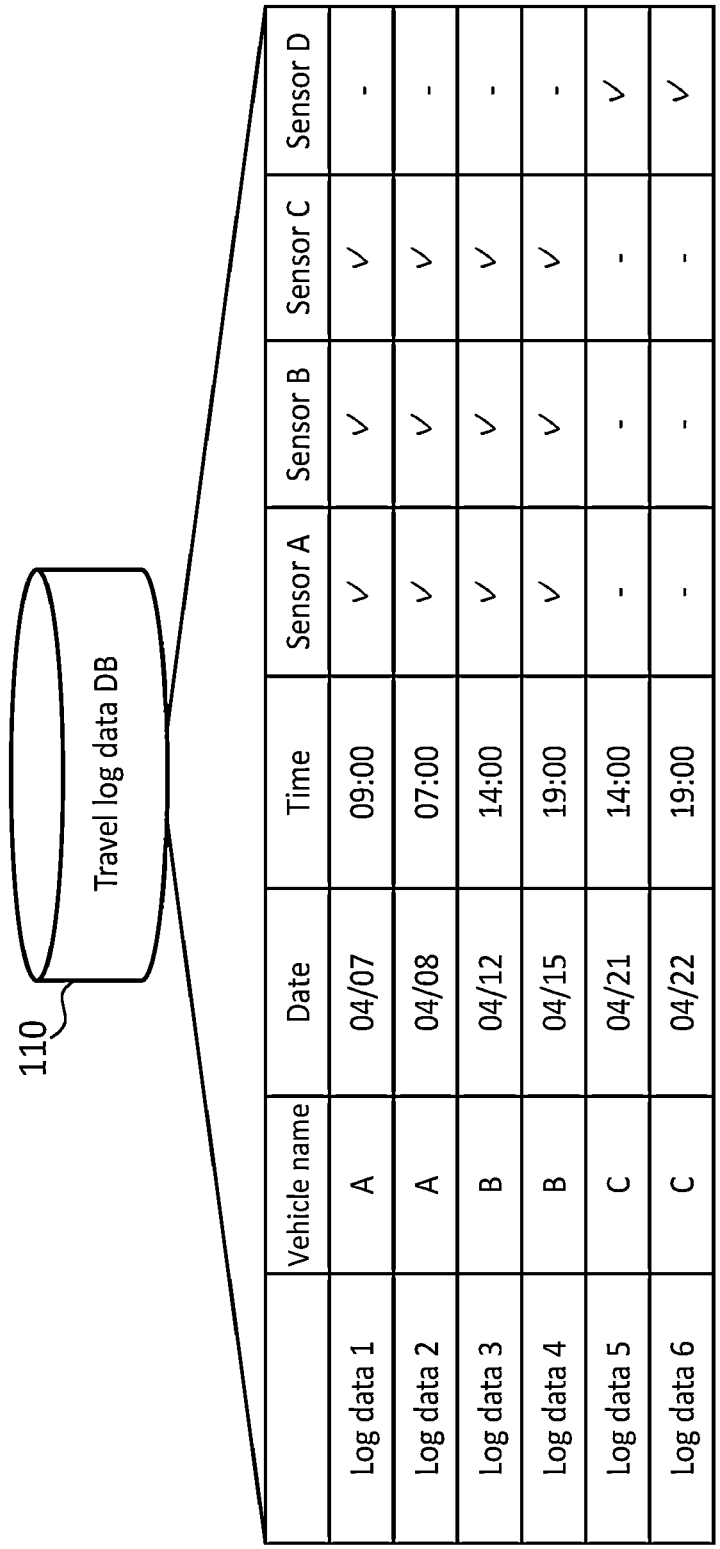
FIG. 13 is a conceptual diagram for explaining a format of travel log data stored in the travel log data database.
Figure 14:
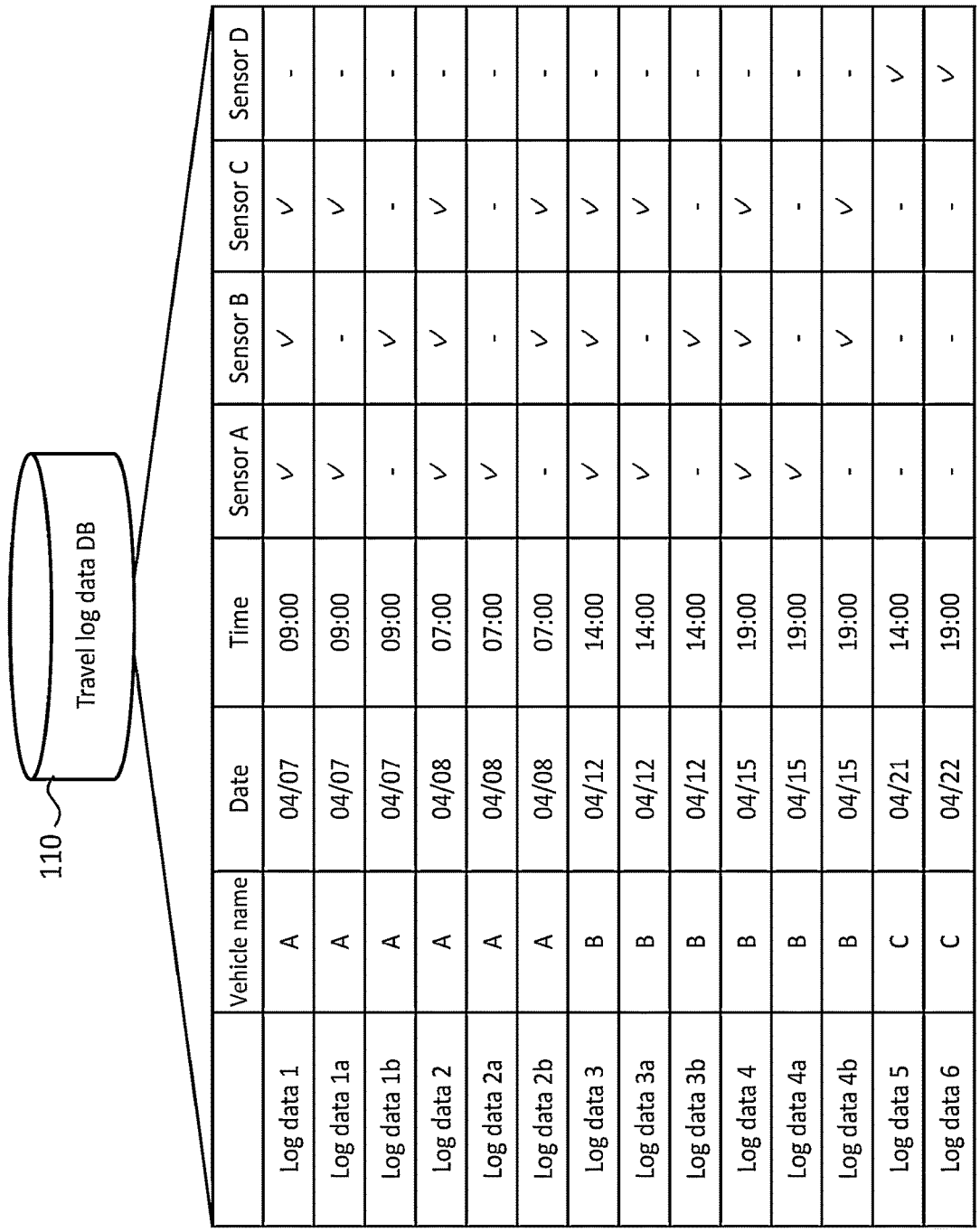
FIG. 14 is a conceptual diagram for explaining the format of travel log data stored in the travel log data database.

Here, the format of the log data stored in the travel log data DB 110 will be described. FIG. 13 and FIG. 14 are conceptual diagrams for explaining the format of the log data stored in the travel log data DB110.

In the example illustrated in FIG. 13, the parameters that define the log data are vehicle name, date, time, and presence or absence of each sensor. Six log data from log data 1 to log data 6 are stored in the travel log data record DB110. Log data 1, log data 2, log data 3, and log data 4 are log data acquired using sensor A, sensor B, and sensor C. Log data 5 and log data 6 are log data acquired using only sensor D.

In the example illustrated in FIG. 13, each data of sensor A, sensor B, and sensor C are collected as one log data. However, data acquired by each of sensor A, sensor B, and sensor C is independent. The type of sensor that acquires log data is not limited. For example, sensor A used to acquire log data 1 to 4 may be a camera, and sensor D used to acquire log data 5 and 6 may be a LiDAR. Even log data acquired by different sensors can be mapped on one map.

In the example illustrated in FIG. 14, the parameters that define the log data are vehicle name, date, time, and presence or absence of each sensor. Fourteen log data are stored in the travel log data record DB110. Log data 1*a* and log data 1*b* are partial data of log data 1. While log data 1 includes data of sensor A, sensor B, and sensor C, log data 1*a* includes data of sensor A and sensor C, and log data 1*b* only includes data of sensor B. Similarly, log data 2*a* and log data 2*b* are partial data of log data 2. Log data 3*a* and log data 3*b* are partial data of log data 3. Log data 4*a* and log data 4*b* are partial data of log data 4.

In order to generate log data 1*a* and 1*b* from log data 1, the log data can be decomposed for each parameter, and the decomposed partial data can be independent log data. The log data can be broken down into any number of parameters. In the example illustrated in FIG. 14, daytime log data and nighttime log data can be generated from each log data. Further, when there is a change in the weather during the acquisition of the log data, the log data can be decomposed for each weather to generate independent log data for each weather.

Figure 15:
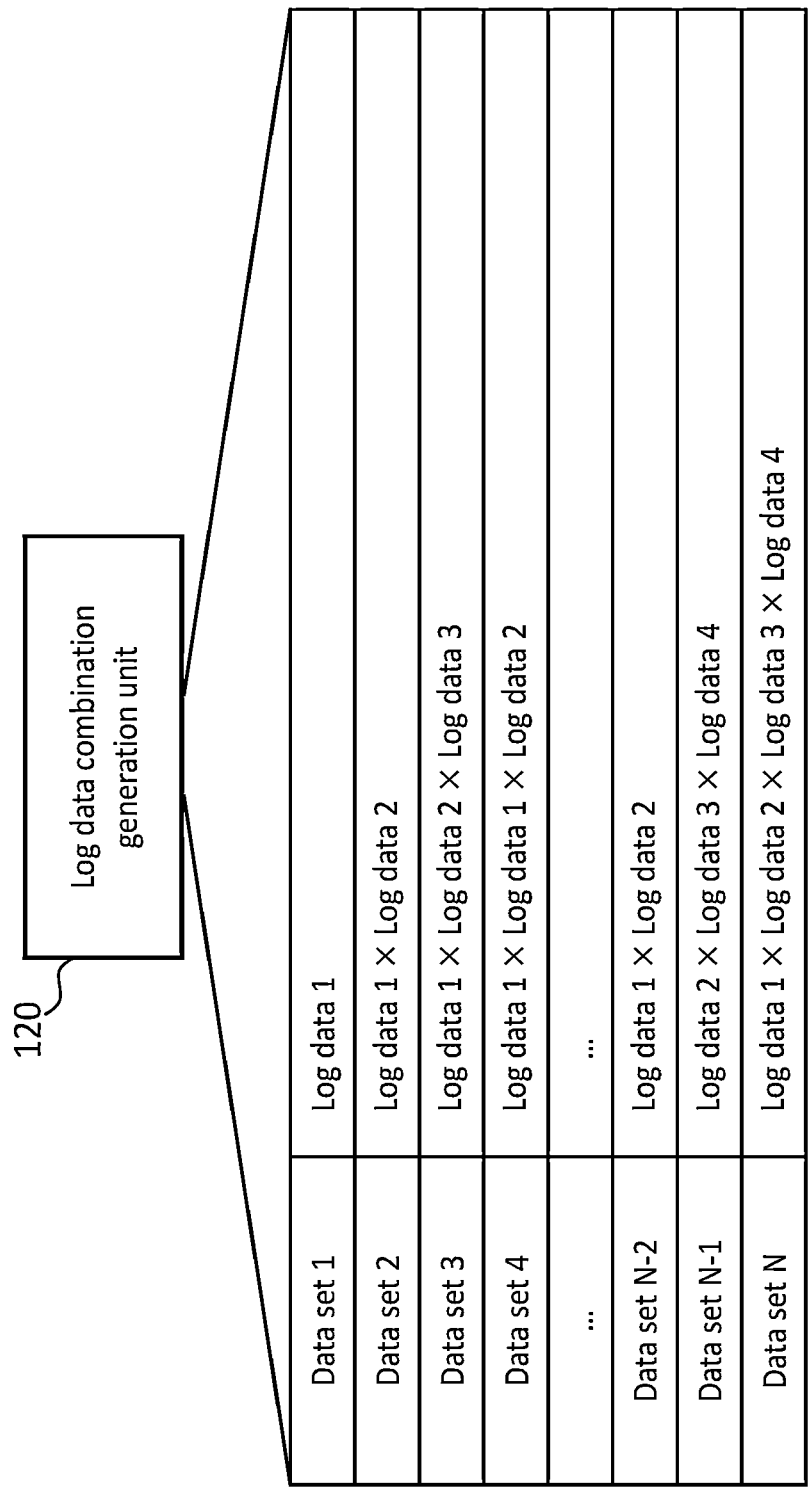
FIG. 15 is a conceptual diagram for explaining a format of a combination of the travel log data in the log data combination generation processing.

Next, a format of the combination of log data in the log data combination generation processing will be described. FIG. 15 is a conceptual diagram for explaining a format of the combination of log data. Note that the number of combinable log data, that is, the number of log data stored in the travel log data DB110 is four, i.e., log data 1 to 4.

In the example illustrated in FIG. 15, data set 2 is a combination of two log data, and data set N is a combination of four log data. As described above, the number of log data included in one data set may not be the same between the data sets. In addition, there may be a data set including only one log data like data set 1, or there may be a data set including all log data like data set N.

In the log data combination generation processing, all possible combinations of log data may not be covered. On the other hand, there may be a combination of overlapping log data such as data set 2 and data set N−2. In addition, a plurality of the same log data may be included in one data set such that two log data 1 are included in data set 4.

3-2. Second Example

FIGS. 16 to 22 are conceptual diagrams for explaining the second example of the map data generation method. As well as the first example, the second example described below corresponds to the above-described first problem and solution therefor.

Figure 16:
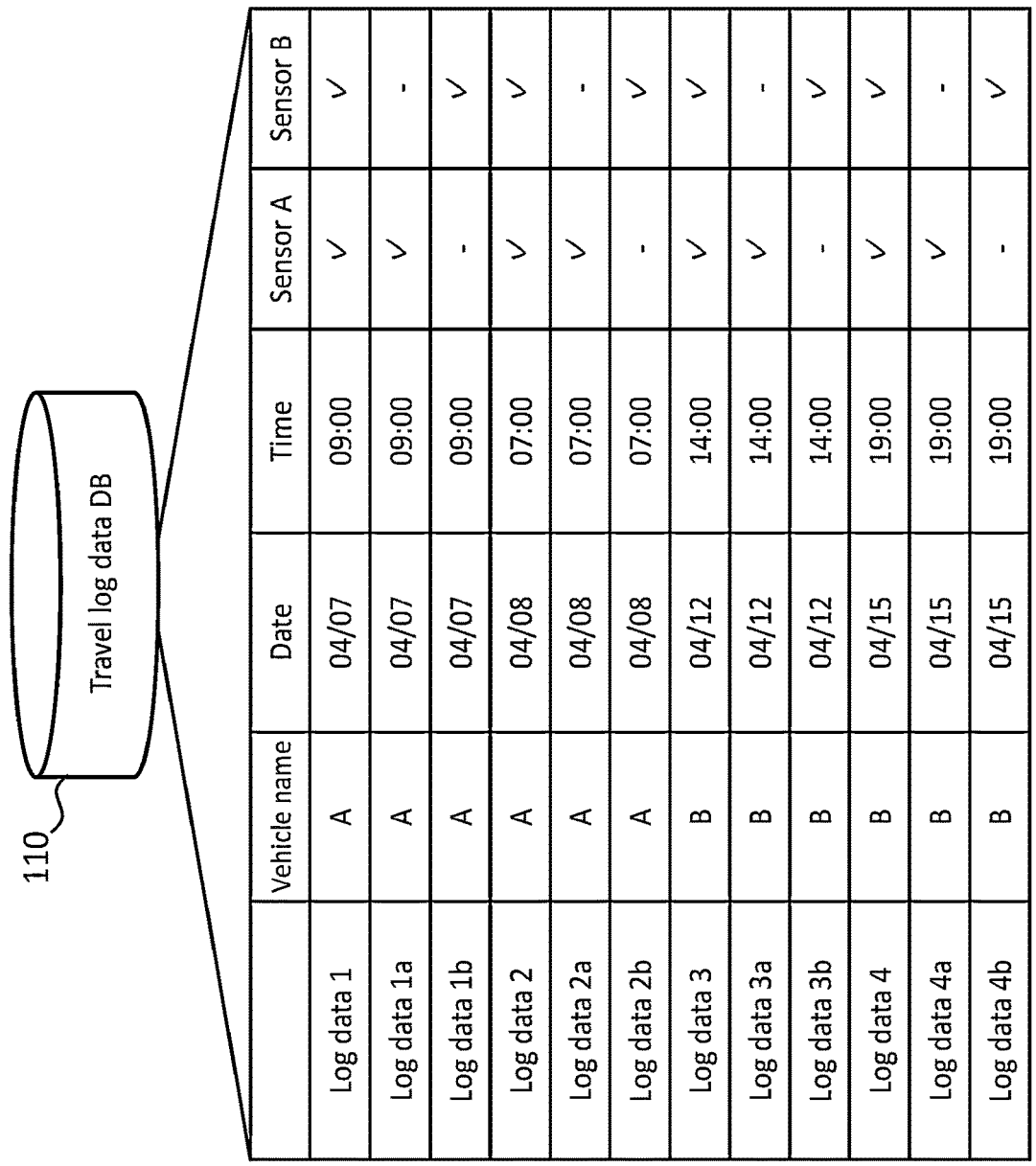
FIG. 16 is a conceptual diagram for explaining a second example of the map data generation method performed by the map data generation apparatus according to the embodiment of the present disclosure, and is a conceptual diagram illustrating an example of a configuration of a travel log data database in the second example.

FIG. 16 is a conceptual diagram illustrating an example of the configuration of the travel log data DB110 in the second example. In the second example, the log data is defined by five parameters: vehicle name, date, time, presence or absence of data of sensor A, and presence or absence of data of sensor B. Log data 1a includes only the data of sensor A, and log data 1b includes only the data of sensor B. These are independent log data generated by dividing log data 1 including data of both sensor A and sensor B. Similarly, log data including only the data of sensor A and log data including only the data of sensor B are generated from log data 2, log data 3, and log data 4. Both sensor A and sensor B are external sensors. Sensor A and sensor B may be sensors of different kinds such as a camera and a LiDAR, sensors of the same kind but different types, or sensors of the same type but different mounting positions on the vehicle.

Figure 17:
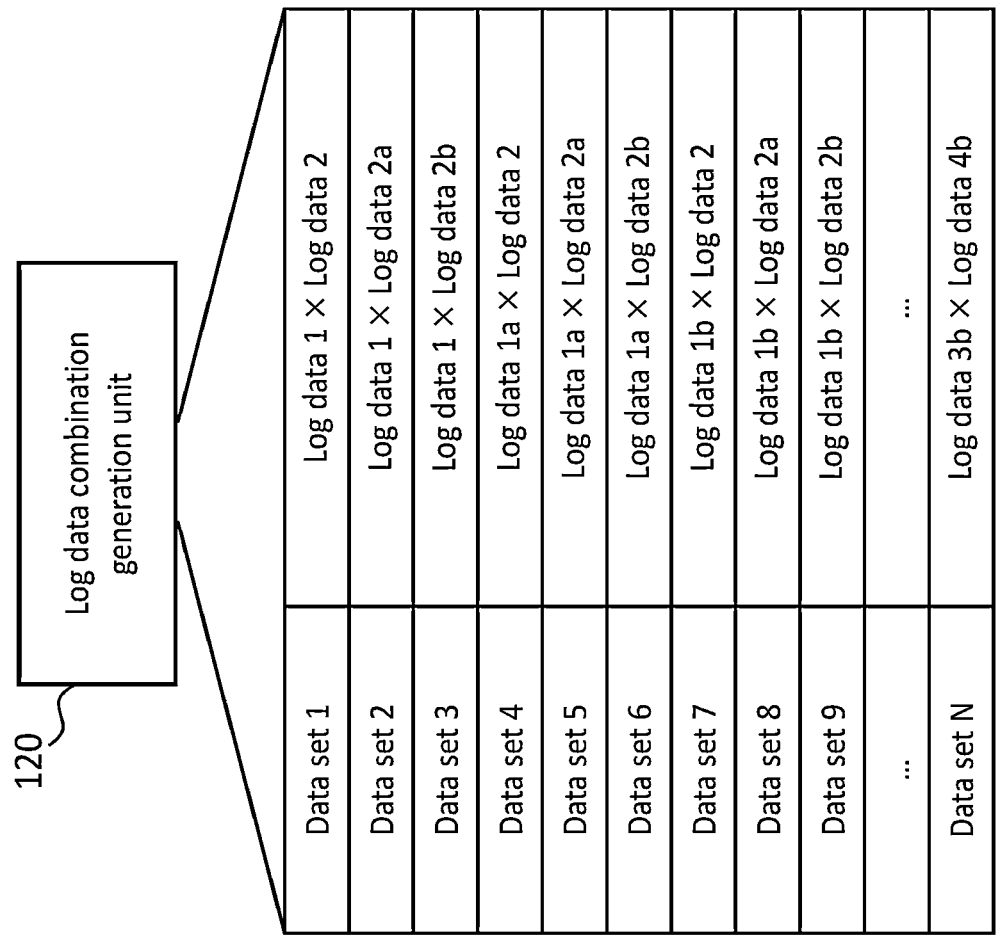
FIG. 17 is a conceptual diagram for explaining the second example of the map data generation method performed by the map data generation apparatus according to the embodiment of the present disclosure, and is a conceptual diagram for explaining log data combination generation processing in the second example.

FIG. 17 is a conceptual diagram for explaining log data combination generation processing performed by the log data combination generation unit 120 in the second example. The log data combination generation unit 120 generates N data sets by combining the twelve log data stored in the travel log data DB 110. Log data 1a and Log data 1b generated from log data 1 are also combined with other log data as independent log data. Although not shown in FIG. 17, log data having a parent-child relationship, such as log data 1 and log data 1a, may be combined. The number of data sets generated by the log data combination generation unit 120 depends on how log data are combined. Here, two log data are combined to generate a data set, but an arbitrary number of log data can be combined as described with reference to FIG. 15.

Figure 18:
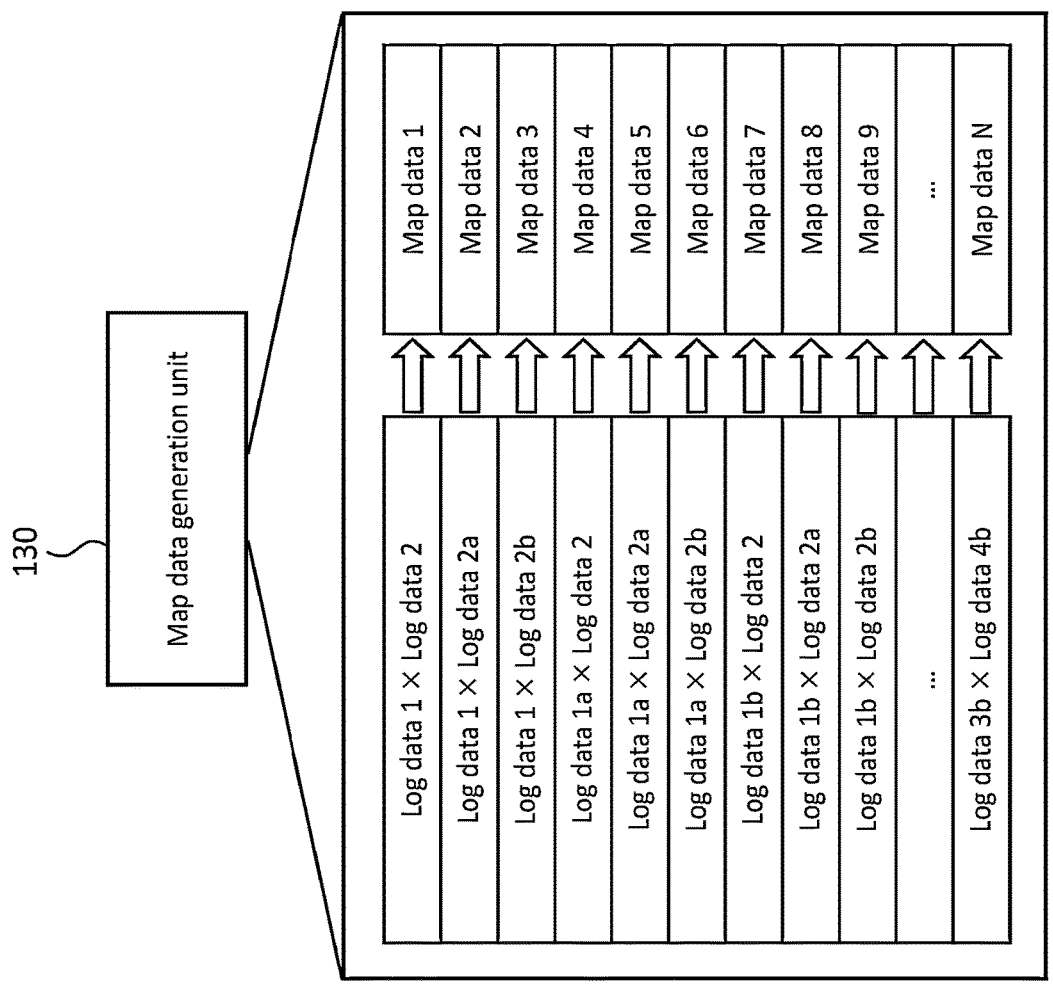
FIG. 18 is a conceptual diagram for explaining the second example of the map data generation method performed by the map data generation apparatus according to the embodiment of the present disclosure, and is a conceptual diagram for explaining map data generation processing in the second example.

FIG. 18 is a conceptual diagram for explaining map data generation processing performed by the map data generation unit 130 in the second example. The map data generation unit 130 generates map data from each of the N data sets generated by the log data combination generation unit 120. A total of N map data generated from each data set are map data for evaluation.

Figure 19:
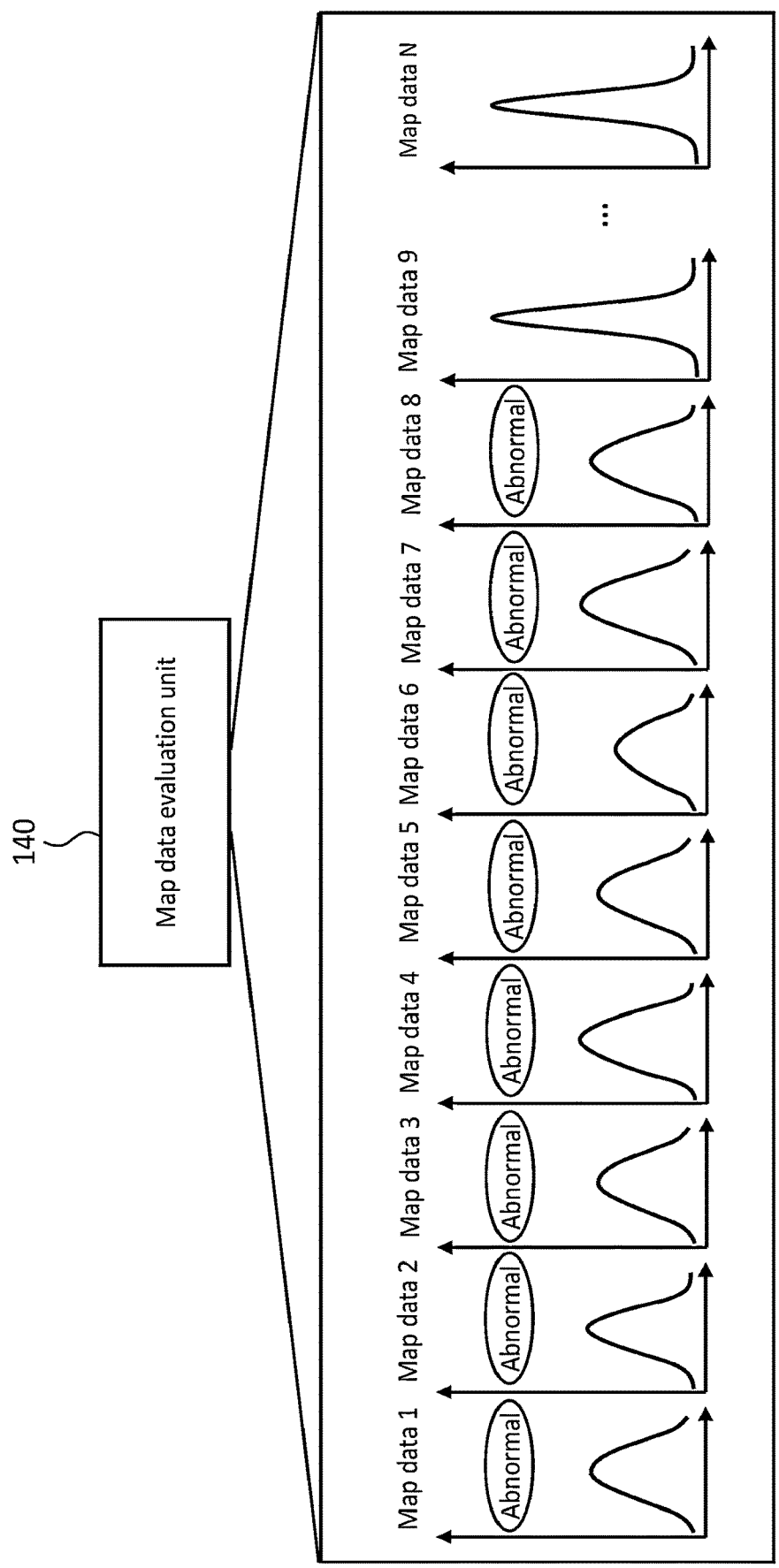
FIG. 19 is a conceptual diagram for explaining the second example of the map data generation method performed by the map data generation apparatus according to the embodiment of the present disclosure, and is a conceptual diagram for explaining map data evaluation processing in the second example.

FIG. 19 is a conceptual diagram for explaining map data evaluation processing performed by the map data evaluation unit 140 in the first example. The map data evaluation unit 140 calculates the degree of variation of element data constituting the map data for each map data. In the example shown in FIG. 19, the degree of variation of element data in each map data from map data 1 to map data N is represented by a probability distribution. Here, it is assumed that at least map data 9 and map data N belong to a major group having substantially the same degree of convergence, and each of the map data 1 to the map data 8 is out of the group. It is also assumed that the degree of convergence is different among the map data from map data 1 to map data 8. In this case, the map data evaluation unit 140 evaluates at least each map data from map data 1 to map data 8 as abnormal map data.

Figure 20:
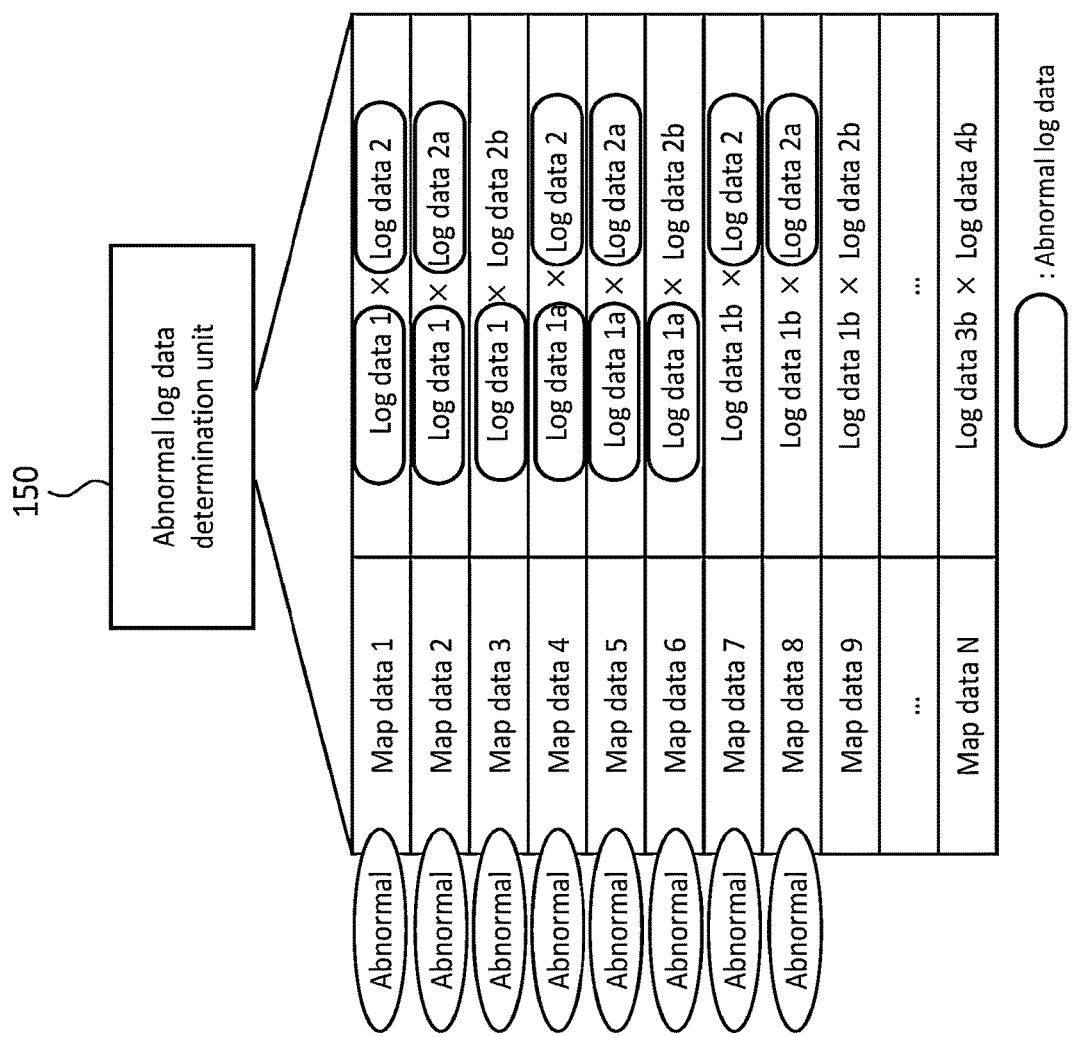
FIG. 20 is a conceptual diagram for explaining the second example of the map data generation method performed by the map data generation apparatus according to the embodiment of the present disclosure, and is a conceptual diagram for explaining abnormal log data determination processing in the second example.

FIG. 20 is a conceptual diagram for explaining abnormal log data determination processing performed by the abnormal log data determination unit 150 in the second example. The abnormal log data determination unit 150 acquires an evaluation result of each map data by the map data evaluation unit 140 and information on the log data used to generate each map data. The map data evaluated as abnormal by the map data evaluation unit 140 are at least map data 1 to map data 8. By comparing the log data used to generate the abnormal map data with the log data used to generate map data 9 evaluated as normal, it is found that log data 1, log data 1a, log data 2, and log data 2a are abnormal.

FIG. 21 is a conceptual diagram for explaining abnormal parameter condition determination processing performed by the abnormal log data determination unit 150 in the second example. The abnormal log data determination unit 150 compares parameter conditions defining log data 1, log data 1a, log data 2, and log data 2a determined to be abnormal log data with parameter conditions defining the other log data. Then, the abnormal log data determination unit 150 specifies parameter conditions common to only abnormal log data among five parameter conditions defining log data 2a. The parameter conditions thus specified are conditions causing an abnormality in the map data. In this example, the presence of data of sensor A is a condition causing an abnormality in the map data. Therefore, the abnormal log data determination unit 150 determines that log data 3, log data 3a, log data 4, and log data 4a including data of sensor A are log data having a high probability of abnormality.

The abnormal log data determination unit 150 transfers a determination result to the log data combination generation unit 120. The log data combination generation unit 120 removes the log data including data of sensor A from the previously generated data set, and generates a final data set by combining only log data 1b, log data 2b, log data 3b, and log data 4b that do not include data of sensor A. In this case, the administrator may be notified that some abnormality has occurred in sensor A. Some abnormality is failure of the sensor, calibration deviation of the sensor, insufficient accuracy of the sensor itself, or the like.

Figure 22:
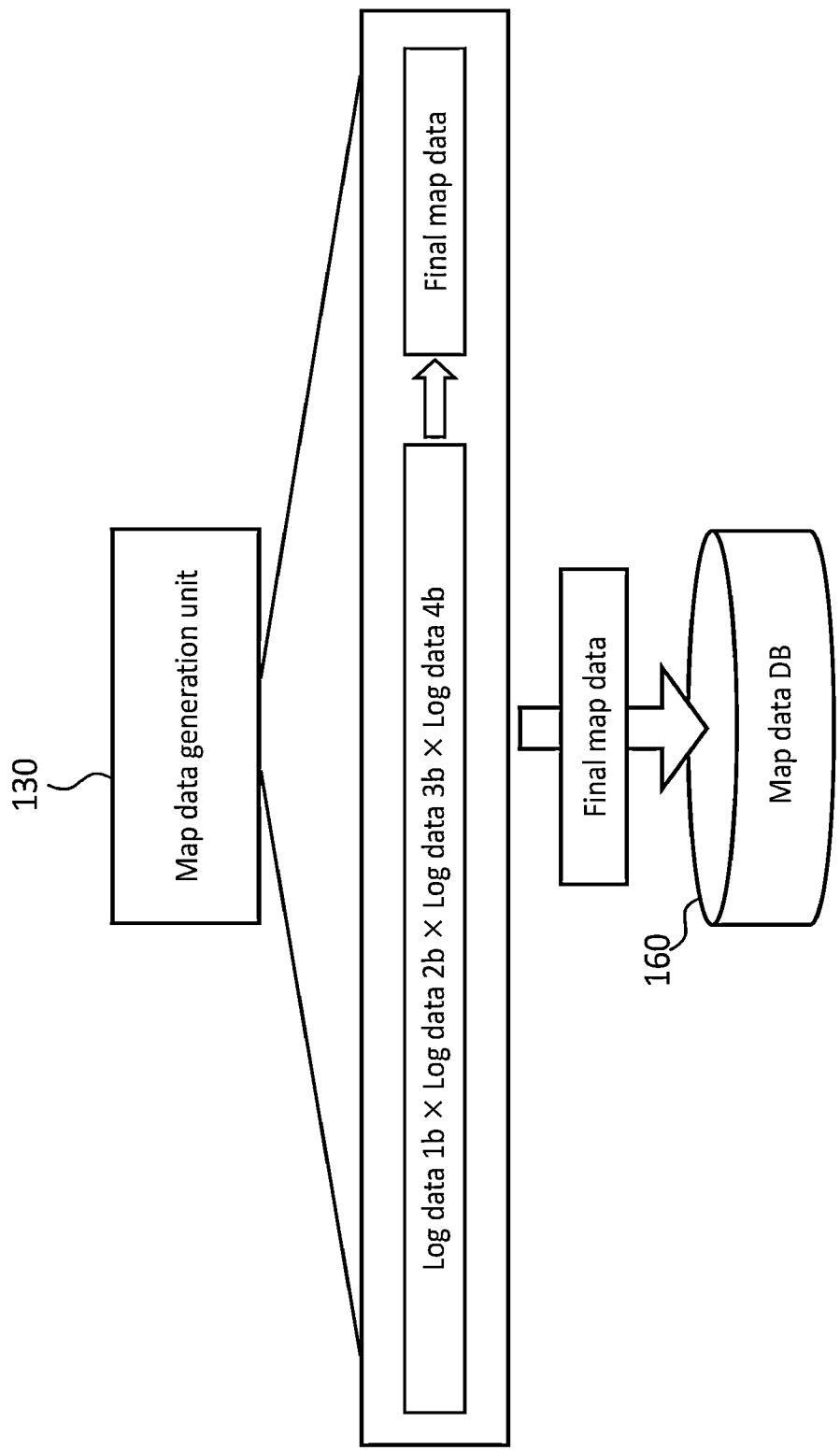
FIG. 22 is a conceptual diagram for explaining the second example of the map data generation method performed by the map data generation apparatus according to the embodiment of the present disclosure, and is a conceptual diagram for explaining final map data generation processing in the second example.

FIG. 22 is a conceptual diagram for explaining final map data generation processing performed by the map data generation unit 130 in the second example. The map data generation unit 130 generates final map data using the final data set generated by the log data combination generation unit 120. The final map data is highly accurate map data in which log data including data of sensor A is not used. The map data generation unit 130 stores the final map data in the map data DB160.

Note that the log data can be divided not only according to the presence or absence of sensor data but also according to various parameter conditions listed above. For example, one log data may be divided into log data acquired during the daytime and log data acquired during the nighttime. One log data may be divided into log data acquired when the vehicle speed is equal to or higher than a predetermined speed and log data acquired when the vehicle speed is lower than the predetermined speed. One log data may be divided into log data acquired during traveling in a predetermined section and log data acquired outside the predetermined section. One log data may be divided into log data acquired during automatic driving and log data acquired during manual driving.

3-3. Third Example

FIGS. 23 to 29 are conceptual diagrams for explaining the third example of the map data generation method. The third example described below corresponds to the above-described second problem and solution therefor.

Figure 23:
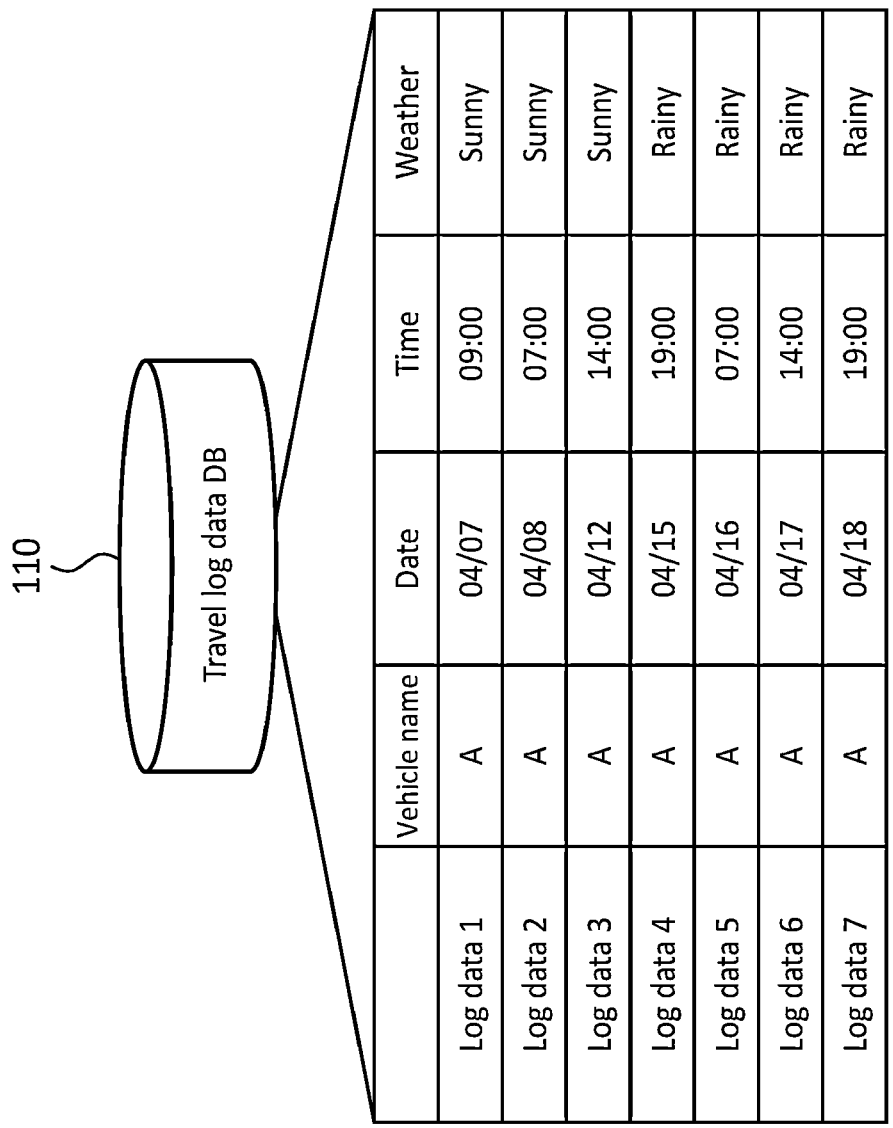
FIG. 23 is a conceptual diagram for explaining a third example of the map data generation method performed by the map data generation apparatus according to the embodiment of the present disclosure, and is a conceptual diagram illustrating an example of a configuration of a travel log data database in the third example.

FIG. 23 is a conceptual diagram illustrating an example of the configuration of the travel log data DB 110 in the third example. In a third example, the log data is defined by four parameters: vehicle name, date, time and weather. Here, it is assumed that there are two types of conditions of the parameter "weather": sunny and rainy.

Figure 24:
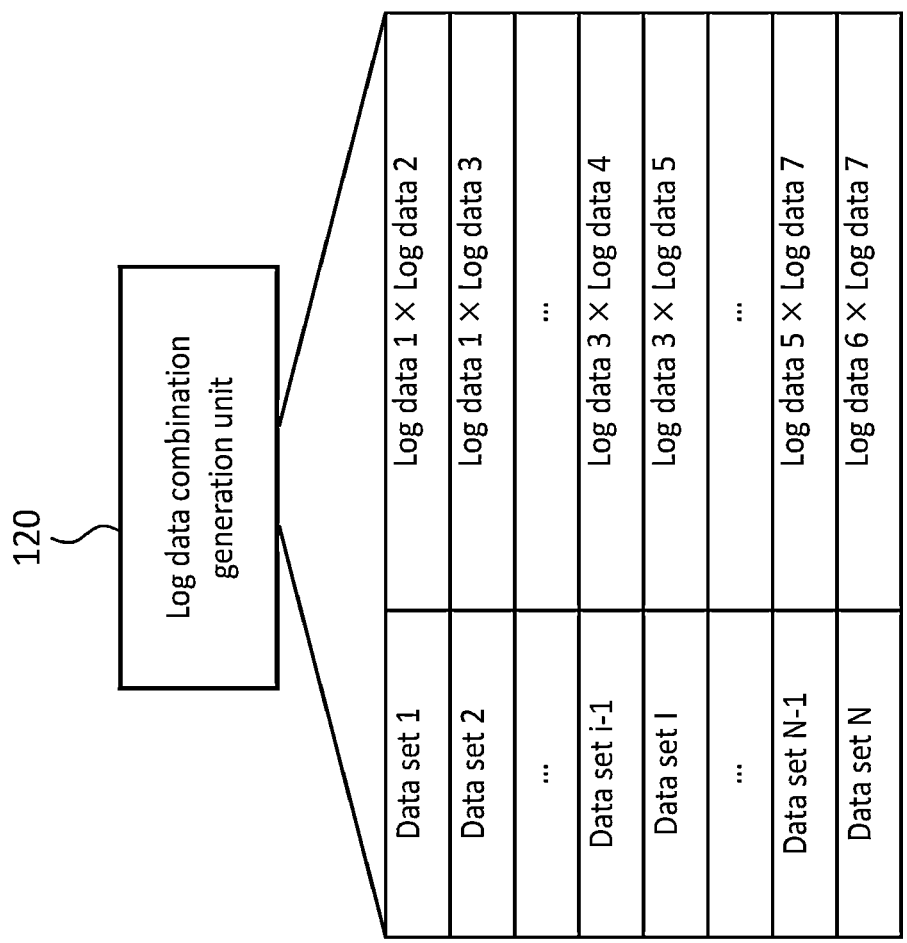
FIG. 24 is a conceptual diagram for explaining the third example of the map data generation method performed by the map data generation apparatus according to the embodiment of the present disclosure, and is a conceptual diagram for explaining log data combination generation processing in the third example.

FIG. 24 is a conceptual diagram for explaining log data combination generation processing performed by the log data combination generation unit 120 in the third example. The log data combination generation unit 120 generates N data sets by combining the seven log data stored in the travel log data DB 110. The number of data sets generated by the log data combination generation unit 120 depends on how log data are combined. Here, two log data are combined to generate a data set, but an arbitrary number of log data can be combined as described with reference to FIG. 15.

Figure 25:
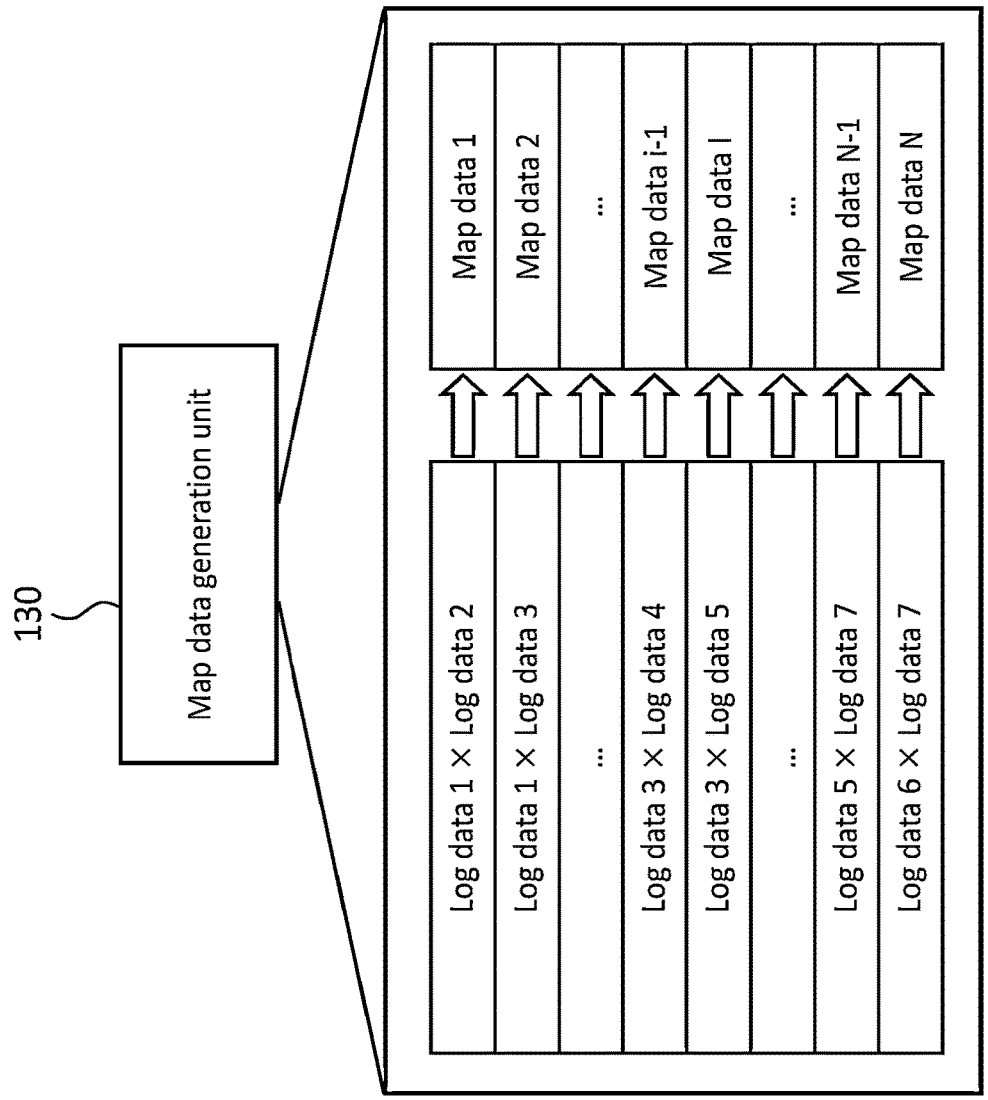
FIG. 25 is a conceptual diagram for explaining the third example of the map data generation method performed by the map data generation apparatus according to the embodiment of the present disclosure, and is a conceptual diagram for explaining map data generation processing in the third example.

FIG. 25 is a conceptual diagram for explaining map data generation processing performed by the map data generation unit 130 in the third example. The map data generation unit 130 generates map data from each of the N data sets generated by the log data combination generation unit 120. For example, map data 1 is generated by log data 1 and log data 2, and map data 2 is generated by log data 1 and log data 3. Map data i-1 is generated by log data 3 and log data 4, and map data i is generated by log data 3 and log data 5. Further, map data N-1 is generated by log data 5 and log data 7, and map data N is generated by log data 6 and log data 7. A total of N map data generated from each data set are map data for evaluation.

Figure 26:
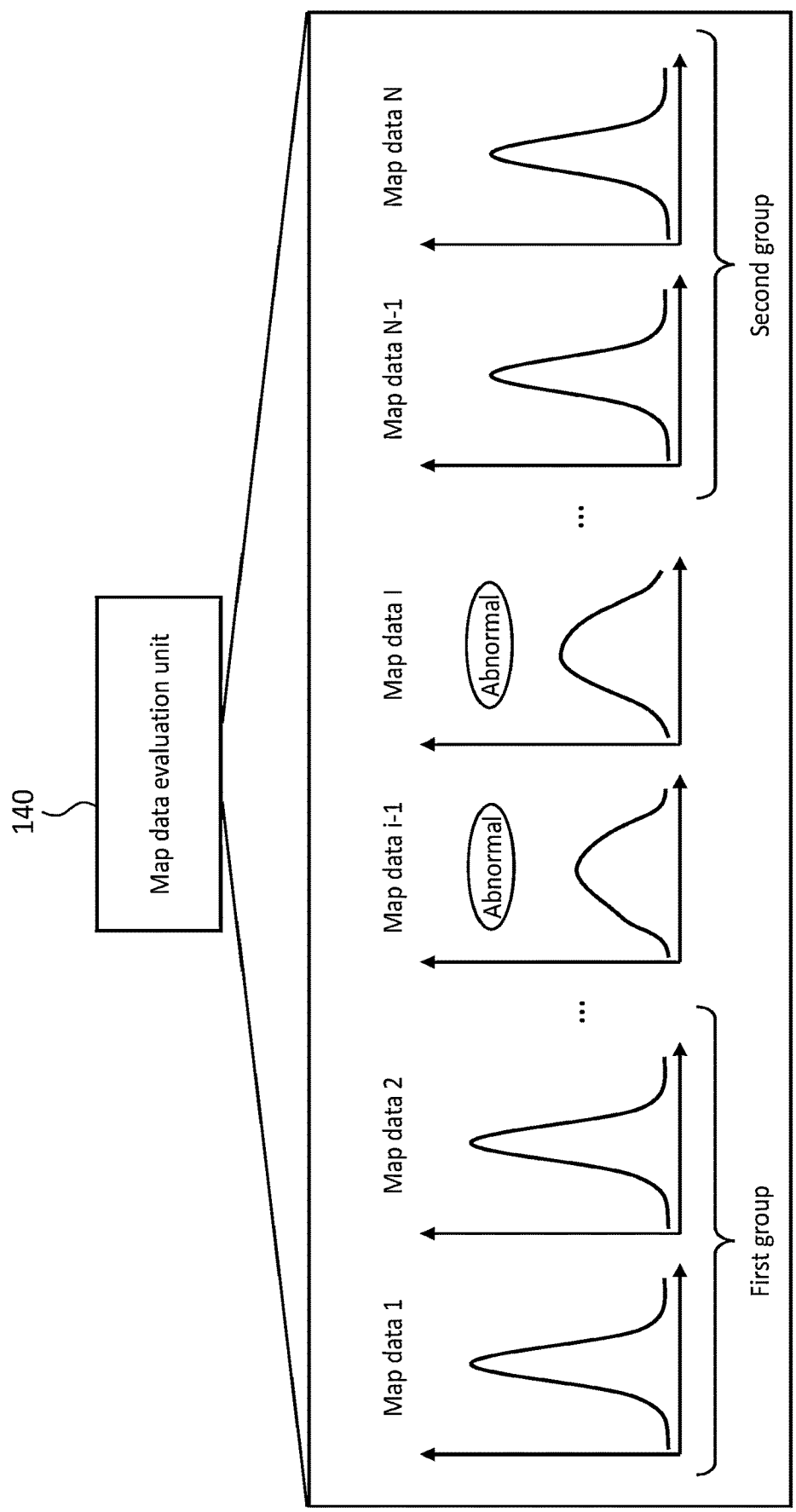
FIG. 26 is a conceptual diagram for explaining the third example of the map data generation method performed by the map data generation apparatus according to the embodiment of the present disclosure, and is a conceptual diagram for explaining map data evaluation processing in the third example.

FIG. 26 is a conceptual diagram for explaining map data evaluation processing performed by the map data evaluation unit 140 in the third example. The map data evaluation unit 140 calculates the degree of variation of element data constituting the map data for each map data. In the example shown in FIG. 26, there are two groups of map data having substantially the same degree of convergence. Map data 1 and map data 2 belong to the first group. Map data N-1 and map data N belong to the second group. Although both the map data belonging to the first group and the map data belonging to the second group show normal distributions, there is a clear difference in the degree of convergence to the average value. On the other hand, at least map data i-1 and map data i do not belong to either the first group or the second group, and their degrees of convergence do not coincide with each other. The map data evaluation unit 140 evaluates map data that does not belong to either the first group or the second group including map data i-1 1 and map data I as abnormal map data.

Figure 27:
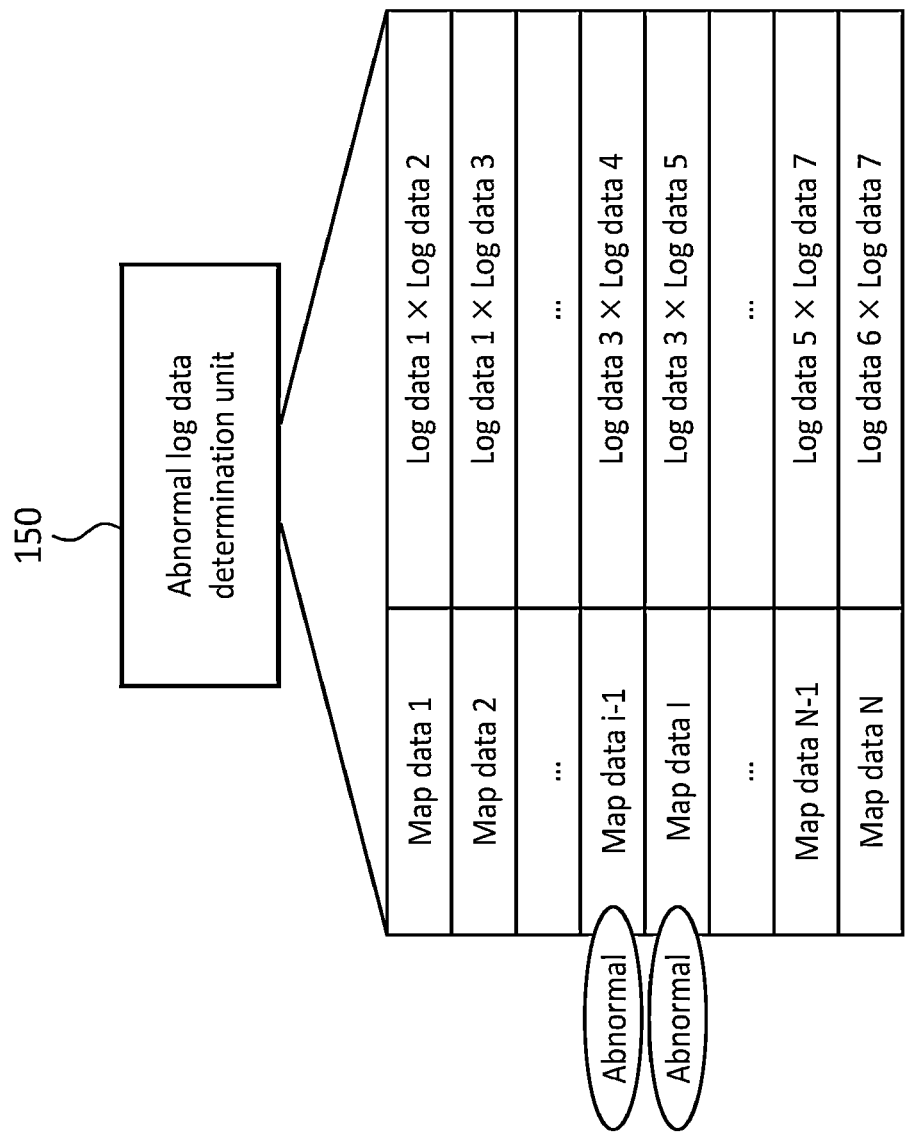
FIG. 27 is a conceptual diagram for explaining the third example of the map data generation method performed by the map data generation apparatus according to the embodiment of the present disclosure, and is a conceptual diagram for explaining abnormal log data determination processing in the third example.

FIG. 27 is a conceptual diagram for explaining abnormal log data determination processing performed by the abnormal log data determination unit 150 in the third example. The abnormal log data determination unit 150 acquires an evaluation result of each map data by the map data evaluation unit 140 and information on the log data used to generate each map data. Then, the abnormal log data determination unit 150 compares the log data used to generate the map data evaluated as abnormal by the map data evaluation unit 140 with the log data used to generate the map data evaluated as normal by the map data evaluation unit 140. In the example shown in FIG. 27, it can be seen from the comparison result that there is no specific log data causing an abnormality in the map data. In this case, a combination of log data, more specifically, a combination of parameter conditions defining the log data is assumed as a cause of occurrence of abnormality in the map data.

Figure 28:
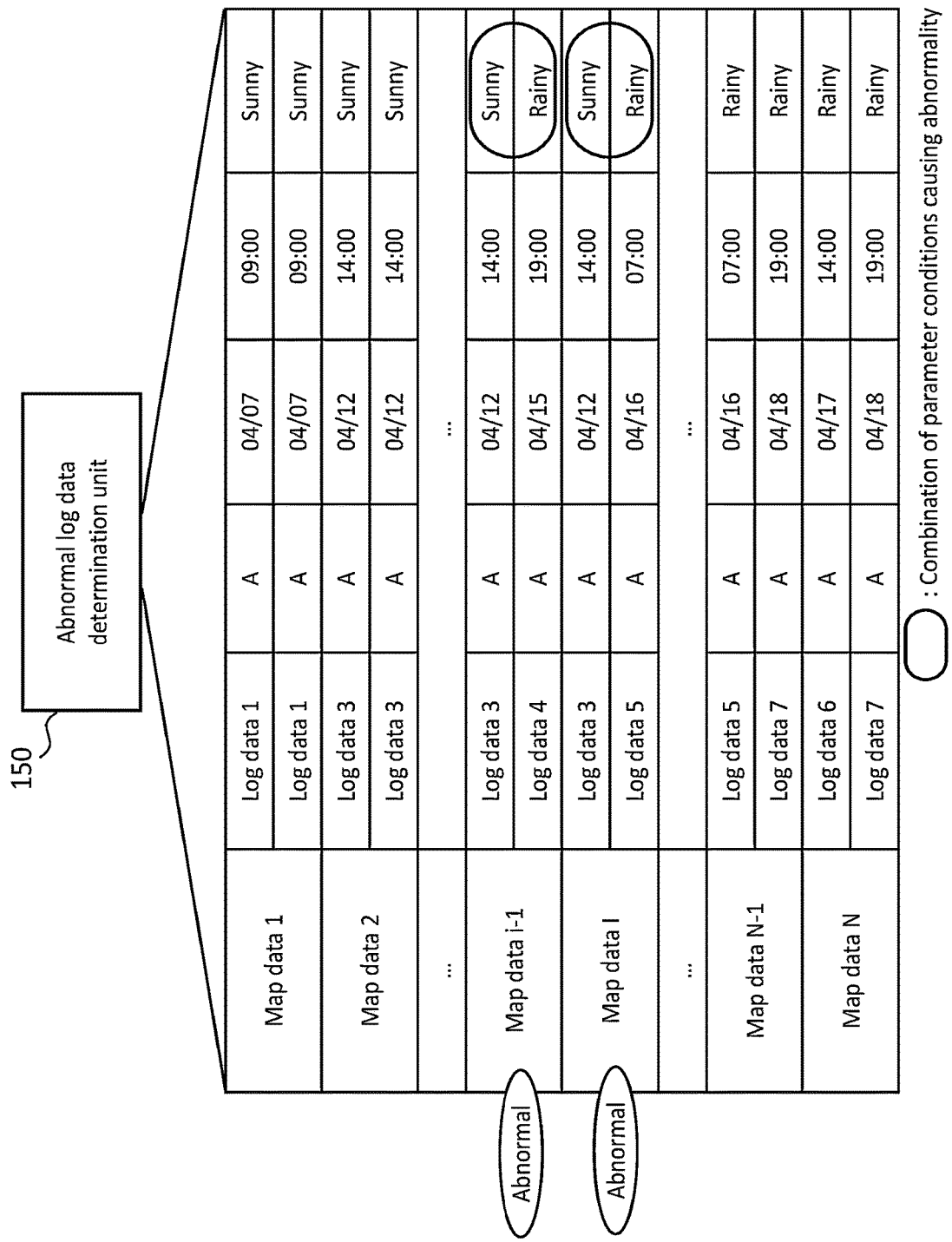
FIG. 28 is a conceptual diagram for explaining the third example of the map data generation method performed by the map data generation apparatus according to the embodiment of the present disclosure, and is a conceptual diagram for explaining abnormal combination determination processing in the third example.

FIG. 28 is a conceptual diagram for explaining abnormal combination determination processing performed by the abnormal log data determination unit 150 in the third example. The abnormal log data determination unit 150 compares parameter conditions among the log data used for generating map data evaluated as abnormal. For map data i-1, the parameter conditions are compared between log data 3 and log data 4. For the map data i, the parameter conditions are compared between log data 3 and log data 5. Based on the comparison results, the abnormal log data determination unit 150 determines that the combination of the log data in which the condition of the parameter "weather" is sunny and the log data in which the condition of the parameter "weather" is rainy is the cause of the occurrence of abnormality in the map data.

That is, even if the log data acquired on a sunny day and the log data acquired on a rainy day are normal log data, they may not be combined. This will be described by taking a white line in a feature map as an example. When the external sensor that acquires features is a camera, the white line can be clearly captured by the camera on a sunny day, but it is difficult to capture the white line by the camera on a rainy day. Therefore, the variance of features acquired on a sunny day is small and the degree of convergence is high, whereas the variance of features acquired on a rainy day is likely to be large. As the result, although matching can be achieved between features acquired on a sunny day and also matching can be achieved between features acquired on a rainy day, matching cannot be achieved between features acquired on a sunny day and features acquired on a rainy day, and inconsistency of features causes an abnormality in the map data.

The abnormal log data determination unit 150 transfers a determination result to the log data combination generation unit 120. In response to the determination result, the log data combination generation unit 120 generates a data set that combines only log data acquired on a sunny day and a data set that combines only log data acquired on a rainy day.

Figure 29:
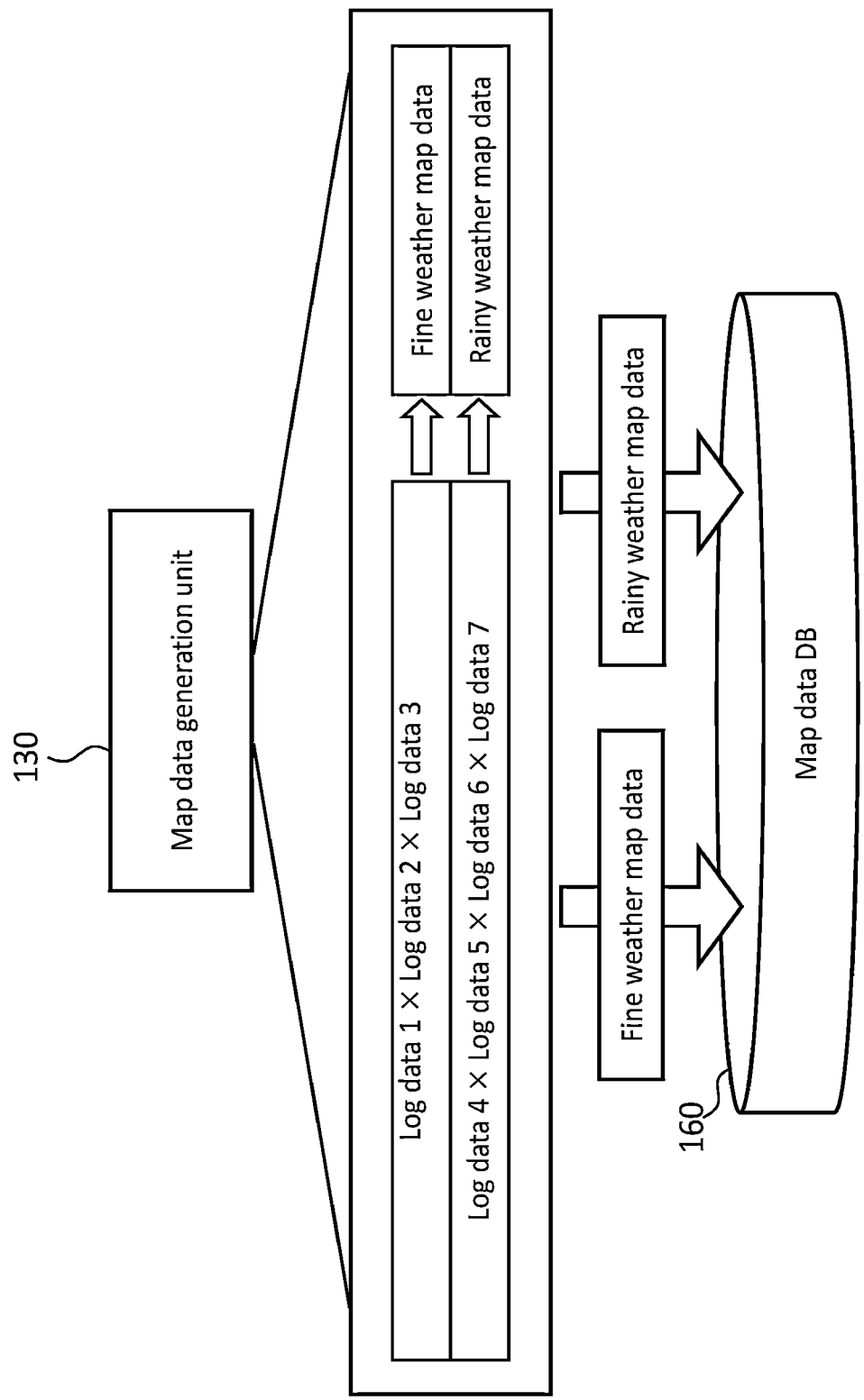
FIG. 29 is a conceptual diagram for explaining the third example of the map data generation method performed by the map data generation apparatus according to the embodiment of the present disclosure, and is a conceptual diagram for explaining final map data generation processing in the third example.

FIG. 29 is a conceptual diagram for explaining final map data generation processing performed by the map data generation unit 130 in the third example. The map data generation unit 130 generates final map data using the final data set generated by the log data combination generation unit 120. The final map data generated by the map data generation unit 130 is two types of map data, map data for fine weather and map data for rainy weather. The map data for fine weather is generated by using only log data 1, log data 2, and log data 3 acquired on a fine day. On the other hand, the map data for rainy weather is generated using only log data 4, log data 5, log data 6, and log data 7 acquired on a rainy day. The map data generation unit 130 separately stores the map data for fine weather and the map data for rainy weather in the map data DB160.

The map date for fine weather stored in the map data DB160 is used for autonomous driving on a fine day. On the other hand, the map data for rainy weather is used for autonomous driving on a rainy day. When the external sensor is a camera, it is difficult to recognize the white line on a rainy day. Therefore, in the map data for rainy weather, the weight of features of a curb that is relatively easy to recognize even on a rainy day is increased, and the weight of features of the white line is decreased. As a result, the map data for fine weather can achieve high accuracy in autonomous driving on a fine day, while the map data for rainy weather can achieve high accuracy in autonomous driving on a rainy day.

It should be noted that the parameter "weather" given as an example here is an example of a parameter in which a combination of conditions may cause an abnormality in the map data. In addition to weather, parameters such as vehicle type, time period (daytime or nighttime), sensor type (LiDAR or camera), and map generation algorithm can cause map data an abnormality depending on a combination of conditions. In addition, even if the types of sensors are the same, if there is a difference in performance, map data may be generated for each sensor. For example, there is a difference in the weight of curbs as features in the map data between a LiDAR that easily detects curbs and a LiDAR that hardly detects curbs. For this reason, it is preferable to handle the log data acquired by the two LiDARs as different categories and separately generate map data using the respective log data.

4. Specific Example of Map Data Evaluation Processing

4-1. Map Data Evaluation Processing for Feature Map

4-1-1. Outline of Feature Map

In the above description, the degree of variation of the element data constituting the map data (the degree of convergence of the map data) is visually expressed by the probability distribution. However, this is an example of an evaluation method for specifying the map data having an abnormality, and it is not always necessary to perform evaluation by observing only the degree of convergence of a certain statistical numerical value. Hereinafter, an outline of a map actually used in the autonomous driving system will be described, and a specific example of the map data evaluation processing corresponding to each map will be described. FIGS. 30 to 50 are diagrams for explaining a specific example of the map data evaluation processing performed by the map data generation apparatus 100 according to the present embodiment.

First, the feature map will be described. The feature map is map data used by the autonomous driving vehicle for the self-location estimation. The feature map is generated by superimposing unique features acquired from sensor data of the LiDAR or the camera and performing optimization calculation, specifically, simultaneous localization and mapping (SLAM). Since distance accuracy is required in automatic driving, the LiDAR is an example of a preferable external sensor. In the example described below, the feature is acquired by the LiDAR.

Figure 30:
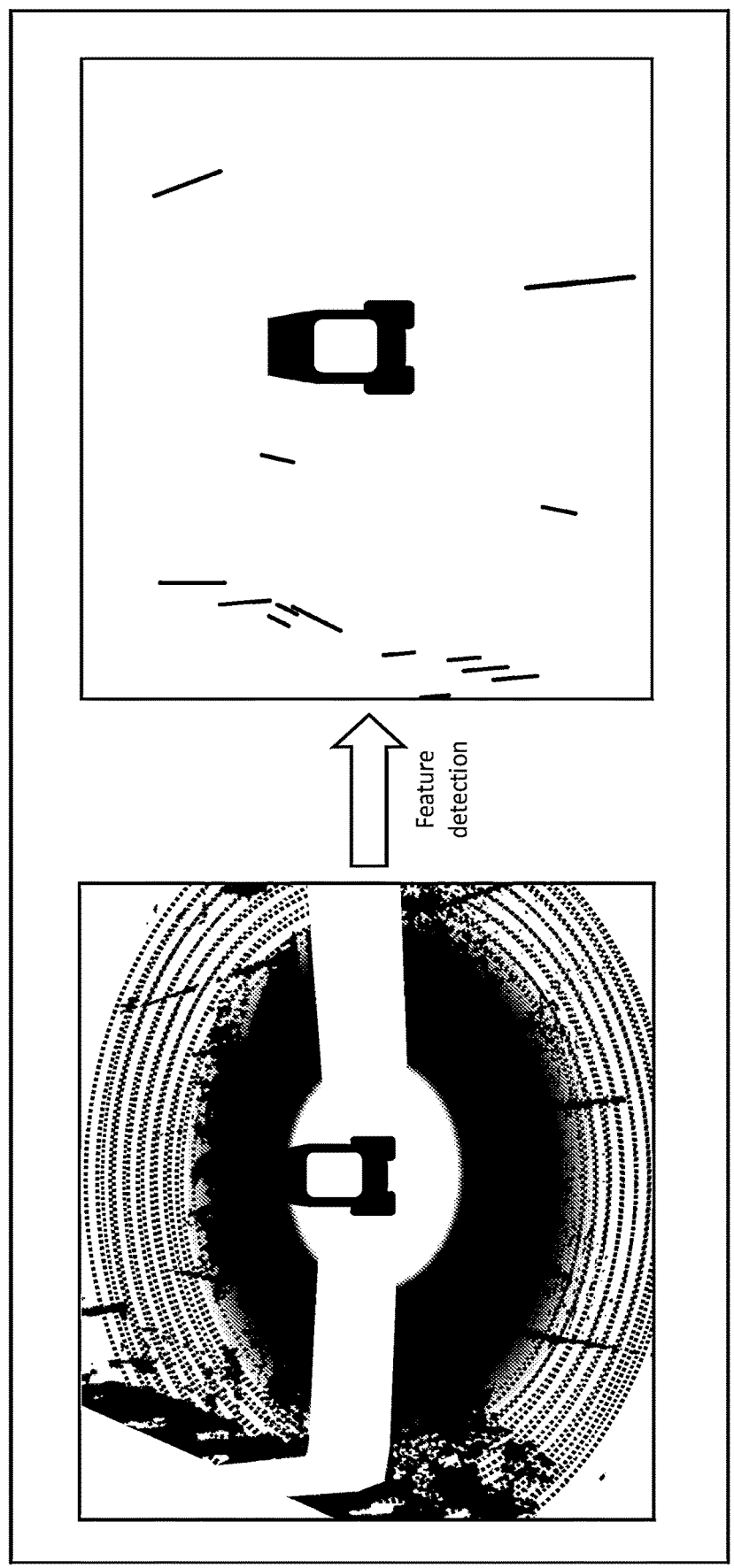
FIG. 30 is a diagram for explaining a specific example of the map data evaluation processing by the map data generation apparatus according to the embodiment of the present disclosure, and is a diagram illustrating an example of feature detection.

FIG. 30 is a diagram illustrating an example of feature detection for the feature map. The picture shown on the left side of FIG. 30 is a point cloud picture obtained by mapping a three dimensional point cloud obtained from the LiDAR onto a plane. The image located at the center of the picture is the vehicle on which the LiDAR is mounted. The point cloud picture is processed by a feature detector, and the feature is detected to obtain the feature picture shown on the right side of FIG. 30. In the feature picture, white lines, curbs, and building corners are detected as features around the vehicle located at the center of the picture.

Figure 31C:
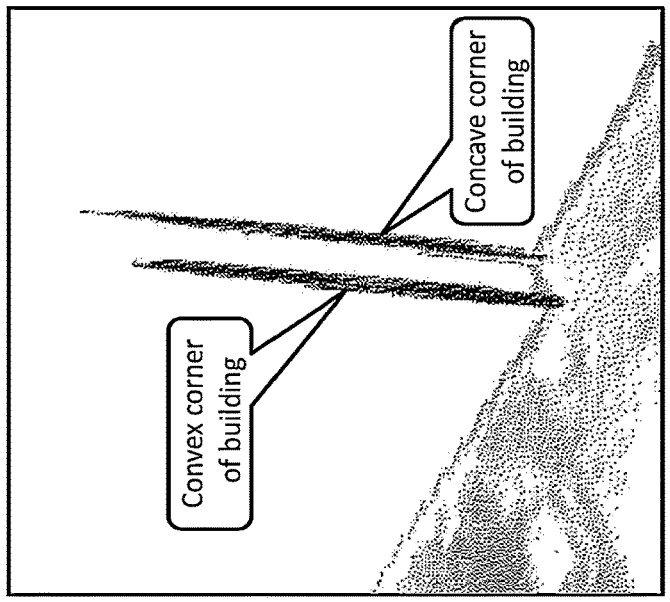
FIG. 31A, FIG. 31B and FIG. 31C are diagrams for explaining a specific example of the map data evaluation processing performed by the map data generation apparatus according to the embodiment of the present disclosure, and are diagrams illustrating examples of types of features.
Figure 31B:
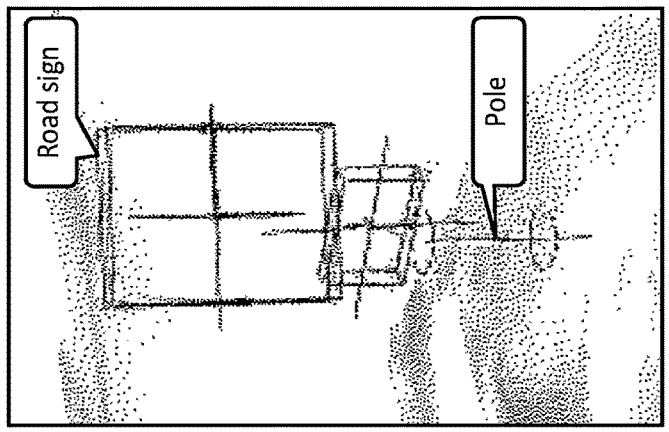
Figure 31A:
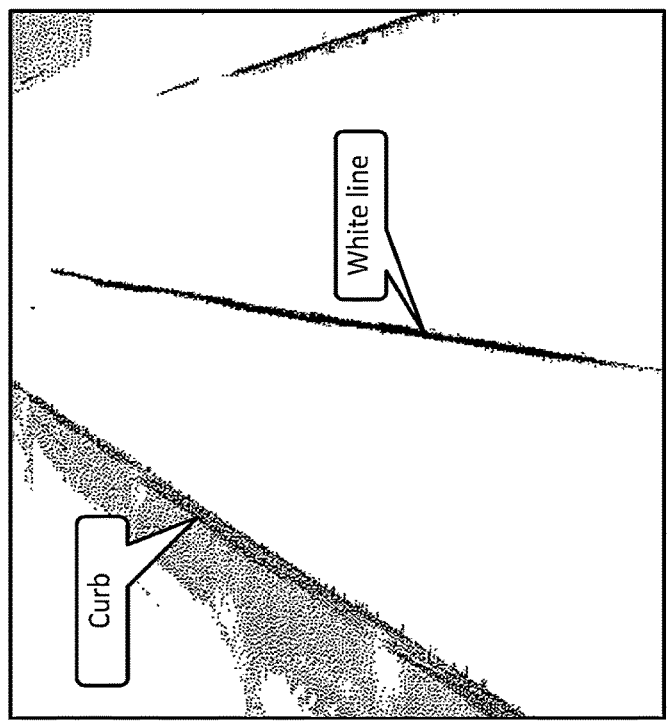

FIG. 31A, FIG. 31B, and FIG. 31C are diagrams illustrating examples of types of features. In the feature picture shown in FIG. 31A, the white line and curb are detected as features. The white line is detected as a straight line using reflection intensity information of the point cloud of the LiDAR. The curb is detected as a straight line using distance information of the point cloud of the LiDAR.

In the feature picture shown in FIG. 31B, a road sign and a pole supporting the road sign are detected as features. As for the road sign, a plane having a certain size or more and a certain size or less is detected as a plane using distance information of the point cloud of the LiDAR. As for the pole, a cylinder having a certain thickness or more, a certain thickness or less, a certain length or more, and a certain length or less is detected as a straight line extending to the Z direction using the distance information of the point cloud of the LiDAR.

In the feature picture shown in FIG. 31C, a convex corner and a concave corner of a building are detected as features. With respect to the building corner, a corner having a predetermined length or more and a predetermined length or less such that planes intersect at 90 degrees is detected as a straight line using the distance information of the point cloud of the LiDAR.

Note that not all the features are detected after specifying the target object, but only the feature likelihood defined by the algorithm is detected from the point cloud of the LiDAR. Therefore, for example, when a plane having a certain size or less is detected from the point cloud of the LiDAR, the plane may be detected as a road sign even though the plane is actually a building wall. However, in the self-location estimation using the feature map, it is only necessary to detect features with reproducibility. Therefore, even if what is detected as a road sign is actually a building wall, it can be used for the self-location estimation without any problem. This also applies to the other features.

Figure 32:
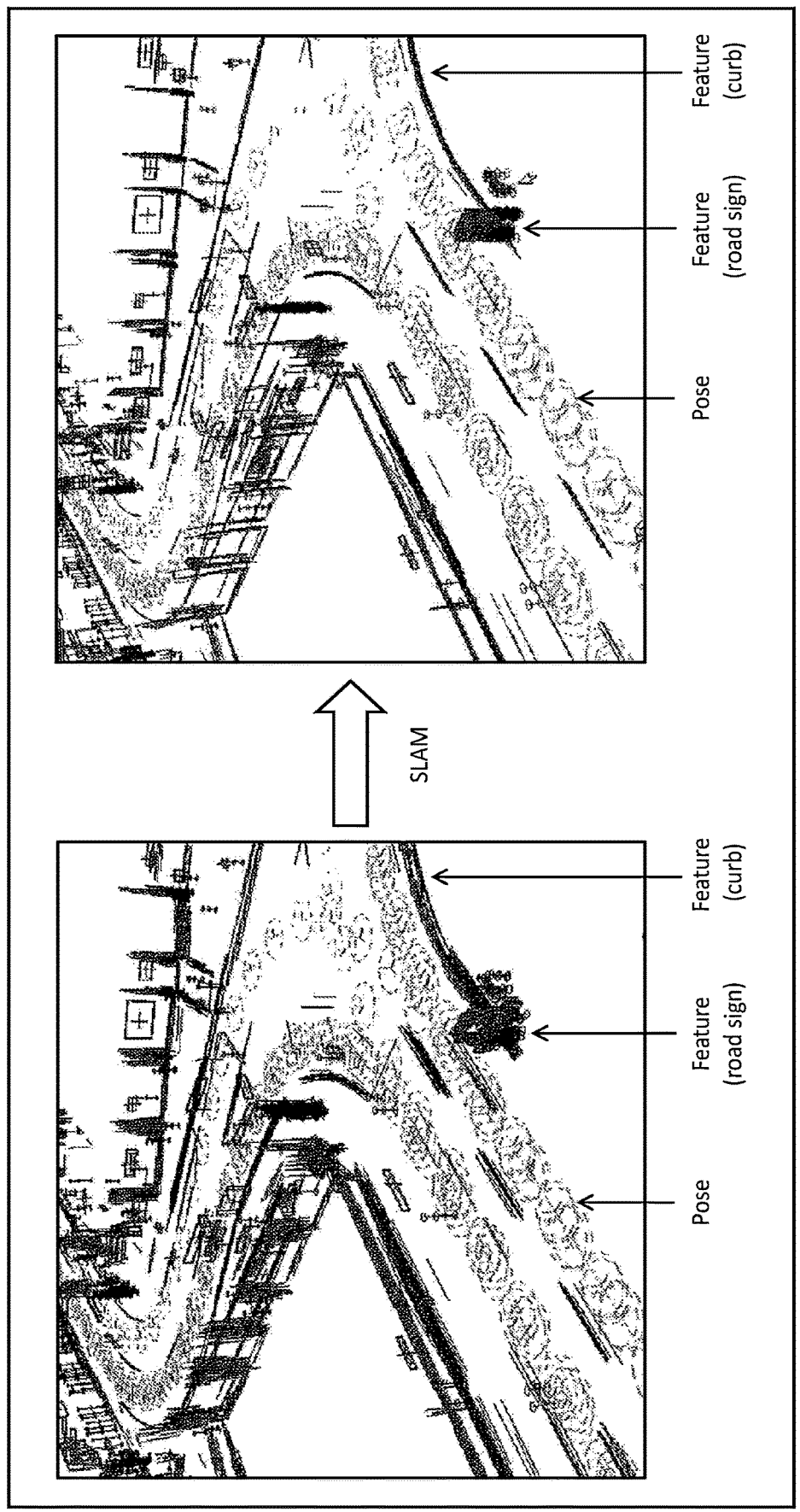
FIG. 32 is a diagram for explaining a specific example of the map data evaluation processing performed by the map data generation apparatus according to the embodiment of the present disclosure, and is a diagram illustrating an example of generation of a feature map by SLAM.

FIG. 32 is a diagram illustrating an example of generation of the feature map by SLAM. The picture on the left side of FIG. 32 is a picture obtained by superimposing the feature obtained from each log data in accordance with the output of a locator (GPS and IMU). The output of the locator is coordinates (x, y, z) and attitude (roll, pitch, yaw). In this picture, the features seem to match, but actually there is a variation in the features over the entire picture. That is, if the features of all the log data are merely superimposed in accordance with the output of the locator, the features still vary. Therefore, SLAM, that is, optimization calculation is performed on a result obtained by superimposing the features of all the log data. The picture on the right side of FIG. 32 is a feature map obtained by performing optimization calculation on the picture on the left side. The generated feature map is stored in the map data DB 160 and is used for the self-location estimation when the autonomous driving vehicle actually travels.

4-1-2. Evaluation of Map Data Based on Statistics of Entire Map

As described above, the optimization calculation is performed when the feature map is generated. Although the degree of matching of the features is increased by the optimization calculation, the features do not necessarily completely match between all the log data.

Figures 33A, 33B, 33C:
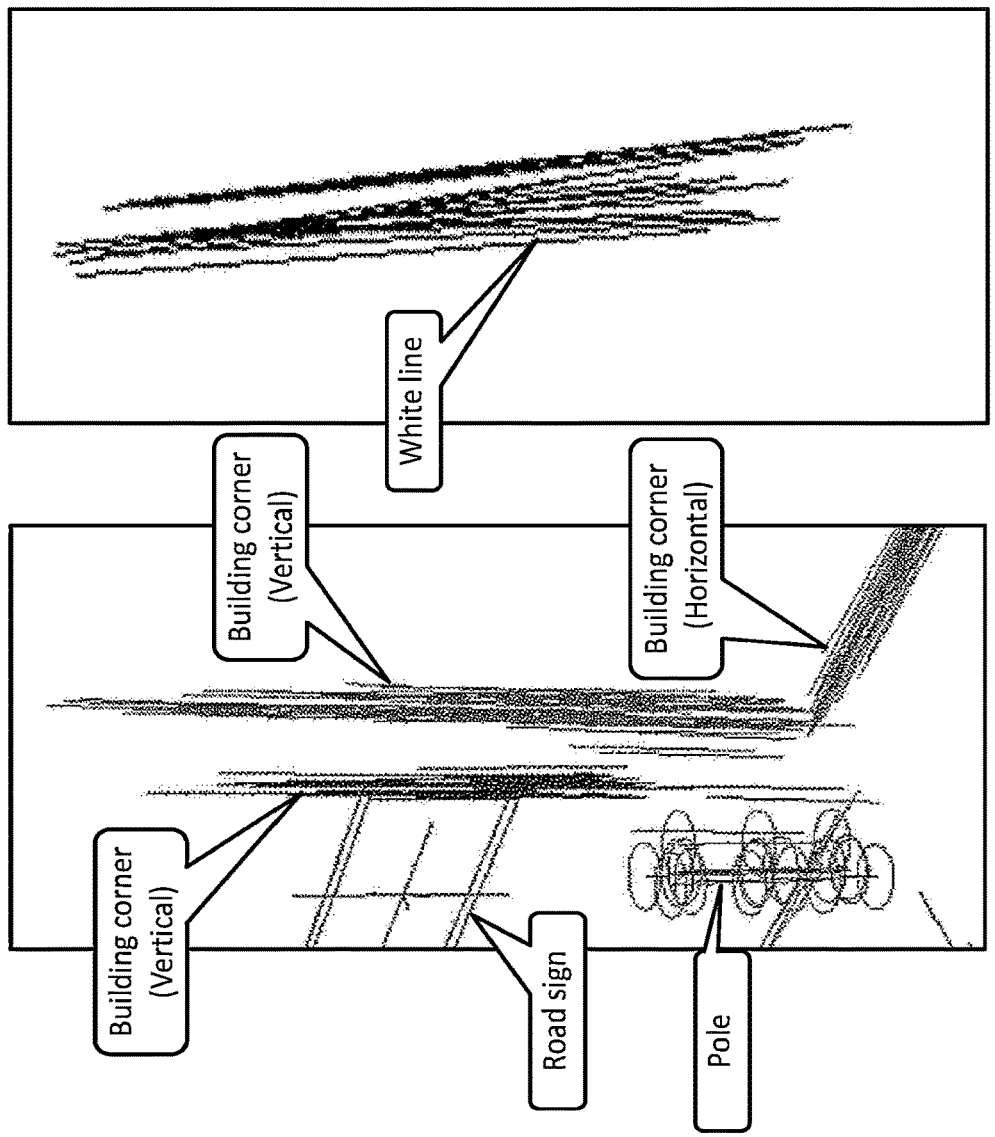
FIG. 33A, FIG. 33B and FIG. 33C are diagrams illustrating a specific example of the map data evaluation processing performed by the map data generation apparatus according to the embodiment of the present disclosure, and are diagrams illustrating examples of variations for each feature.

FIG. 33A, FIG. 33B, and FIG. 33C are diagrams illustrating examples of variations for each feature in the feature map. FIG. 33A shows examples of features of a road sign, a pole, a vertical building corner, and a horizontal building corner registered in the feature map. FIG. 33B shows examples of features of a white line registered in the feature map. All of them are features acquired from the same object. However, the location of the feature after the optimization calculation varies due to a plurality of reasons such as the detection accuracy of the LiDAR itself, the accuracy of calibration (attachment location and orientation) of the LiDAR, the accuracy of the feature detection algorithm, and the accuracy of the optimization calculation.

In FIG. 33C, the variation of each feature in a certain feature map is represented by a standard deviation. However, the variation of features is not a statistic focusing on a specific object but a statistic for the entire map data. In the example shown in FIG. 33C, each feature has a variation of about a standard deviation of 0.005 m.

As described above, for each feature map, the statistic of features as a whole map, that is the variation of features, can be determined. Therefore, whether or not the map data match can be determined by comparing the statistics between the map data. In other words, abnormal map data can be specified by comparing the statistics. FIG. 34 is a diagram illustrating examples of statistics of the map data. Here, for simplification of description, it is assumed that there are three map data and the feature is only a white line.

F-test is known as a method for determining whether or not two sets have equal variance. F-test can determine the probability that the variances of the two sets are equal. For example, if the probability is 5% or more, it can be determined as "equal variance," and if the probability falls below 5%, it can be determined as "not equal variance." According to this, each of the three map data shown in FIG. 34 is tested. FIG. 35 is a diagram illustrating an example of evaluation using the F-test. When grouping data with equal variances, map data 1 and map data 2 have equal variances, but only map data 3 does not have equal variances with the other map data, and the standard deviation is also larger than that of the other map data. Therefore, map data 3 can be determined as abnormal map data as a result of F-test.

As another method for determining abnormal map data based on the statistic of the entire map, there is a method based on a difference from the map data having a minimum standard deviation. Simply, the map data in which the standard deviation of features is minimum is considered to be the map data with the highest accuracy. A threshold value may be set based on the standard deviation of the map data, and map data having a standard deviation equal to or greater than the threshold value may be determined as abnormal map data.

For example, in the example shown in FIG. 34, the map data having the smallest standard deviation is map data 1. If map data having a standard deviation greater than the standard deviation of map data 1 by 20% or more is determined to be abnormal, map data 3 is determined to be abnormal map data. If map data having a standard deviation greater than the standard deviation of map data 1 by 0.001 m or more is determined to be abnormal, map data 2 and map data 3 are determined to be abnormal map data.

4-1-3. Evaluation of Map Data Based on Degree of Success of Self-Location Estimation When the feature map is generated, a pose indicating the self-location and posture of the vehicle is used. In FIG. 32, the centers of the circles continuously arranged on the road are the poses of the vehicle at the respective times, and the line connecting them is the path through which the vehicle has passed. In SLAM, the feature is optimized, and at the same time, each pose is also optimized using the feature detected in the pose. The degree of success of self-localization in a pose by SLAM can be obtained from statistical values described below.

Figure 36:
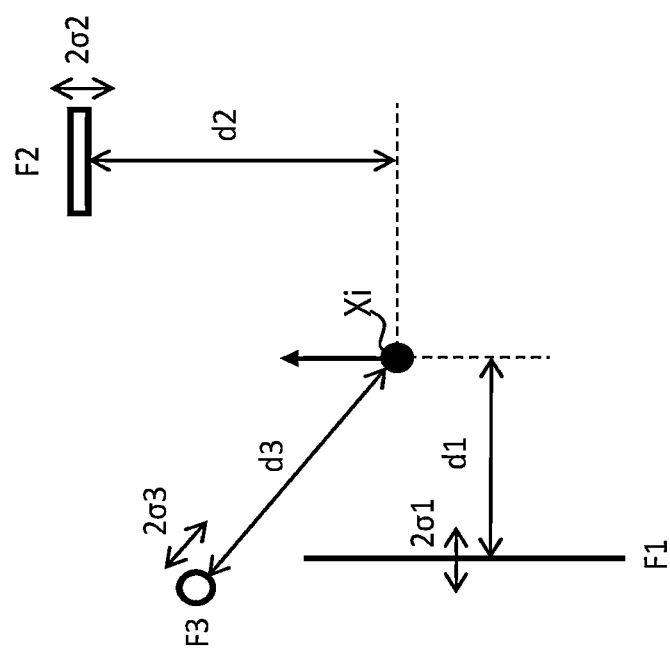
FIG. 36 is a conceptual diagram for explaining a specific example of the map data evaluation processing by the map data generation apparatus according to the embodiment of the present disclosure, and is a conceptual diagram for explaining an example of self-location estimation at a pose by SLAM.

FIG. 36 is a conceptual diagram for explaining an example of the self-location estimation in a pose by SLAM. FIG. 36 shows the pose Xi of the vehicle at time $t_1$ and the features F1, F2, and F3 observed at the pose Xi. The feature F1 is a white line, the feature F2 is a road sign, and the feature F3 is a pole. The measurement distances d1, d2, and d3 of the features F1, F2, and F3 obtained by the LiDAR include predetermined measurement errors $\sigma1$, $\sigma2$, and $\sigma3$. In SLAM, the self-location estimation for the pose Xi is performed based on the locations, measured distances, and measurement errors of the features F1, F2, and F3.

Figure 37:
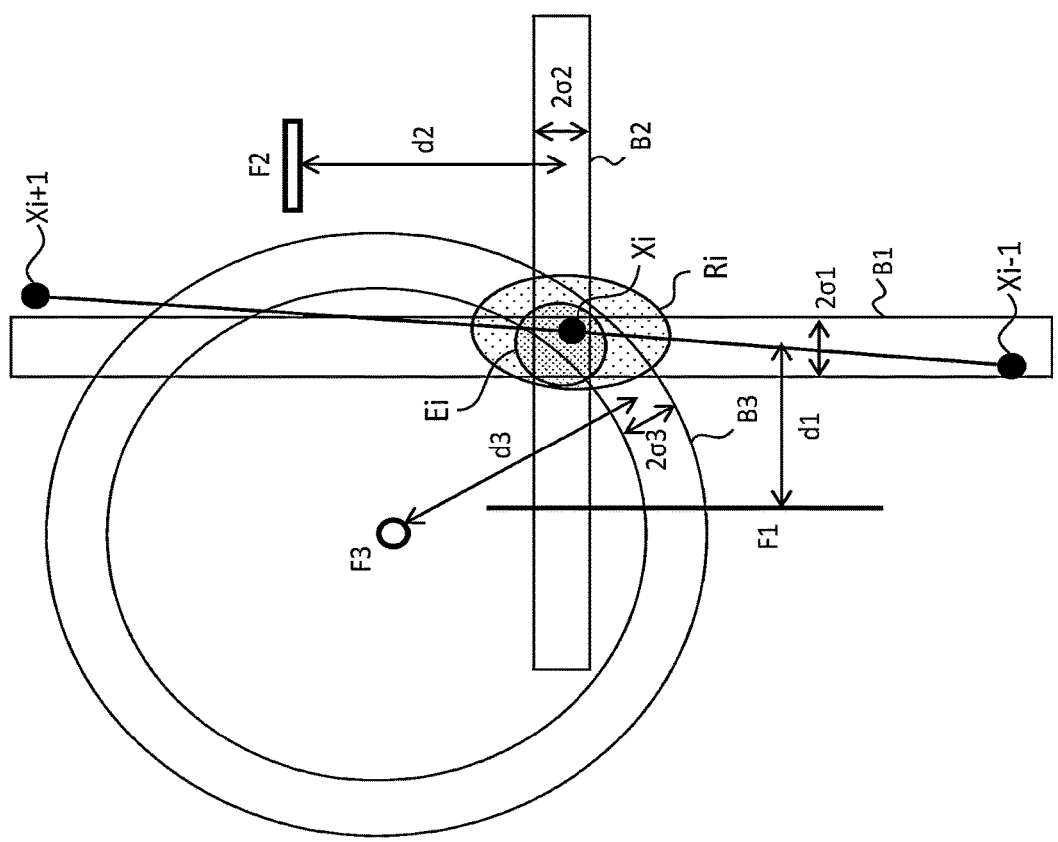
FIG. 37 is a conceptual diagram for explaining a specific example of the map data evaluation processing by the map data generation apparatus according to the embodiment of the present disclosure, and is a conceptual diagram for explaining an example of success of the self-location estimation at the pose by SLAM.
Figure 38:
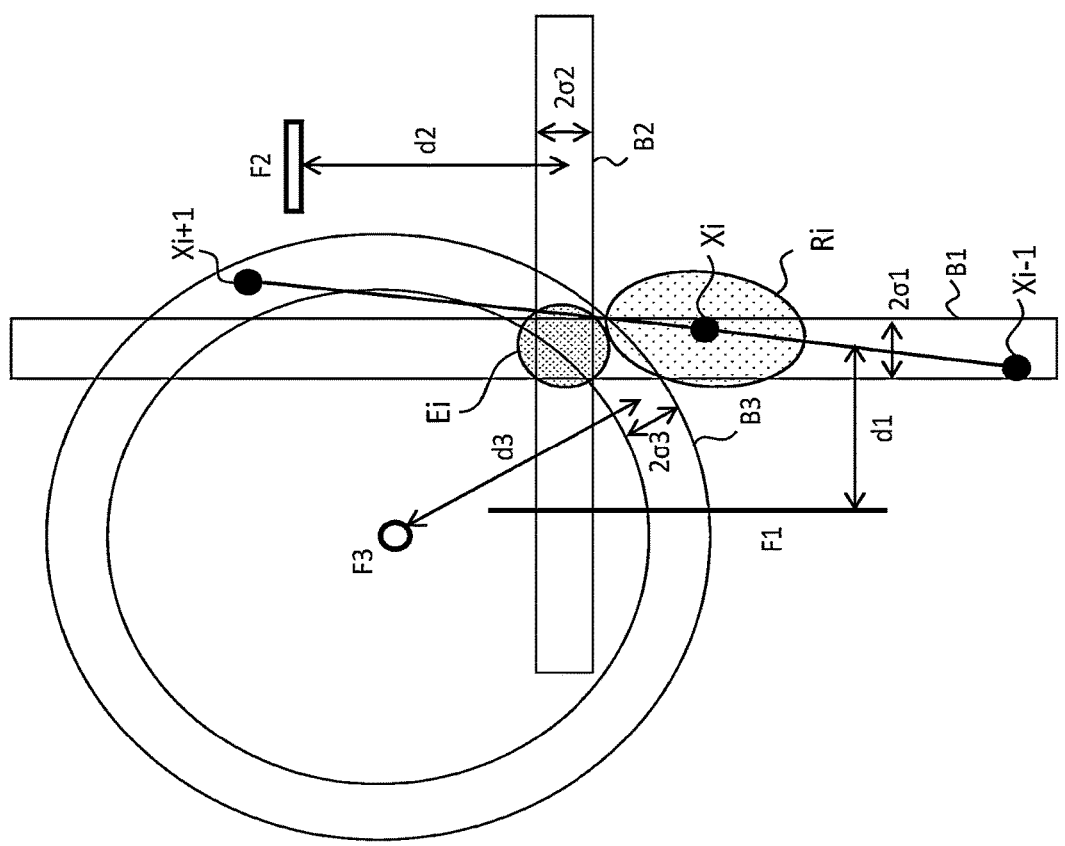
FIG. 38 is a conceptual diagram for explaining a specific example of the map data evaluation processing by the map data generation apparatus according to the embodiment of the present disclosure, and is a conceptual diagram for explaining an example of failure of the self-location estimation at the pose by SLAM.

FIGS. 37 and 38 are conceptual diagrams for explaining a result of the self-location estimation in a pose by SLAM. The band-shaped areas B1, B2, and B3 in FIGS. 37 and 38 are defined by the locations, measured distances, and measurement errors of the features F1, F2, and F3. More specifically, the band-shaped areas B1, B2, and B3 are separated from the locations of the features F1, F2, and F3 by the measurement distances d1 to d3, and have widths of $2\sigma1$ to $2\sigma3$. An area Ei where the three areas B1, B2, and B3 overlap is an estimation area of the self-location. It can be determined that the degree of success of the self-location estimation at the pose Xi is higher as the area where the estimation area Ei of the self-location and the area Ri around the pose Xi overlap is larger. FIG. 37 indicates a successful example of the self-location estimation in the pose Xi. In FIG. 37, the self-location estimation area Ei and the area Ri around the pose Xi overlap each other. On the other hand, FIG. 38 indicates a failure example of the self-location estimation in the pose Xi. In FIG. 38, the self-location estimation area Ei and the area Ri around the pose Xi do not overlap each other.

In general, the chi-square value may be calculated to determine the consistency of the feature observed at the pose Xi. The chi-square value is calculated using, for example, the expected value and the observed value of the measured distance of the feature. The probability of occurrence of the chi-square value at the pose Xi can be represented by a p-value. As the chi-square value increases, the p-value decreases, and as the chi-square value decreases, the p-value increases. The degree of success of self-localization at the pose Xi by SLAM is represented by the p-value as a probability ranging from 0 (highly likely to fail) to 1 (highly likely to succeed).

Figure 39:
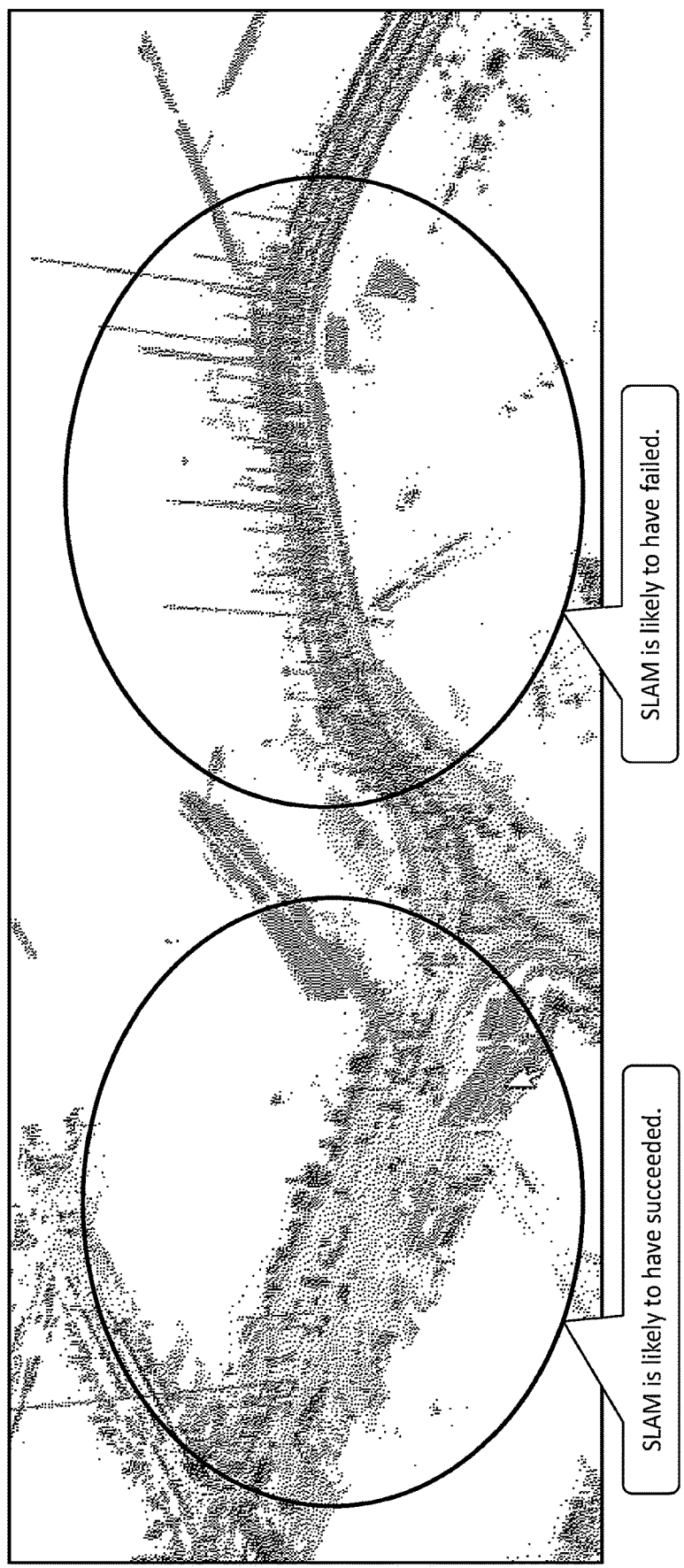
FIG. 39 is a diagram for explaining a specific example of the map data evaluation processing performed by the map data generation apparatus according to the embodiment of the present disclosure, and is a diagram illustrating an example of visualizing the degree of success of the self-location estimation at each pose by SLAM in a feature map.
Figure 40:
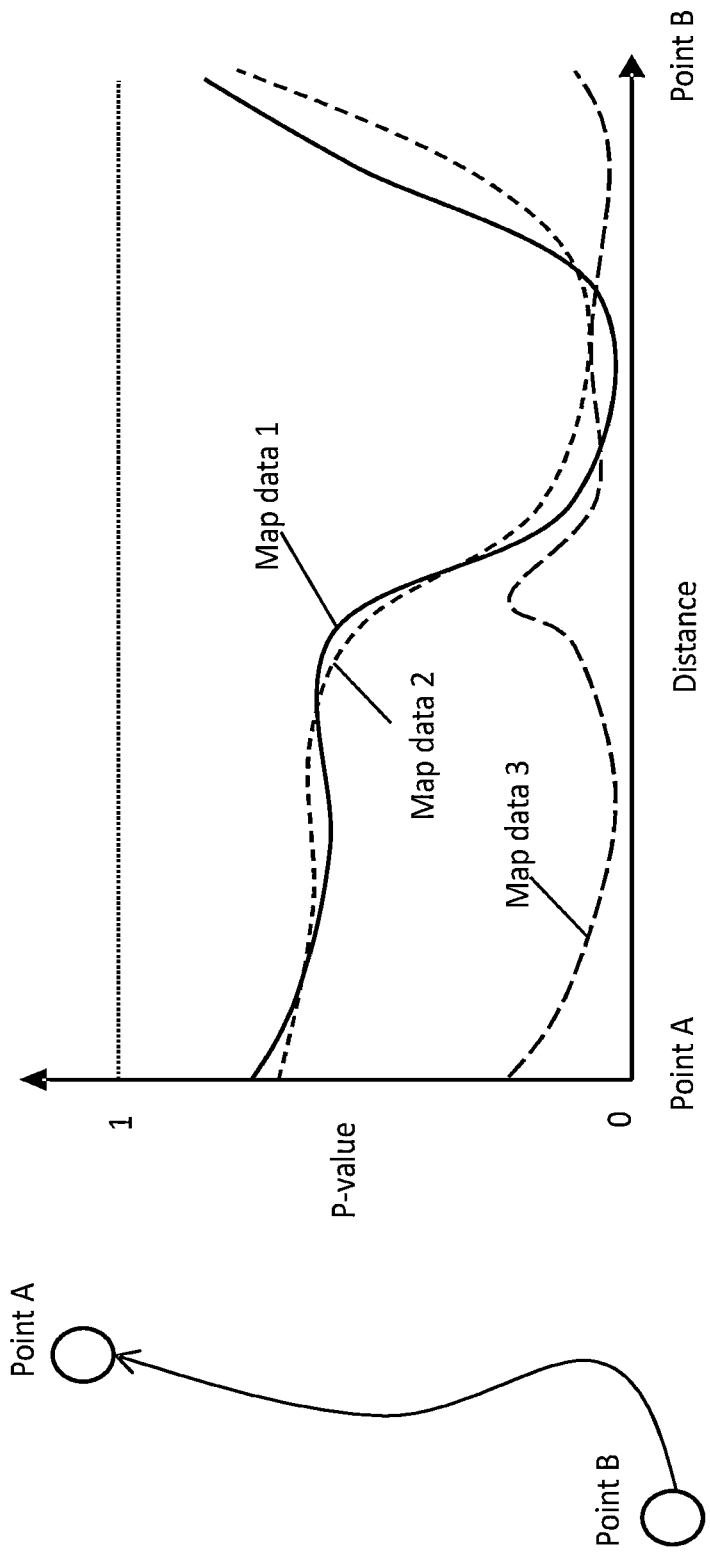
FIG. 40A and FIG. 40B are diagrams for explaining a specific example of the map data evaluation processing performed by the map data generation apparatus according to the embodiment of the present disclosure.

By using the p-value, it is possible to visualize the degree of success of the self-location estimation at each pose by SLAM in the feature map. FIG. 39 is a diagram illustrating an example of visualizing the degree of success of the self-location estimation at each pose by SLAM in the feature map. On the feature map shown in FIG. 39, the inverse of the p-value is visualized as a line extending from the pose in the z direction. The lower the p-value at a pose, the longer the line extending from the pose in the z-direction.

Ideally, the p-value should be high for the entire map. However, the p-value is basically location-dependent, and many poses at which the p-value becomes low appear in a section in which features cannot be sufficiently acquired or in a section in which acquirable features are biased, such as the region surrounded by the circle on the right side. A high frequency of pauses with low p-values means that there is a high possibility that SLAM has failed. On the other hand, in a section in which features can be sufficiently detected, such as a region surrounded by a circle on the left side, the p-value becomes high at each pose. Fewer pauses with low p-values means that there is a high probability that SLAM has succeeded.

If the p-value depends on the location, when a plurality of map data is generated, a strong correlation should appear in the variation of the p-value among the plurality of map data in a common section among the plurality of map data. A general method for determining the strength of the correlation is to compare among the plurality of map data the average values of the p-values in the common section.

For example, it is assumed that three map data, that is map data 1, map data 2, and map data 3 are generated using the log data acquired in the common section from point A to point B shown in FIG. 40A. By plotting the p-values of the respective map data on the same graph in which the horizontal axis represents the distance from point A, a graph showing the correlation of the variations of the p-values among the map data as shown in FIG. 40B is obtained. It is assumed that all the map data are expressed by N poses from point A to point B, and the p-value of the n-th pose of the i-th map data is expressed as pi, n. In this case, the average value of the p-values in the common section of the map data i is expressed by the following equation.

$$\overline{p_i} = \frac{1}{N}\sum_{n=1}^{N} p_{i,n}$$

In the example shown in FIG. 40B, the average value of the p-values of map data 1 and the average value of the p-values of map data 2 substantially coincide with each other, whereas the average value of the p-values of map data 3 is far smaller than them. Therefore, map data 3 in the common section from point A to point B is determined to be abnormal map data in comparison with map data 1 and map data 2.

Figure 41:
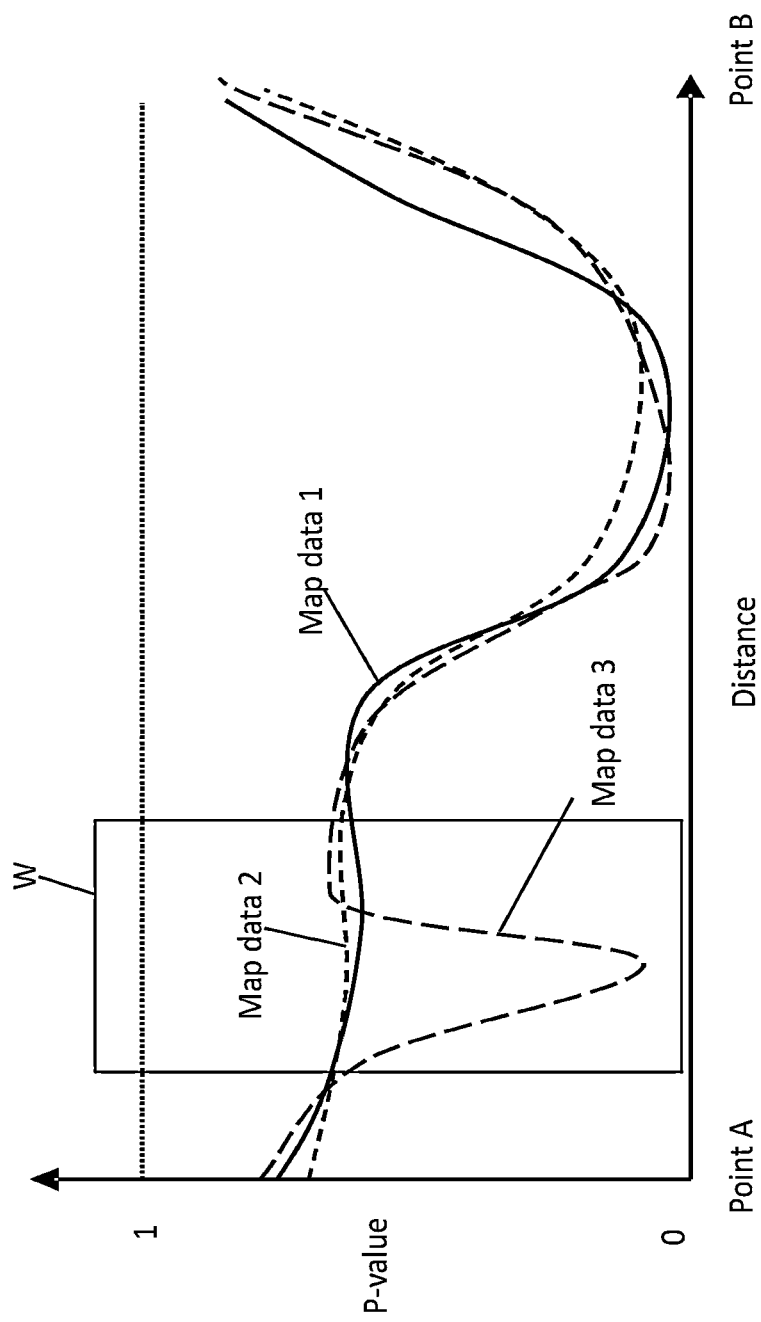
FIG. 41 is a diagram for explaining a specific example of the map data evaluation processing performed by the map data generation apparatus according to the embodiment of the present disclosure, and is a diagram illustrating another example of the correlation of p-value variations among map data.

FIG. 41 is a diagram illustrating another example of correlation of the variations of the p-values among the map data. In the example shown in FIG. 41, the p-value of map data 3 is significantly lower than the p-value of map data 1 and the p-value of map data 2 only in the section within a window W. However, when the average value of the p-values is calculated in the entire section from point A to point B, the influence of the section in the window W is weakened. That is, there is a possibility that there is no difference in the average value of the p-values between map data 1 and map data 2 and map data 3.

Therefore, considering that there may be a difference in the p-value between the map data in some sections as in the example shown in FIG. 41, the average value of the p-values may be calculated for each certain section. For example, while moving the window W from point A to point B, the average value of the p-values may be calculated in the section within the window W. FIG. 42 is a diagram illustrating examples of average values of the p-values for each map data in the section within the window W shown in FIG. 41.

In the example shown in FIG. 42, the map data having the highest average value of the p-values is map data 1. It is assumed that a value smaller than the average value of the p-values of map data 1 by 0.1 is set as the threshold value. In this case, it is determined that map data 2 having an average p-value of 0.45 matches map data 1. However, map data 3 having an average p-value of 0.2 does not match map data 1, that is, it is determined to be abnormal. When it is determined that map data 3 is abnormal in the section of the window W, it is possible to cut out only the section from map data 3 and treat the remaining section as normal map data.

Further, as a method for evaluating coincidence/non-coincidence of map data using the p-value, there is a method of using a correlation coefficient of the p-values between the map data in addition to the method of using the average value of the p-values. FIG. 43 is a diagram illustrating an example of a correlation coefficient of p-values between the map data. It is assumed that the threshold value of the correlation coefficient at which the two map data are considered to match is 0.8, for example. In this case, if the correlation coefficient of the p-values among map data 1, map data 2, and map data 3 is shown in FIG. 43, it is determined that map data 1 and map data 2 match. However, since map data 3 does not match map data 1 nor map data 2, it is determined that map data 3 is abnormal map data.

In the above example, it is assumed that at least one of the plurality of map data is valid. However, since the p-value is a numerical value representing the degree of success of SLAM at the pose by a probability, map data having a low p-value is highly likely to be unsuitable for autonomous driving without comparison with other map data. Therefore, an absolute reference value may be provided for the p-value, and map data having a p-value lower than the absolute reference value may be determined to be abnormal. For example, when it is determined to be abnormal if the average value of the p-values of the entire map data is equal to or less than 0.4, only map data 3 is determined to be abnormal in the example shown in FIG. 41. However, when it is determined to be abnormal if the lowest p-value is 0.4 or less in all the sections, all the map data is determined to be abnormal in the example shown in FIG. 41.

As a method for comparing the map data, for example, the following numerical values can be used in addition to the p-value at each pose.

The number of detected features of white lines
The number of detected features of curbs
The number of detected features of road signs
The number of detected features of building corners
Total number of all detected features
Pose height (height in z-direction)

When the number of detected features is small, the p-value is generally low. However, for example, in a case where only one sensor fails in a vehicle on which a plurality of sensors is mounted, there is a possibility that the p-value does not decrease so much because the features can be detected by another sensor. In such a case, it is possible to detect a failure of the sensor by comparing the number of detected features between the map data.

4-1-4. Evaluation of Map Data Based on Trajectory after SLAM

Next, a method for evaluating map data using a trajectory after SLAM of the map data, that is, poses arranged in chronological order will be described. FIG. 44 is a conceptual diagram for explaining an example of map data evaluation using a trajectory after SLAM.

Figure 44A:
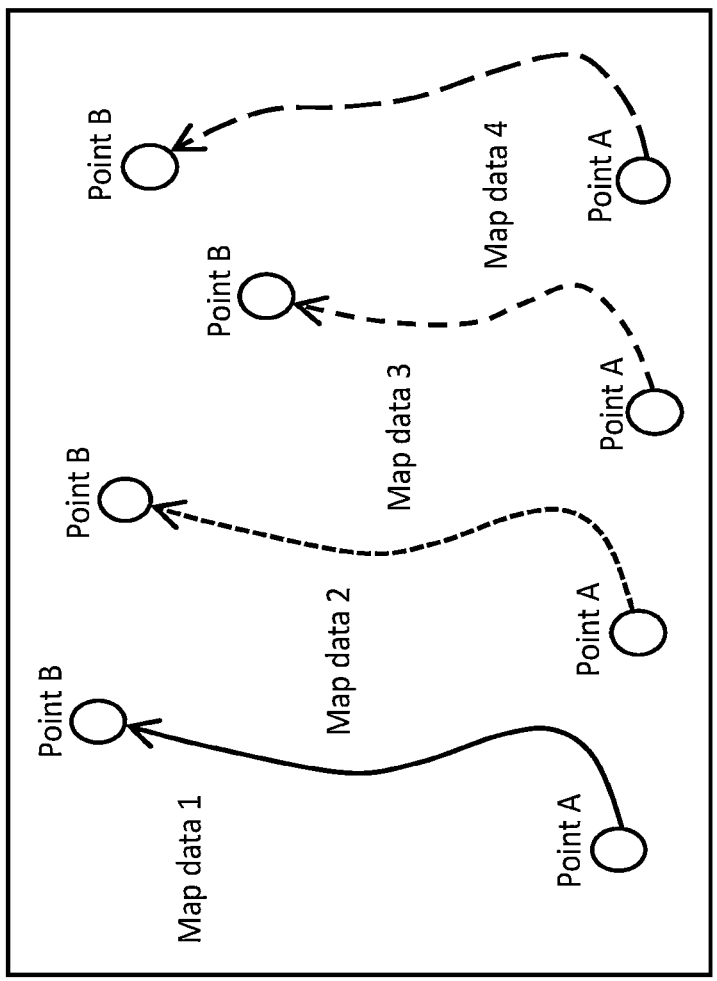
FIG. 44A and FIG. 44B are conceptual diagrams for explaining a specific example of the map data evaluation processing performed by the map data generation apparatus according to the embodiment of the present disclosure, and are conceptual diagrams for explaining an example of map data evaluation using a trajectory after SLAM.

FIG. 44A shows four map data from map data 1 to map data 4. All map data are generated along the same route in the section from point A to point B. The route from point A to point B in each map data corresponds to the trajectory after SLAM. In order to compare the route shapes of these four map data, point A of each map data is moved to the origin on the xyz space, and the pose direction (vehicle traveling direction) at point A of each map data is rotated so as to coincide with the x-axis.

Figure 44B:
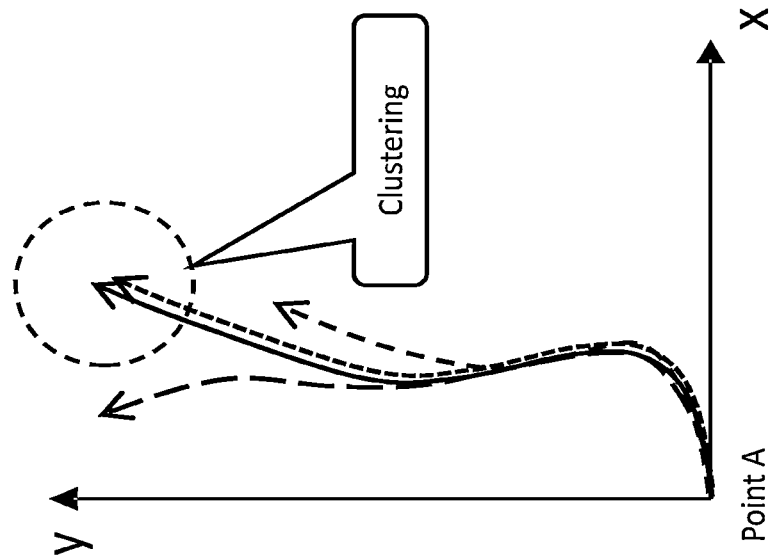

The above processes yield FIG. 44B. FIG. 44B shows mapping of each map data onto the xy plane. In the xy plane shown in FIG. 44B, arrow lines extending from the origin indicate trajectories after SLAM of respective map data viewed from point A. The tip of each arrow line is point B. However, since the result of SLAM is different, the relative position of point B when viewed from point A is different for each map data.

Here, point B of each map data is clustered using coordinates (x, y, z) and attitude (roll, pitch, yaw). The term "clustering" as used herein refers to grouping a plurality of objects that are close to each other, and a general method like the shortest distance method can be applied thereto. For example, point B of each map data may be clustered by the shortest distance method using a threshold distance of 3 m. In the example shown in FIG. 44B, map data 1 and map data 2 are clustered into one group. Since it can be said that the group to which the largest number of map data belong has the highest reliability, it is determined that the group to which map data 1 and map data 2 belong has the highest reliability. Then, map data 3 and map data 4 which do not belong to the group are determined to be abnormal map data.

4-2. Map Data Evaluation Processing for Road Surface Shape Map and Road Surface Luminance Map

4-2-1. Outline of Road Surface Shape Map and Road Surface Luminance Map

Figure 45:
FIG. 45 is a conceptual diagram for explaining a specific example of the map data evaluation processing performed by the map data generation apparatus according to the embodiment of the present disclosure, and is a diagram illustrating an example of a road surface shape map.

FIG. 45 is a diagram illustrating an example of image data of a road surface shape map. In the road surface shape map, the image data as shown in FIG. 45 is decomposed in the x direction and the y direction at predetermined resolution, and information is stored in each cell obtained by decomposing the image data. Similarly, in the road surface luminance map, information is stored in each cell obtained by decomposing the image data. The resolutions of the cells are, for example, 0.1 m in both the x and y directions.

In each cell of the road surface shape map, the number of points of the LiDAR reaching the cell, and the average value and the variance of the height of the points are stored. In the calculation of the average value and the variance of the height, the values of all LiDAR points (height values in the z direction) that have reached the cell are used. In each cell of the road surface luminance map, the number of points of the LiDAR reaching the cell and the average value and the variance of the road surface luminance are stored. In the calculation of the average value and the variance of the road surface luminance, the values (reflection intensities) of all the LiDAR's points reaching the cell are used.

Hereinafter, the road surface shape map will be mainly described. However, the following description also applies to the road surface luminance map by replacing height information stored in each cell with luminance information as necessary.

In the road surface shape map, since the road surface shape is expressed by cells having a certain area, in a place where grass grows or a place where there is a step, the heights of the points of the LiDAR corresponding to the place do not become constant. Therefore, even if SLAM is successful, the variance in height becomes large. On the other hand, on a road on which a vehicle travels or on a sidewalk on which a pedestrian walks, the range of a cell is often flat. Therefore, when SLAM is successful, it is expected that the variance in height will be small.

Figure 46B:
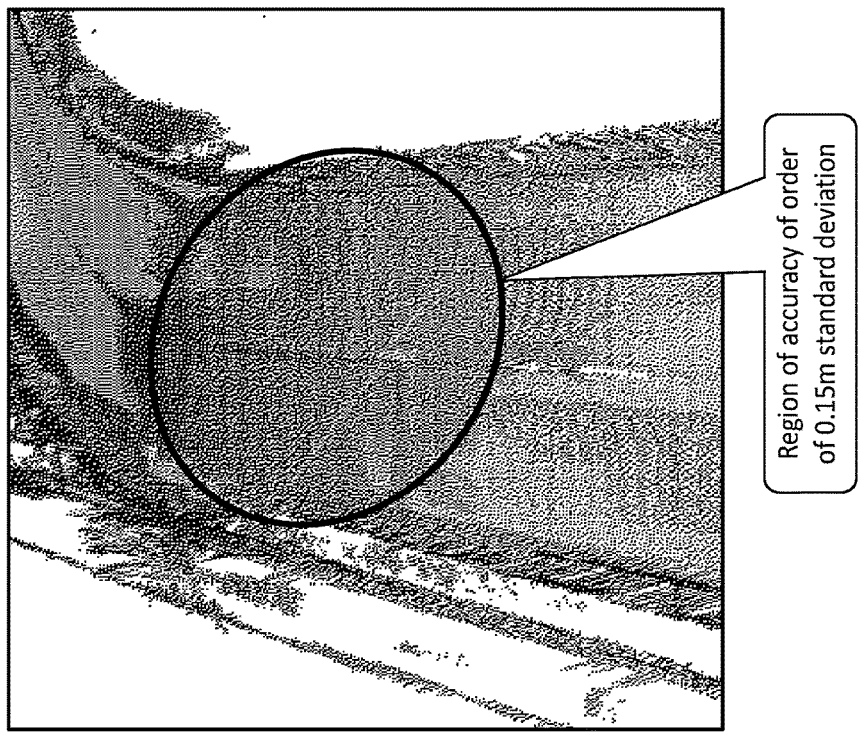
FIG. 46A and FIG. 46B are diagrams for explaining a specific example of the map data evaluation processing performed by the map data generation apparatus according to the embodiment of the present disclosure.
Figure 46A:
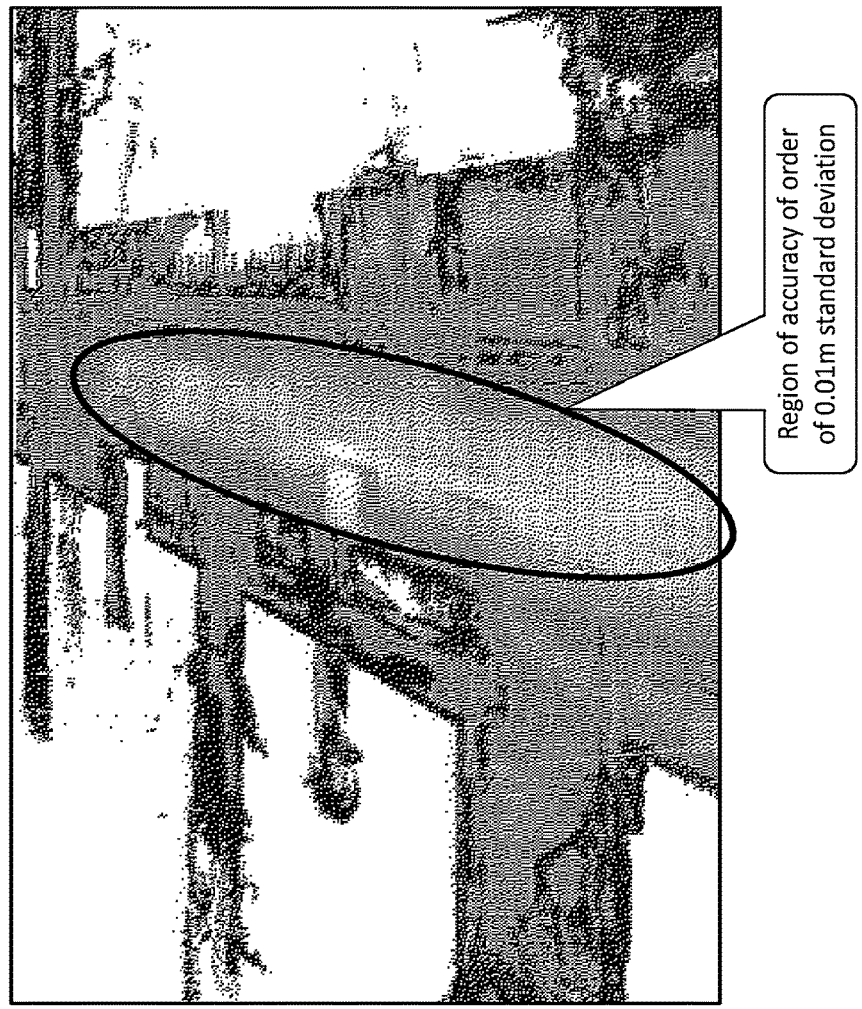

FIG. 46A shows a concrete example in which SLAM succeeds in a road surface shape map. On the other hand, FIG. 46B shows a concrete example in which SLAM fails in the road surface shape map. The shading of black and white on the road surface in each figure represents the standard deviation of the height of each cell by a heat map. A portion that appears white is a portion where the standard deviation of height is small, and a portion that appears black is a portion where the standard deviation of height is large. When SLAM succeeds, the road surface is expressed in white as shown in FIG. 46A because the variance of the road surface shape is low. A particularly white region at the center is a region having a standard deviation of about 0.01 m. On the other hand, when SLAM fails, the road surface is expressed in black as shown in FIG. 46B because the variance of the road surface shape increases. A particularly black region at the center is a region having a standard deviation of about 0.15 m.

4-2-2. Evaluation of Map Data Based on Road Surface Shape

Hereinafter, a method for reviewing the map data based on the road surface shape will be described. However, by replacing height information stored in each cell with luminance information as necessary, the following description also applies to the evaluation of the map data based on the road surface luminance.

In the road surface shape map, if grass grows or a step such as a curb is present in a cell, the variance in the height direction becomes large even if SLAM succeeds. However, in the area through which the ego-vehicle has passed, as long as the area is a paved road, the variance in the height direction should be small because the inside of the cell is flat. In other words, when the variance in the height direction of the area through which the ego-vehicle has passed is large, the map data is highly likely to be abnormal. That is, it is possible to determine the abnormality in the map data of the road surface shape map by focusing on the variance in the height direction of the road surface shape of the region through which the ego-vehicle has passed.

Figure 47:
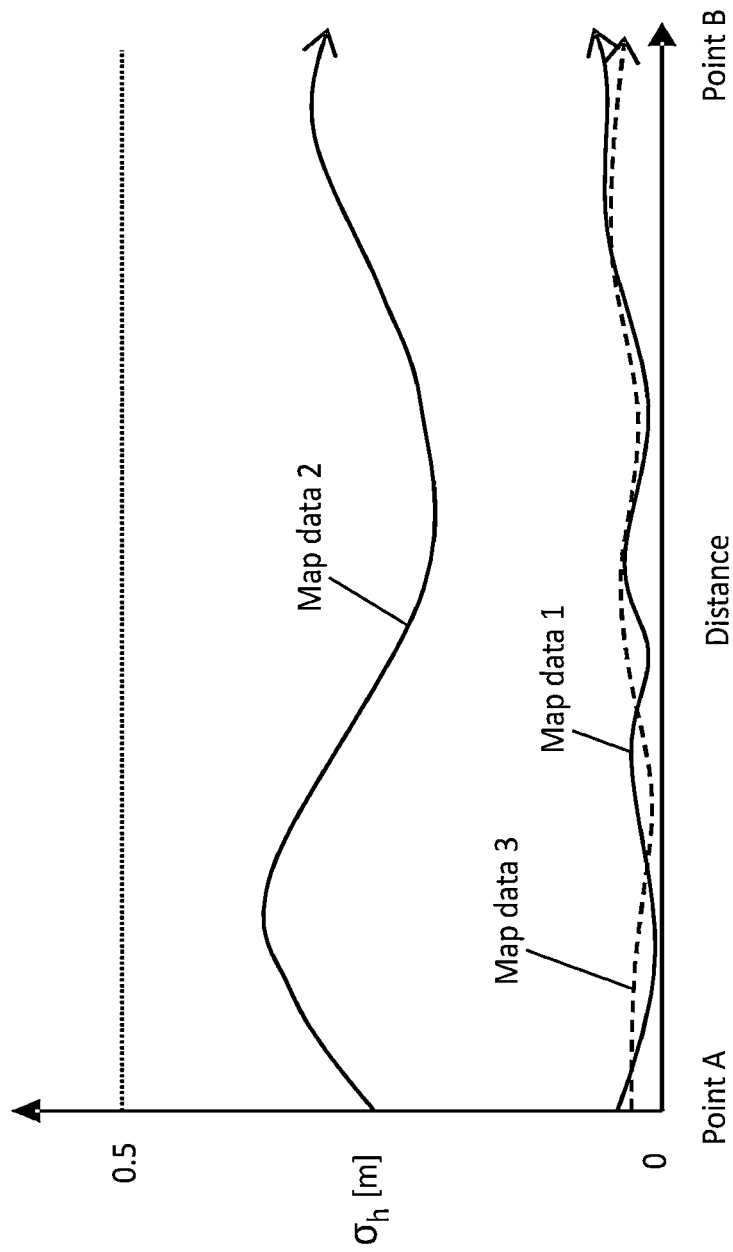
FIG. 47 is a diagram for explaining a specific example of the map data evaluation processing performed by the map data generation apparatus according to the embodiment of the present disclosure, and is a diagram illustrating an example of correlation of variation in variance in height direction among map data.

For example, it is assumed that three map data, that is, map data 1, map data 2, and map data 3 are generated using log data acquired in a common section from point A to point B. By plotting the variance $\sigma h$ in the height direction of the road surface shape of each map data on the same graph in which the horizontal axis represents the distance from the point A, a graph showing the correlation of the variation of the variance $\sigma h$ in the height direction among the map data as shown in FIG. 47 is obtained. The variance $\sigma h$ in the height direction of the road surface shape may be a variance in the height direction of the cell at the pose, that is, the cell directly below the vehicle, an average value of variances in the height direction of a plurality of cells around the vehicle.

The abnormality in the map data of the road surface shape map can be determined from the correlation of the variation of the variance $\sigma h$ in the height direction among the map data shown in FIG. 47. Specifically, the method used to determine the abnormality in the map data of the feature map can also be applied to the road surface shape map. Methods for determining abnormality in the map data of the feature map include a method of determining abnormality by comparing average values of p-values, a method of determining abnormality by comparing correlation coefficients of p-values, and a method of determining abnormality based on the minimum value of p-values. By replacing the p-value with the variance $\sigma h$ in the height direction, these methods can be used as methods for determining an abnormality in the map data of the road surface shape map. Similarly, by replacing the p-value with the variance of the luminance, these methods can be used as methods for determining abnormality in the map data of the road surface luminance map.

Figure 48:
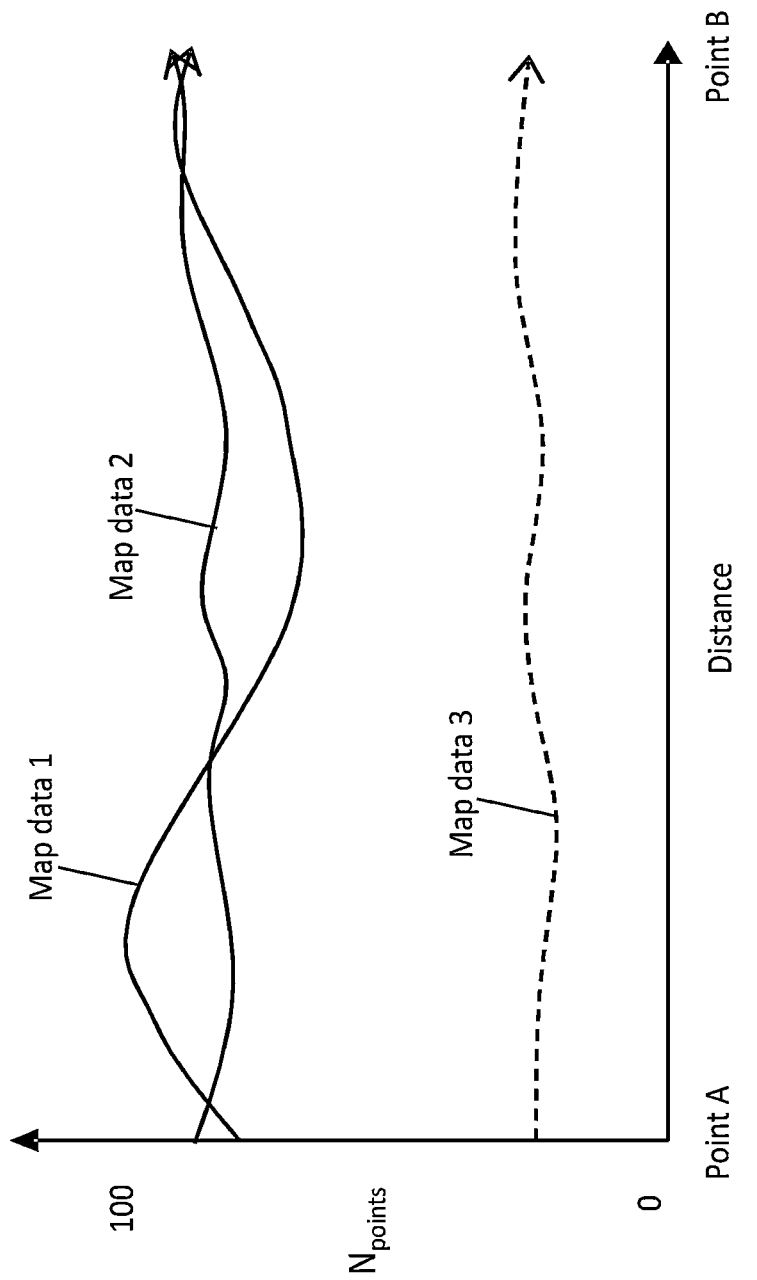
FIG. 48 is a diagram for explaining a specific example of the map data evaluation processing performed by the map data generation apparatus according to the embodiment of the present disclosure, and is a diagram illustrating an example of correlation of variation in the number of points of LiDAR among map data.

In addition, by plotting the number of points of LiDAR reaching the cell of each map data on the same graph in which the horizontal axis represents the distance from the point A, a graph showing the correlation of the variation of the number of points $N_{points}$ of LiDAR among the map data as shown in FIG. 48 is obtained. The number of points $N_{points}$ of LiDAR may be the number of points of LiDAR reaching the cell at the pose, that is, of the cell directly below the vehicle, or may be an average value of the number of points of LiDAR reaching a plurality of cells around the vehicle. By replacing the p-value with the number of points $N_{points}$ of LiDAR, the method for determining abnormality in the map data of the feature map can be used as a method for determining abnormality in the map data of the road surface shape map. The method can also be used as a method for determining abnormality in the map data of the road surface luminance map.

As a method for evaluating coincidence/non-coincidence of the map data based on the road surface shape, there is a method of using a gradient of the road surface in addition to a method of using variance in a height direction of the road surface shape. The road surface shape map is a map representing a shape of a road surface, that is, a height. The gradient of the road surface can be determined from the height. Since the road gradient is fixed in the area through which the ego-vehicle passes, it can be expected that the road surface shape map expresses the gradient within the range of "road gradient plus allowable error".

Figure 49:
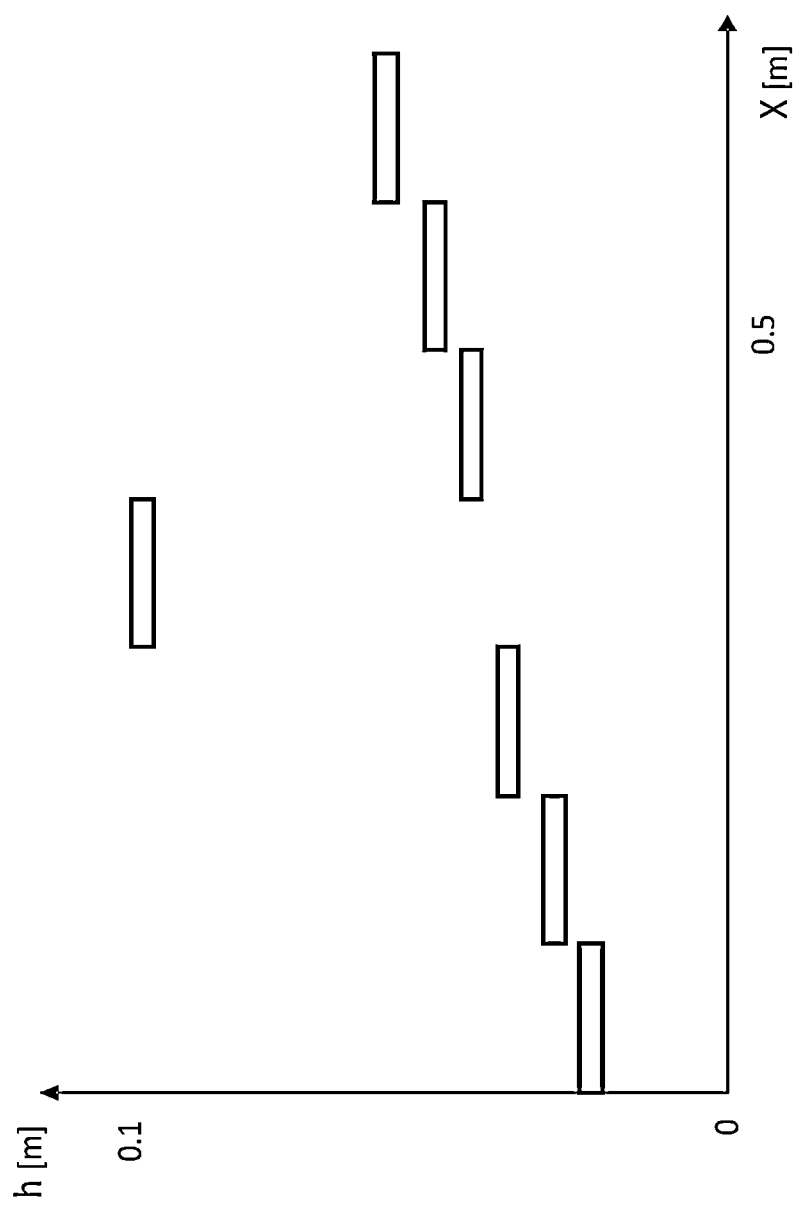
FIG. 49 is a diagram for explaining a specific example of the map data evaluation processing by the map data generation apparatus according to the embodiment of the present disclosure, and is a diagram illustrating an example of an image of a road surface shape in the road surface shape map.

FIG. 49 is a diagram illustrating an example of an image of a road surface shape in the road surface shape map. Specifically, the example shown in FIG. 49 is an image of the road surface shape obtained from the road surface shape information as viewed from the y direction when the resolutions of the road surface shape information in the x direction and the y direction are 0.1 m. In the example shown in FIG. 49, since the height increases by 0.01 m for every 0.1 m, the road gradient is about 10%. However, only one cell near the center is higher than 0.05 m. Given the road structure, there cannot be a slope greater than 0.05 m (50% gradient). Therefore, in the example shown in FIG. 49, it can be determined that there is an abnormality in the generated road surface shape.

Here, when the average value of the heights of the cell at the coordinates (i, j) on the xy plane is $h_{i,j}$, the road surface gradient $\Delta x_{i,j}$ in the x direction and the road surface gradient $\Delta y_{i,j}$ in the y direction at the coordinates (i, j) can be calculated by the following equations.

$$\Delta x_{i,j} = h_{i,j} - h_{i-1,j}$$

$$\Delta y_{i,j} = h_{i,j} - h_{i,j-1}$$

Figure 50:
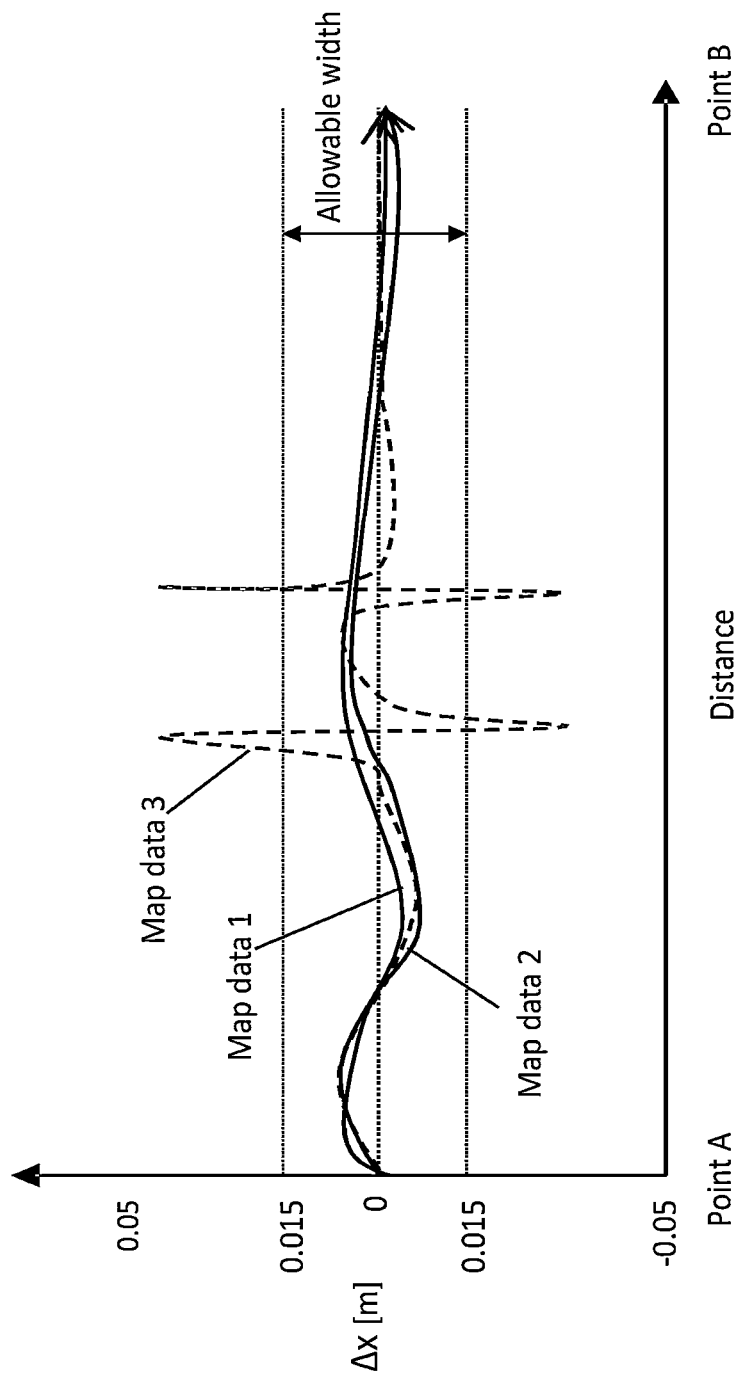
FIG. 50 is a diagram illustrating a specific example of the map data evaluation processing performed by the map data generation apparatus according to the embodiment of the present disclosure, and is a diagram illustrating an example of correlation of variation in road surface gradient among map data.

The abnormality in the map data of the road surface shape map can be determined from the correlation of the variation of the road surface gradients Δx and Δy among the map data. For example, it is assumed that three map data, that is, map data 1, map data 2, and map data 3 are generated using log data acquired in a common section from point A to point B. By plotting the road surface gradient Δx in the x direction of each map data on the same graph in which the horizontal axis represents the distance from the point A, a graph showing the correlation of the variation of the road surface gradient Δx in the x direction among the map data as shown in FIG. 50 can be obtained. The road surface gradient Δx in the x direction may be the road surface gradient in the x direction of the cell at the pose, that is, the cell directly below the vehicle, or may be the average value of the road surface gradients in the x direction of a plurality of cells around the vehicle. By the same method, a graph showing the correlation of the variation of the road surface gradient Δy in the y-direction among the map data can be obtained. By replacing the p-value with the road surface gradient Δx in the x-direction or the road surface gradient Δy in the y-direction, the above-described method for determining abnormality in the map data of the feature map can be used as a method for determining abnormality in the map data of the road surface shape map.

Further, in the method using the gradient of the road surface, it is not always necessary to plot the road surface gradient along the route from point A to point B. If at least one cell whose road surface gradient exceeds the allowable range is included, it may be determined that the map data is abnormal.

5. Others

The map data evaluation processing by the map data generation apparatus 100 can also be applied to a stationary obstacle map. Abnormal map data can be determined by comparing the locations of voxels on the stationary obstacle map among map data. For example, by replacing the p-value with the location of the voxel, the above-described method for determining abnormality in the map data of the feature map can be used as a method for determining abnormality in the map data of the stationary obstacle map.

What is claimed is:

1. A map data generation method comprising:
    generating a plurality of data sets from a travel log data group that is comprised of a plurality of travel log data, each of the plurality of data sets including one or a plurality of the travel log data, the plurality of data sets differing from each other;
    generating a map data for evaluation from each respective one of the plurality of data sets so that a plurality of the map data for evaluation are generated, a number of the map data for evaluation that is generated is equal to a number of the plurality of data sets;
    identifying abnormal map data from amongst the plurality of map data for evaluation by comparing the plurality of map data for evaluation with each other;
    identifying abnormal travel log data from the travel log data that was used to generate the abnormal map data by comparing the data set that was used to generate the abnormal map data with the data set or sets that were used to generate the map data for evaluation that was not identified as the abnormal map data; and
    generating a final map data using one or more of the data sets that do not include the abnormal travel log data that has been identified and without using the abnormal travel log data that has been identified.

2. The map data generation method according to claim 1, further comprising:
    defining each of the plurality of travel log data included in the travel log data group by a plurality of parameters, the plurality of parameters including weather, time of day, and sensor identification at a time of collection of the travel log data; and
    the generating of the plurality of data sets includes selecting the travel log data so that a condition of at least one of the weather, the time of day, and the sensor identification is non-uniform among the plurality of travel log data included in the plurality of data sets.

3. The map data generation method according to claim 2, further comprising:
    identifying a condition causing an abnormality in the map data among the conditions of the weather, the time of day, and the sensor identification based on the abnormal travel log data; and
    generating the final map data using one or more of the data sets in which the conditions of the weather, the time of day, and the sensor identification do not include the condition causing the abnormality in the map data.

4. The map data generation method according to claim 2, further comprising:

specifying a combination of the conditions that causes the abnormality in map data among combinations of conditions of the weather, the time of day, and the sensor identification by comparing the data set used to generate the abnormal map data with the data set or sets that were used to the generate map data for evaluation that was not identified as the abnormal map data; and generating the final map data using one or more of the data sets in which the combinations of conditions of the weather, the time of day, and the sensor identification do not include the combination of conditions that caused the abnormality in the map data.

5. The map data generation method according to claim 1, wherein the map data is map data of a feature map, and the comparing the plurality of map data for evaluation with each other includes comparing variation of features between the plurality of map data for evaluation.

6. The map data generation method according to claim 1, wherein the map data is map data of a feature map, and the comparing the plurality of map data for evaluation with each other includes comparing degree of success of self-location estimation using a feature between the plurality of map data for evaluation.

7. A map data generation apparatus comprising:

at least one processor; and at least one program memory coupled to the at least one processor and storing a plurality of executable instructions, the plurality of executable instructions causes the at least one processor to execute:

generating a plurality of data sets from a travel log data group that is comprised of a plurality of travel log data, each of the plurality of data sets including one or a plurality of the travel log data, the plurality of data sets differing from each other;

generating a map data for evaluation from each respective one of the plurality of data sets so that a plurality of the map data for evaluation are generated, a number of the map data for evaluation that is generated is equal to a number of the plurality of data sets;

identifying abnormal map data from amongst the plurality of map data for evaluation by comparing the plurality of map data for evaluation with each other;

identifying abnormal travel log data from the travel log data that was used to generate the abnormal map data by comparing the data set that was used to generate the abnormal map data with the data set or sets that were used to generate the map data for evaluation that was not identified as the abnormal map data; and generating a final map data using one or more of the data sets that do not include the abnormal travel log data that has been identified and without using the abnormal travel log data that has been identified.

8. A non-transitory computer-readable storage medium storing a map data generation program for causing a computer to execute processing comprising:

generating a plurality of data sets from a travel log data group that is comprised of a plurality of travel log data, each of the plurality of data sets including one or a plurality of the travel log data, the plurality of data sets differing from each other;

generating a map data for evaluation from each respective one of the plurality of data sets so that a plurality of the map data for evaluation are generated, a number of the map data for evaluation that is generated is equal to a number of the plurality of data sets;

identifying abnormal map data from amongst the plurality of map data for evaluation by comparing the plurality of map data for evaluation with each other;

identifying abnormal travel log data from the travel log data that was used to generate the abnormal map data by comparing the data set that was used to generate the abnormal map data with the data set or sets that were used to generate the map data for evaluation that was not identified as the abnormal map data; and generating a final map data using one or more of the data sets that do not include the abnormal travel log data that has been identified and without using the abnormal travel log data that has been identified.

* * * * *